US011539835B2

(12) United States Patent
 Ojesina

(10) Patent No.: US 11,539,835 B2
(45) Date of Patent: Dec. 27, 2022

(54) GLOBAL DIALING FORMAT

(71) Applicant: Victor Tokunbo Ojesina, Houston, TX (US)

(72) Inventor: Victor Tokunbo Ojesina, Houston, TX (US)

(*) Notice: Subject to any disclaimer, the term of this patent is extended or adjusted under 35 U.S.C. 154(b) by 0 days.

(21) Appl. No.: 17/854,178

(22) Filed: Jun. 30, 2022

(65) Prior Publication Data
 US 2022/0329692 A1    Oct. 13, 2022

Related U.S. Application Data

(63) Continuation-in-part of application No. 17/119,066, filed on Dec. 11, 2020, which is a
(Continued)

(51) Int. Cl.
 *H04M 3/42* (2006.01)
 *H04M 3/44* (2006.01)
(Continued)

(52) U.S. Cl.
 CPC ...... *H04M 3/42306* (2013.01); *G06K 7/1417* (2013.01); *G06K 19/06037* (2013.01);
(Continued)

(58) Field of Classification Search
 CPC .. H04M 3/42306; H04M 3/44; H04M 3/4931; H04M 2201/36; H04M 2203/551; G06K 7/1417; G06K 19/06037
 See application file for complete search history.

(56) References Cited

U.S. PATENT DOCUMENTS 5,761,291 A    6/1998 Dalton
6,959,192 B1    10/2005 Cannon
(Continued)

FOREIGN PATENT DOCUMENTS

CN    106210232 A    12/2016
CN    106506777 A    3/2017
(Continued)

OTHER PUBLICATIONS

What is the best way for converting phone numbers into international format (E.164) using Java?. [online]. Stack Overflow, 2009 [retrieved on Jul. 2, 2014], Retrieved from the Internet: <URL: http://stackoverflow.com/questions/187216/what-is-the-best-way-for-converting-phone-numbers-into-international-format-e-1>.
(Continued)

*Primary Examiner* — Akelaw Teshale
(74) *Attorney, Agent, or Firm* — Laurie A. Schlichter, PLLC

(57) ABSTRACT

Described herein is at least one non-transitory computer-readable medium comprising instructions to direct at least one processor to utilize a global dialing format. The at least one processor is directed to retrieve a phone number saved on a communication device. The retrieved phone number is converted to the global dialing format by a reformatting sequence or a manual intervention sequence and the reformatted phone number thereby obtained is saved to a contacts list on the communication device. A QR code is created for contact sharing. A local phone number is retrieved from the reformatted phone number when a user selects the reformatted phone number for dialing. The local phone number is in a destination country. A call logic sequence is initiated to assemble the dialing protocol necessary to complete the phone call. An authentication process is executed to verify that the local phone number is an actual phone number in the destination country. The authentication process results in an authenticated local phone number which is concatenated with the dialing protocol assembled by the call logic sequence. A concatenated phone number is obtained. The local phone number is saved to a call log in the global dialing format. The concatenated phone number is contacted, i.e., called or texted.

12 Claims, 40 Drawing Sheets

Related U.S. Application Data continuation-in-part of application No. 16/504,402, filed on Jul. 8, 2019, now abandoned.

(60) Provisional application No. 62/695,203, filed on Jul. 9, 2018.

(51) Int. Cl.
    *G06K 19/06* (2006.01)
    *G06K 7/14* (2006.01)
    *H04M 3/493* (2006.01)

(52) U.S. Cl.
    CPC ............ *H04M 3/44* (2013.01); *H04M 3/4931* (2013.01); *H04M 2201/36* (2013.01); *H04M 2203/551* (2013.01)

(56) References Cited

U.S. PATENT DOCUMENTS

| | | | | |
|---|---|---|---|---|
| 7,079,643 | B1* | 7/2006 | Knox | H04M 1/27485 |
| | | | | 379/355.06 |
| 7,715,829 | B2 | 5/2010 | Li | |
| 8,243,915 | B1 | 8/2012 | Albuquerque | |
| 8,374,335 | B2 | 2/2013 | Breckenridge | |
| 8,483,716 | B1* | 7/2013 | Albuquerque | H04M 1/2746 |
| | | | | 455/566 |
| 8,594,299 | B2 | 11/2013 | Chu | |
| 8,767,949 | B1 | 7/2014 | Yablon | |
| 10,063,709 | B2* | 8/2018 | Madanes | H04M 1/27485 |
| 10,069,970 | B1* | 9/2018 | Drake | H04M 3/02 |
| 10,498,889 | B2* | 12/2019 | Rincon | H04M 3/4878 |
| 2002/0116380 | A1 | 8/2002 | Chen | |
| 2003/0012359 | A1 | 1/2003 | Nayhouse | |
| 2005/0176411 | A1 | 8/2005 | Taya | |
| 2006/0046785 | A1* | 3/2006 | Cagney | H04M 15/8044 |
| | | | | 455/565 |
| 2006/0177043 | A1 | 8/2006 | Li | |
| 2011/0222680 | A1 | 9/2011 | Rawet | |
| 2013/0288649 | A1 | 10/2013 | Dave | |
| 2014/0161242 | A1* | 6/2014 | Reiher | H04M 1/72457 |
| | | | | 379/201.01 |
| 2014/0323101 | A1* | 10/2014 | Jia | H04M 1/72454 |
| | | | | 455/414.1 |
| 2015/0296081 | A1* | 10/2015 | Jeong | H04M 3/42042 |
| | | | | 379/142.01 |
| 2016/0232416 | A1* | 8/2016 | Rossi | G16H 10/60 |
| 2018/0034805 | A1* | 2/2018 | Eichen | H04L 63/0823 |
| 2019/0124192 | A1* | 4/2019 | Zhao | H04M 1/72457 |
| 2021/0400485 | A1* | 12/2021 | Ergen | G06F 16/9537 |

FOREIGN PATENT DOCUMENTS

| | | |
|---|---|---|
| WO | 2002103991 A2 | 12/2002 |
| WO | 2014179190 A1 | 11/2014 |
| WO | 2018080254 A1 | 5/2018 |

OTHER PUBLICATIONS

Number Fixer. [online]. Maplekey Company, Jun. 2, 2010 [retrieved on Jul. 2, 2014]. Retrieved from the Internet: <URL: https://play.google.com/store/apps/details?id=com.maplekeycompany.apps.numberfixer&hl=en>.

Dialing Outlook Phone Numbers. [online]. Slipstick Systems, Apr. 13, 2013 [retrieved on Jul. 2, 2014]. Retrieved from the Internet: <URL: http://www.slipstick.com/outlook/config/dialing-outlook-phone-numbers/>.

PlusOne—Country Code Address Book Converter. [online]. MyClickapps.com LLC, 2014 [retrieved on Jul. 2, 2014], Retrieved from the Internet: <URL: https://itunes.apple.com/us/app/plusone-country-code-address/id571356876?mt=8>.

Convert a mobile number into international format. [online]. Clockwork SMS API, May 12, 2017 [retrieved on Jun. 25, 2019]. Retrieved from the Internet: <URL: https://www.clockworksms.com/blog/convert-a-mobile-number-into-international-format>.

Change prefix number. [online], L.H.C Tools, May 3, 2019 [retrieved on Jun. 25, 2019]. Retrieved from the Internet: <URL: https://play.google.com/store/apps/details?id=com.ionicframework.fix84984673>.

Formatting International Phone Numbers. [online]. Twilio Inc., 2019 [retrieved on Jun. 25, 2019]. Retrieved from the Internet: <URL: https://support.twilio.com/hc/en-us/articles/223183008-Formatting-International-Phone-Numbers>.

How to quickly convert phone numbers to international format. [online]. engageSPARK, 2019 [retrieved on Jun. 25, 2019]. Retrieved from the Internet: <URL: https://www.engagespark.com/support/convert-phone-numbers-add-country-code-international-format>.

* cited by examiner

FIG. 10

- Back  09:41
- Select country associated with number by tapping country field below and entering first letter of desired country.
- First Name: Jack
- Last Name: Jones
- Company: Oil & Gas
- Contact's Phone: 07056835411
- Phone Number Type: Mobile
- Country:  ← 1002
- Update
- Cancel

FIG. 11

- Back  09:41
- Select country associated with number by tapping country field below and entering first letter of desired country.
- First Name: Jack
- Last Name: Jones
- Company: Oil & Gas Modify Phone Entry
The numbers below match the verification rules for Nigeria. Select the appropriate number, Manual Entry, or Cancel.
- 6835411
- 56835411
- 7056835411
- Manual Entry
- Cancel

Verification Database Excerpt

| Country | ISO Code | Verification Sequence | City Code | City Dialing | Mobile Number? | Toll-Free Number? | Toll-Free Digits Min | Toll-Free Digits Max | Description | Single Time Zone? | Time Code | Time Zone |
|---|---|---|---|---|---|---|---|---|---|---|---|---|
| Latvia | LVA | 3716***** | | | N | N | 0 | 0 | LVA.Latvia | Y | LV | Europe/Riga |
| Latvia | LVA | 3719***** | | | N | N | 0 | 0 | LVA.Latvia | Y | LV | Europe/Riga |
| Latvia | LVA | 3718000** | | 8 or 9 digits | N | Y | 8 | 9 | LVA.Toll Free | Y | LV | Europe/Riga |
| Macau | MAC | 8532***** | | | N | N | 0 | 0 | MAC.Macau | Y | MO | Asia/Macau |
| Macau | MAC | 8536***** | | | Y | N | 0 | 0 | MAC.Cellular | Y | MO | Asia/Macau |
| Macau | MAC | 85308***** | | 7 digits | N | Y | 7 | 7 | MAC.Toll Free | Y | MO | Asia/Macau |
| Saint Martin | MAF | 5906***** | | | Y | N | 0 | 0 | MAF.Cellular | Y | MF | America/Marigot |
| Morocco | MAR | 212520*** | | | N | N | 0 | 0 | MAR.Casablanca | Y | MA | Africa/Casablanca |
| Morocco | MAR | 212521*** | | | N | N | 0 | 0 | MAR.Casablanca | Y | MA | Africa/Casablanca |
| Morocco | MAR | 212522*** | | | N | N | 0 | 0 | MAR.Casablanca | Y | MA | Africa/Casablanca |
| Morocco | MAR | 212523*** | | | N | N | 0 | 0 | MAR.Mohammedia | Y | MA | Africa/Casablanca |
| Morocco | MAR | 212524*** | | | N | N | 0 | 0 | MAR.Marrakesh | Y | MA | Africa/Casablanca |
| Morocco | MAR | 212525*** | | | N | N | 0 | 0 | MAR.Marrakesh | Y | MA | Africa/Casablanca |
| Morocco | MAR | 212528*** | | | N | N | 0 | 0 | MAR.Agadir | Y | MA | Africa/Casablanca |
| Morocco | MAR | 212529*** | | | N | N | 0 | 0 | MAR.Casablanca | Y | MA | Africa/Casablanca |
| Morocco | MAR | 2125***** | | | N | N | 0 | 0 | MAR.Morocco | Y | MA | Africa/Casablanca |
| Morocco | MAR | 2126***** | | | Y | N | 0 | 0 | MAR.Cellular | Y | MA | Africa/Casablanca |
| Morocco | MAR | 212002*** | | 9 digits | N | Y | 9 | 9 | MAR.Toll Free | Y | MA | Africa/Casablanca |
| Monaco | MCO | 3773***** | | | N | N | 0 | 0 | MCO.Cellular | Y | MC | Europe/Monaco |
| Monaco | MCO | 3776***** | | | Y | N | 0 | 0 | MCO.Cellular | Y | MC | Europe/Monaco |
| Monaco | MCO | 3779***** | | | Y | N | 0 | 0 | MCO.Monaco | Y | MC | Europe/Monaco |
| Monaco | MCO | 3770800** | | 9 digits | N | Y | 9 | 9 | MCO.Toll Free | Y | MC | Europe/Monaco |
| Moldova | MDA | 373210*** | | | N | N | 0 | 0 | MDA.Grigoriopol | Y | MD | Europe/Chisinau |
| Moldova | MDA | 373215*** | | | N | N | 0 | 0 | MDA.Dubasari | Y | MD | Europe/Chisinau |
| Moldova | MDA | 373216*** | | | N | N | 0 | 0 | MDA.Camenca | Y | MD | Europe/Chisinau |

FIG. 35

Dialing Codes Database Excerpt

| Country | ISO Code | UN Code | Entry Code Length | Exit Code Length | Min Digits | Max Digits | Entry Code | Exit Code | Local Trunk Req? | Local Trunk | Part of Alliance? | Alliance | Zero as First Digit? | Await Dial Tone Domestic? |
|---|---|---|---|---|---|---|---|---|---|---|---|---|---|---|
| Japan | JPN | JP | 2 | 3 | 9 | 10 | 81 | 010 | Y | 0 | N | | N | N |
| Jordan | JOR | JO | 3 | 2 | 8 | 9 | 962 | 00 | Y | 0 | N | | N | N |
| Kazakhstan | KAZ | KZ | 1 | 3 | 10 | 10 | 7 | 810 | Y | 8 | Y | | N | Y |
| Kenya | KEN | KE | 3 | 3 | 6 | 9 | 254 | 000 | Y | 0 | N | | N | N |
| Kiribati | KIR | KI | 3 | 2 | 5 | 5 | 686 | 00 | N | | N | | N | N |
| Kuwait | KWT | KW | 3 | 2 | 8 | 8 | 965 | 00 | N | | N | | N | N |
| Kyrgyzstan | KGZ | KG | 3 | 2 | 9 | 9 | 996 | 00 | Y | 0 | N | | N | N |
| Laos | LAO | LA | 3 | 2 | 8 | 10 | 856 | 00 | Y | 0 | N | | N | N |
| Latvia | LVA | LV | 3 | 2 | 8 | 8 | 371 | 00 | N | | N | | N | N |
| Lebanon | LBN | LB | 3 | 2 | 7 | 8 | 961 | 00 | Y | 0 | N | | N | N |
| Lesotho | LSO | LS | 3 | 2 | 8 | 8 | 266 | 00 | N | | N | | N | N |
| Liberia | LBR | LR | 3 | 2 | 7 | 9 | 231 | 00 | Y | 0 | N | | N | N |
| Libya | LBY | LY | 3 | 2 | 8 | 9 | 218 | 00 | Y | 0 | N | | N | N |
| Liechtenstein | LIE | LI | 3 | 2 | 7 | 7 | 423 | 00 | N | | N | | N | N |
| Lithuania | LTU | LT | 3 | 2 | 8 | 8 | 370 | 00 | Y | 8 | N | | N | N |
| Luxembourg | LUX | LU | 3 | 2 | 5 | 11 | 352 | 00 | N | | N | | N | Y |
| Macau | MAC | MO | 3 | 2 | 8 | 8 | 853 | 00 | N | | N | | N | N |
| Macedonia | MKD | MK | 3 | 2 | 8 | 8 | 389 | 00 | Y | 0 | N | | N | N |
| Madagascar | MDG | MG | 3 | 2 | 9 | 9 | 261 | 00 | Y | 0 | N | | N | N |
| Malawi | MWI | MW | 3 | 2 | 7 | 9 | 265 | 00 | N | | N | | N | N |
| Malaysia | MYS | MY | 2 | 2 | 8 | 10 | 60 | 00 | Y | 0 | N | | N | N |
| Maldives | MDV | MV | 3 | 2 | 7 | 7 | 960 | 00 | N | | N | | N | N |
| Mali | MLI | ML | 3 | 2 | 8 | 8 | 223 | 00 | N | | N | | N | N |

FIG. 36A

Dialing Codes Database Excerpt

| Country | ISO Code | Await Dial Tone Int'l? | Domestic Carrier Req? | Int'l Carrier Req? | Multiple Entry Codes? | Mobile and Land Line Rules? | Land Line Prefix Domestic | Mobile Prefix Domestic | Land Line Prefix Int'l | Mobile Prefix Int'l | Dial Display |
|---|---|---|---|---|---|---|---|---|---|---|---|
| Japan | JPN | N | N | N | N | N | | | | | 9 to 10 digits |
| Jordan | JOR | N | N | N | N | N | | | | | 8 to 9 digits |
| Kazakhstan | KAZ | Y | N | N | N | N | | | | | 10 digits |
| Kenya | KEN | N | N | N | N | N | | | | | 6 to 9 digits |
| Kiribati | KIR | N | N | N | N | N | | | | | 5 digits |
| Kuwait | KWT | N | N | N | N | N | | | | | 8 digits |
| Kyrgyzstan | KGZ | N | N | N | N | N | | | | | 9 digits |
| Laos | LAO | N | N | N | N | N | | | | | 8 to 10 digits |
| Latvia | LVA | N | N | N | N | N | | | | | 8 digits |
| Lebanon | LBN | N | N | N | N | N | | | | | 7 to 8 digits |
| Lesotho | LSO | N | N | N | N | N | | | | | 8 digits |
| Liberia | LBR | N | N | N | N | N | | | | | 7 to 9 digits |
| Libya | LBY | N | N | N | N | N | | | | | 8 to 9 digits |
| Liechtenstein | LIE | N | N | N | N | N | | | | | 7 digits |
| Lithuania | LTU | N | N | N | N | N | | | | | 8 digits |
| Luxembourg | LUX | N | N | N | N | N | | | | | 5 to 11 digits |
| Macau | MAC | N | N | N | N | N | | | | | 8 digits |
| Macedonia | MKD | N | N | N | N | N | | | | | 8 digits |
| Madagascar | MDG | N | N | N | N | N | | | | | 9 digits |
| Malawi | MWI | N | N | N | N | N | | | | | 7 to 9 digits |
| Malaysia | MYS | N | N | N | N | N | | | | | 8 to 10 digits |
| Maldives | MDV | N | N | N | N | N | | | | | 7 digits |
| Mali | MLI | N | N | N | N | N | | | | | 8 digits |

Multiple Carriers Database
Excerpt

| ISO Code | Exit Code | Carrier Name | Local Trunk | ISO Code | Exit Code | Carrier Name | Local Trunk |
|---|---|---|---|---|---|---|---|
| AUS | 0014 | Primus | 0 | HKG | 007 | Wharft T & T | |
| AUS | 0018 | Telstra | 0 | HKG | 008 | Hutchison Telecom | |
| BOL | 0010 | Entel | 010 | HKG | 009 | New World Telecom | |
| BOL | 0012 | Cotas | 012 | HKG | 0050 | ComNet (HK) Ltd | |
| BOL | 0013 | Boliviatel | 013 | HKG | 0059 | HKC Network Ltd | |
| BOL | 0014 | Nuevatel | 014 | HKG | 0060 | Pccw | |
| BRA | 0012 | CTBC | 012 | IDN | 001 | Indosat | 0 |
| BRA | 0014 | Telecom | 014 | IDN | 007 | Telkom | 0 |
| BRA | 0015 | Vivo | 015 | IDN | 008 | Indosat | 0 |
| BRA | 0021 | Claro | 021 | IDN | 009 | Barkie Telecom | 0 |
| BRA | 0023 | Intelig Tim | 023 | ISR | 012 | Smile | 0 |
| BRA | 0025 | Gvt | 025 | ISR | 013 | Net Vision | 0 |
| BRA | 0031 | Oi | 031 | ISR | 014 | Bezeq Int | 0 |
| BRA | 0032 | Convergia | 032 | ISR | 015 | Hallo | 0 |
| BRA | 0041 | Tim | 041 | ISR | 016 | Golan Telecom | 0 |
| BRA | 0043 | Sercomtel | 043 | ISR | 017 | Hot Mobile | 0 |
| KHM | 001 | Telcom Cambodia | 0 | ISR | 018 | Xfone | 0 |
| KHM | 007 | Royal Telcam | 0 | ISR | 019 | Telza | 0 |
| KHM | 179 | Beeline | 0 | SGP | 001 | Sing Tel | |
| KHM | 177 | Cellcard/Mobitel | 0 | SGP | 002 | M1 | |
| KHM | 166 | Hello/TMIC | 0 | SGP | 008 | Starhub | |
| KHM | 165 | Mfone/Camshin | 0 | KOR | 001 | KT | 0 |
| COL | 005 | Une epm | 0 | KOR | 002 | LGU | 0 |
| COL | 007 | Etb | 0 | KOR | 005 | Sk Broadband | 0 |
| COL | 009 | Movistar | 0 | KOR | 006 | Sk Telink | 0 |
| COL | 00414 | Tigo | 0 | KOR | 008 | Onse Telecom | 0 |
| COL | 00444 | Claro Movil | 0 | FJI | 00 | Fiji Tel | |
| COL | 00456 | Claro Fiijos | 0 | FJI | 052 | Telcom Fiji | |
| COL | 00468 | Avantel | 0 | | | | |

FIG. 37

GLOBAL DIALING FORMAT

TECHNICAL FIELD

The present disclosure relates generally to a global dialing format for storing domestic and international phone numbers and placing phone calls or sending texts to the stored numbers. More specifically, the present techniques relate to converting a phone number to the global dialing format and calling or texting the reformatted phone number.

BACKGROUND ART

There are multiple standards and conventions that govern the formatting of a phone number to be called or texted. A user of a communication device must be familiar with these standards and conventions for countries throughout the world to successfully place calls or send texts to domestic and international phone numbers.

BRIEF DESCRIPTION OF THE DRAWINGS

FIG. 10 is an illustration of a screen that appears on a user's communication device during the manual intervention sequence.

FIG. 11 is an illustration of a screen that displays unresolved phone numbers.

FIG. 35 is an excerpt from a verification database.

FIGS. 36A and 36B are an excerpt from a dialing codes database.

FIG. 37 is an excerpt from a multiple carriers database.

The same numbers are used throughout the disclosure and the figures to reference like features. Numbers in the 100 series refer to features originally found in FIG. 1; numbers in the 200 series refer to features originally found in FIG. 2; and so on.

Figure 1:
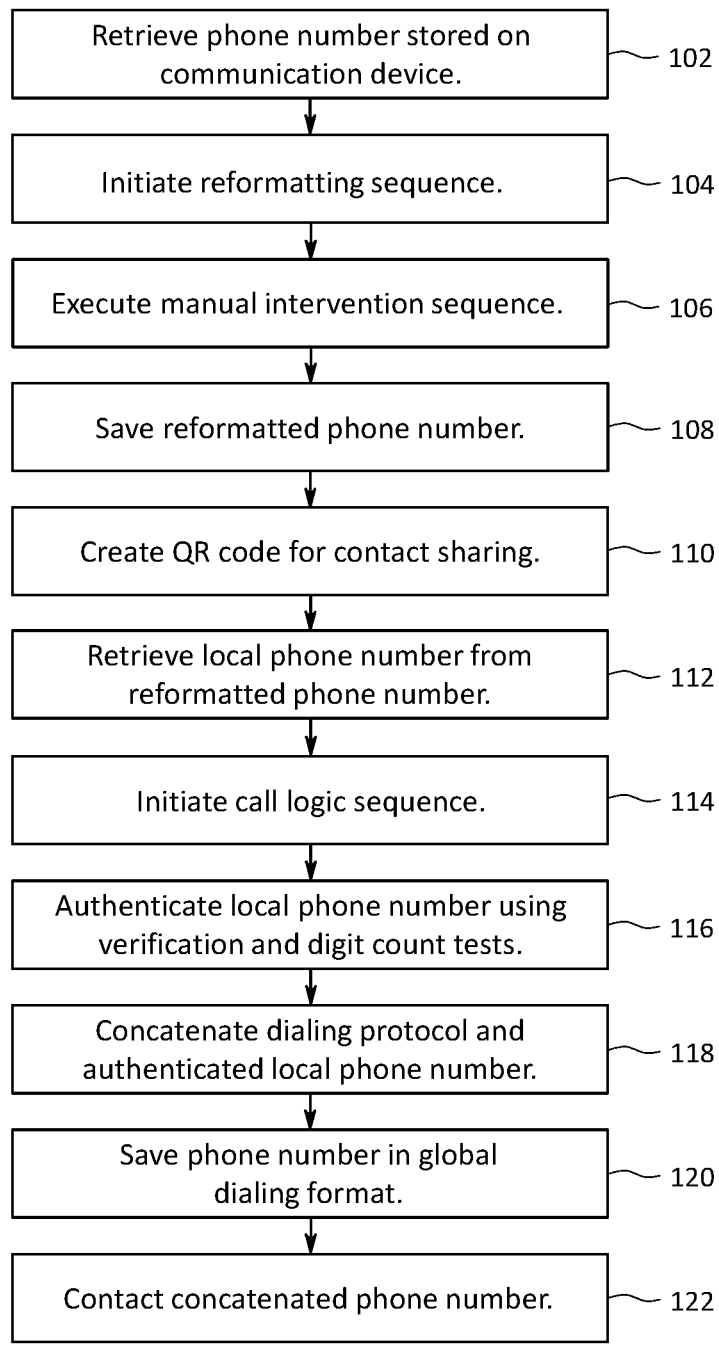
FIG. 1 is a logic flow diagram for converting a phone number to a global dialing format and calling or texting the reformatted phone number.

The logic sequences shown in the logic flow diagrams may be implemented as instructions stored on at least one non-transitory, computer-readable medium. These instructions may be read and executed by at least one processor to perform the functions described herein. To facilitate the performance of these functions, the at least one processor may receive user input from the screens illustrated in the figures and may access the databases excerpted in the figures.

DESCRIPTION OF THE EMBODIMENTS

A phone number must be in a certain format if the phone call or text is to reach the intended recipient. However, this format is not necessarily the format in which the phone number is saved on a communication device.

A phone number must contain certain codes and prefixes depending upon the originating and destination countries. For example, a trunk prefix is required in most countries when placing phone calls or sending texts to domestic phone numbers. An exit code for the originating country and an entry code for the destination country are required when placing calls or sending texts to international phone numbers. If any necessary code or prefix is missing, a communication device cannot call or text the phone number without manual intervention. A user has to add the missing code(s) or prefix(es) before the phone number can be called or texted. This requires the user to be familiar with codes and prefixes for multiple countries.

When a global dialing format is used, a communication device saves a phone number in a format that is uniform across countries. A call logic sequence associated with the global dialing format captures codes and prefixes from various databases and concatenates the captured codes and prefixes with the phone number prior to placing a call or sending a text. The global dialing format and related call logic sequence obviate the need for the user to intervene and add any missing codes or prefixes to the phone number.

The subject matter disclosed herein relates to the use of a global dialing format by a communication device. The present disclosure describes a software application that converts a phone number to the global dialing format and saves the reformatted phone number to a contacts list on the communication device. To contact the reformatted phone number, the software application retrieves a local phone number contained in the reformatted phone number, concatenates the local phone number and any necessary dialing codes or prefixes, and calls or texts the concatenated phone number. For example, the software application may retrieve a phone number saved on a communication device. A reformatting sequence may convert the phone number to the global dialing format. A manual intervention sequence may be invoked to convert the phone number when the reformatting sequence cannot accomplish the conversion. The reformatted phone number may be saved to the contacts list on the communication device, whether the reformatted phone number is the result of the reformatting sequence or the manual intervention sequence. A QR code may be created from the reformatted phone number to enable contact sharing. To call or text the phone number in the global dialing format, the local phone number may be retrieved from the reformatted phone number. The local phone number may be located in a destination country. A call logic sequence may be initiated. The call logic sequence may assemble the dialing codes and prefixes necessary to place a call or send a text. An authentication sequence may be executed to verify that the local phone number is located in the destination country. The local phone number may be authenticated if it passes a verification test and a digit count test. If authenticated, the local phone number may be concatenated with the dialing codes and prefixes captured during the execution of the call logic sequence. The local phone number is saved on the communication device in the global dialing format. The concatenated phone number may be contacted, i.e., called or texted. Various examples of the execution of the software application are described in detail below. Reference is made to the figures.

FIG. 1 is a logic flow diagram for converting a phone number to a global dialing format and calling or texting the reformatted phone number. The logic begins at block 102, where a software application (app) may retrieve a phone number saved on a communication device. The term "communication device" may include mobile devices such as smart phones, laptops, tablets (e.g., iPods® and iPads®), and any other transportable electronic devices having sufficient computing capability to implement the embodiments described in the present disclosure. Further, the term "communication device" need not be limited to mobile devices. For example, a desktop computer may be used to implement the embodiments described herein.

At block 104, the reformatting sequence may be initiated. The reformatting sequence may convert the retrieved phone number to the global dialing format. The reformatted phone number may be a concatenation of a standardized country code and a local phone number in the destination country represented by the standardized country code. In an embodiment, the standardized country code may be a three-letter code. In particular, the three-letter code may be the International Organization for Standardization (ISO) country code for the destination country. The term "ISO country code" refers to a unique three-letter code for a country.

The global dialing format of the reformatted phone number may be the Toks ISO-Numeric (TIN) dialing format. The TIN dialing format is the concatenation of the ISO country code for the destination country and the local phone number. For example, a phone number in the United States would be "USA.2811234567" in the TIN format.

The reformatting sequence may by composed of four logic sequences. The first logic sequence, the second logic sequence, the third logic sequence, and the fourth logic sequence are depicted in FIGS. 5A and 5B, 6A and 6B, 7A and 7B, and 8, respectively. Each retrieved phone number may be reformatted by one of the four logic sequences. However, the reformatting sequence may be unable to convert a retrieved phone number to the global dialing format. When this occurs, a manual intervention sequence is executed at block 106. The manual intervention sequence may allow a user to intercede and reformat the retrieved phone number. The user may reformat the phone number by interfacing with the app via interactive screens displayed on the communication device.

The reformatted phone number may be saved to a contacts list on the communication device at block 108. The phone number is saved whether it was converted to the global dialing format by the reformatting sequence or the manual intervention sequence. The saved phone number may be called or texted if selected by the user.

At block 110, a quick response (QR) code may be created from the reformatted phone number. In particular, contact information associated with the reformatted phone number may be rendered as a QR code image. For example, both Apple and Android use a programming language to create QR codes. Apple's mobile operating system iOS uses the Objective-C programming language which includes native functions that generate QR codes. Android's mobile operating system Android OS uses the Android App to generate QR codes by accessing the Google library com.google.zxing.

The QR code may be created to enable contact sharing. The user may decide to share the QR code (and the contact information it contains) with another user of a communication device. The user accomplishes this type of sharing by exporting the QR code. The export of a QR code is explained in detail with reference to FIG. 24. Sharing of a QR code is not unidirectional; the user may also receive a QR code from another user of a communication device. The user accomplishes this type of sharing by importing the QR code. The import of a QR code is explained in detail with reference to FIG. 25.

At block 112, the local phone number may be retrieved from the reformatted phone number. Block 112 may begin the conversion of the retrieved phone number to a format that can be called or texted. This conversion may be initiated when the user decides to call or text the reformatted number and chooses it from a list of phone numbers stored on his or her communication device.

The call or text to the local phone number is made from an originating country to a destination country. The communication device may be in the originating country and may be able to determine its location. The destination country may be the country that corresponds to the ISO country code in the reformatted phone number. The originating country and the destination country may be compared to determine if they are the same. If the two countries are the same, a domestic call logic sequence may be invoked. If the two countries are different, an international call logic sequence may commence. The appropriate call logic sequence may be initiated at block 114. The call logic sequence may determine the dialing codes and prefixes necessary to complete the call or send the text to the local phone number. The domestic call logic sequence and the international call logic sequence are depicted in FIGS. 27A and 27B and 29A-29C, respectively.

At block 116, the local phone number may be authenticated. The authentication process determines if the local phone number is an actual phone number in the destination country. Two tests are involved. The verification test compares the first few digits of the local phone number to verification sequences in a verification database (excerpted in FIG. 35). Verification sequences are sequences of digits that begin phone numbers in the destination country. The digit count test compares the number of digits in the local phone number to minimum and maximum rules (MMR) retrieved from a dialing codes database (excerpted in FIGS. 36A and 36B). The MMR specify the minimum and maximum number of digits contained in phone numbers in the destination country. The local phone number is authenticated if it passes both the verification test and the digit count test. An authenticated local phone number begins with a sequence of digits that matches a verification sequence and contains an appropriate number of digits for phone numbers in the destination country.

At block 118, the authenticated local phone number may be concatenated with a dialing protocol. The dialing protocol may contain the dialing codes and prefixes needed to call or text the local phone number. The dialing codes and prefixes may have been identified and captured during the call logic sequence initiated at block 114. For example, the exit code for the originating country and the entry code for the destination country may constitute the dialing protocol that is combined with the local phone number. The concatenation of the dialing protocol and the local phone number may result in a concatenated phone number. At block 120, the phone number may be saved to the call log in the global dialing format. The concatenated phone number may be contacted, i.e., called or texted, at block 122.

Figure 2:
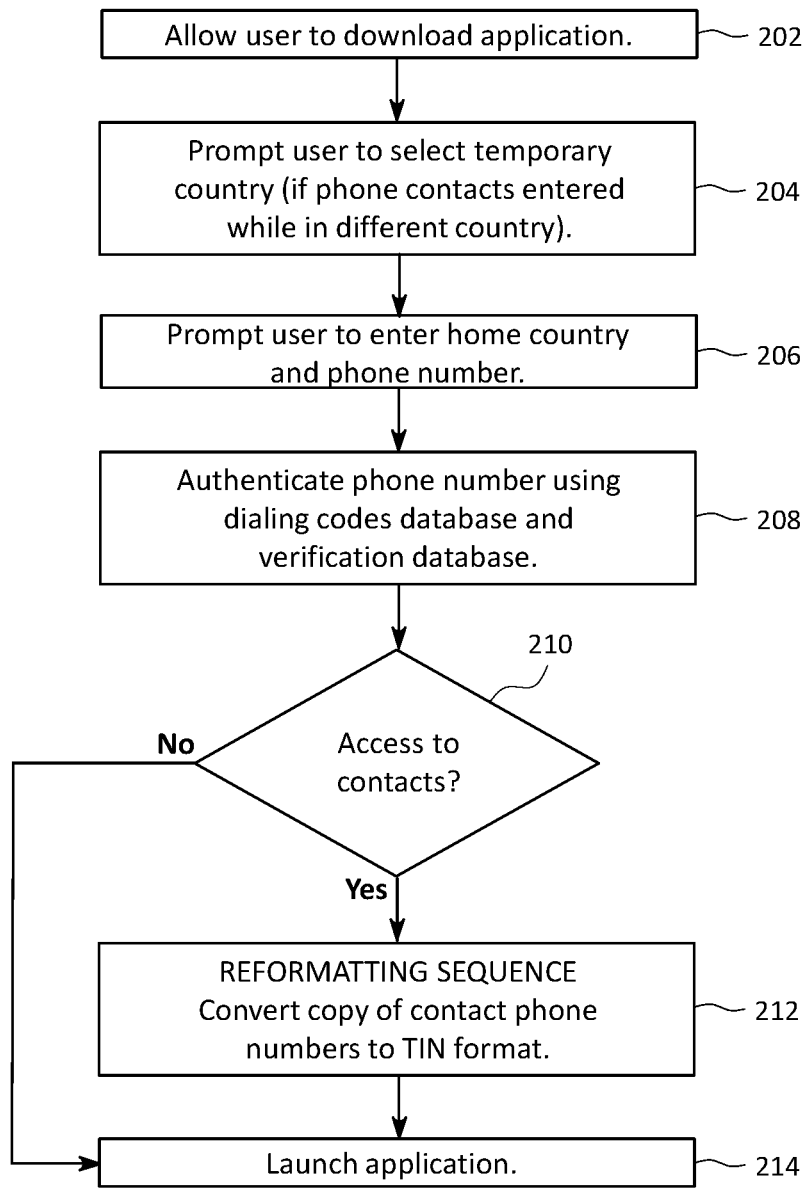
FIG. 2 is a logic flow diagram for installing a software application that performs the functions disclosed herein.

FIG. 2 is a logic flow diagram for installing a software application that performs the functions disclosed herein. In particular, the app may accomplish the tasks outlined in the discussion of FIG. 1. At block 202, the logic sequence may begin by allowing the user to download the app to his or her communication device.

At block 204, the logic sequence may prompt the user to select a temporary country. The user may select the country in which he or she was located when the current contacts were added to his or her communication device. The temporary country and the user's current home country should be different. If a temporary country is selected, subsequent reformatting of the current contacts occurs as if the contacts were originally added to the user's communication device while the user was located in the temporary country.

At block 206, the logic sequence may prompt the user to enter his or her home country and phone number. This information may be entered by the user via a screen displayed on the communication device. There may be alternative ways to determine the user's home country. For example, the user's home country may be retrieved from registration information stored on the communication device. Further, a global positioning system (GPS) receiver may ascertain the current country in which the communication device is located and the communication device may be configured to accept the current country as the user's default home country.

At block 208, the user's phone number may be authenticated. The authentication process determines if the user's phone number is an actual phone number in the user's home country. Two tests are involved. The digit count test compares the number of digits in the user's phone number to minimum and maximum rules (MMR) retrieved from the dialing codes database (excerpted in FIGS. 36A and 36B). The MMR specify the minimum and maximum number of digits contained in phone numbers in the user's home country. The verification test compares the first few digits of the user's phone number to verification sequences retrieved from the verification database (excerpted in FIG. 35). Verification sequences are sequences of digits that begin phone numbers in the user's home country. The user's phone number is authenticated if it passes both the digit count test and the verification test. The authenticated phone number contains an appropriate number of digits and begins with a sequence of digits that matches a verification sequence for phone numbers in the user's home country.

At block 210, the app may determine if the user is allowing access to his or her current contacts. If access is allowed, the logic sequence continues at block 212. At this block, the phone numbers for the current contacts may be copied and the copies may be reformatted. The copies of the contact phone numbers may be converted to the TIN dialing format. The TIN-formatted phone numbers may be concatenations of the standardized country code for the destination country and the local phone number in the destination country. The app advances from block 212 to block 214 once the copy of the last current contact has been reformatted.

The app also progresses to block 214 if the user is not allowing access to his or her current contacts at block 210. Accordingly, the contact phone numbers are not available to be reformatted and block 212 is bypassed.

At block 214, the logic sequence may launch the app on the user's communication device. Once launched, the app may convert a new contact to the TIN dialing format and add the reformatted contact to the contacts list. The same logic sequence may be used whether a contact phone number is reformatted before or after launch of the app. Reformatting of a phone number is described in detail with reference to FIGS. 4A through 9.

Figure 3A:
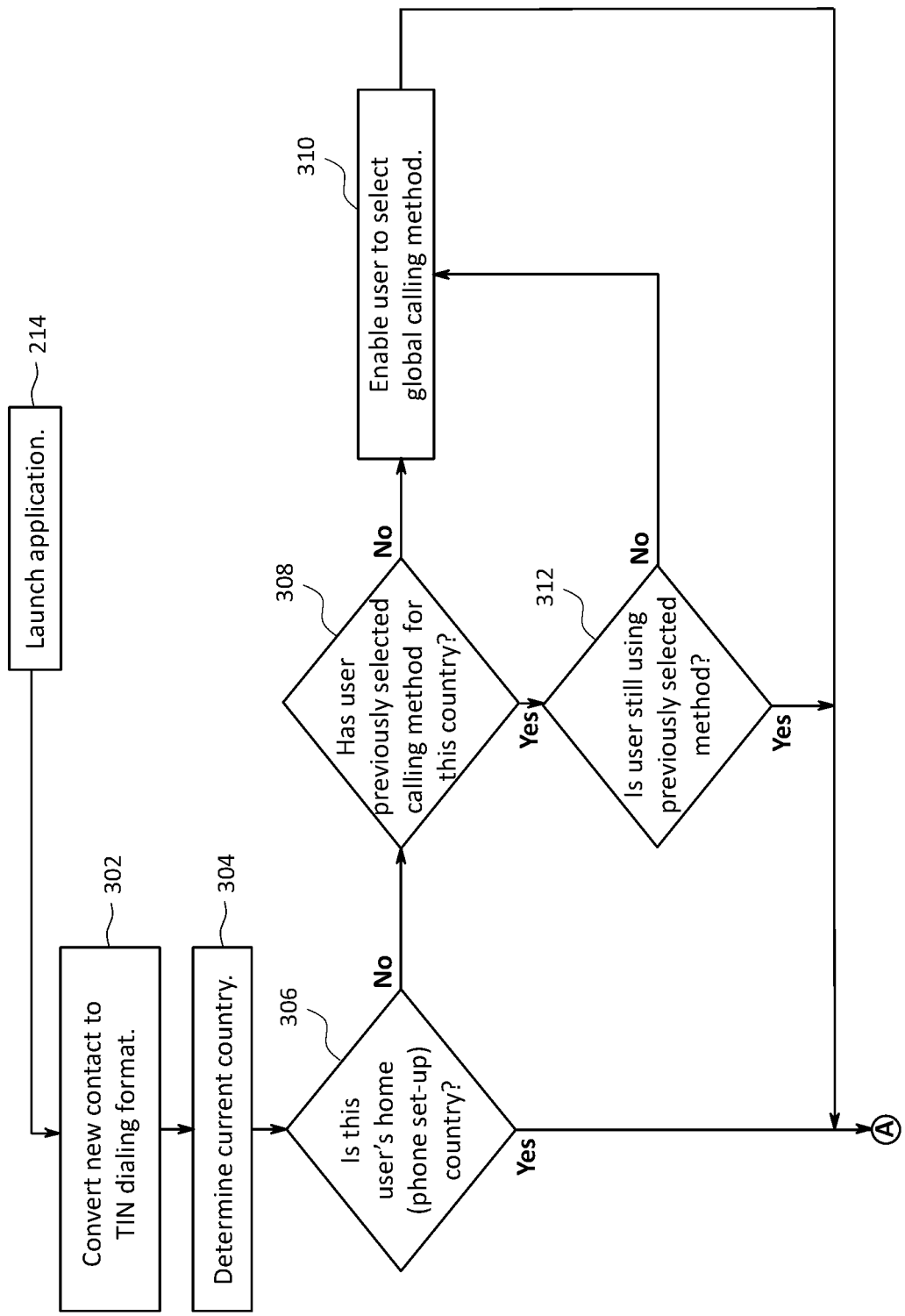
FIGS. 3A and 3B are a logic flow diagram for determining how a phone number may be entered to initiate a call or a text message.
Figure 3B:
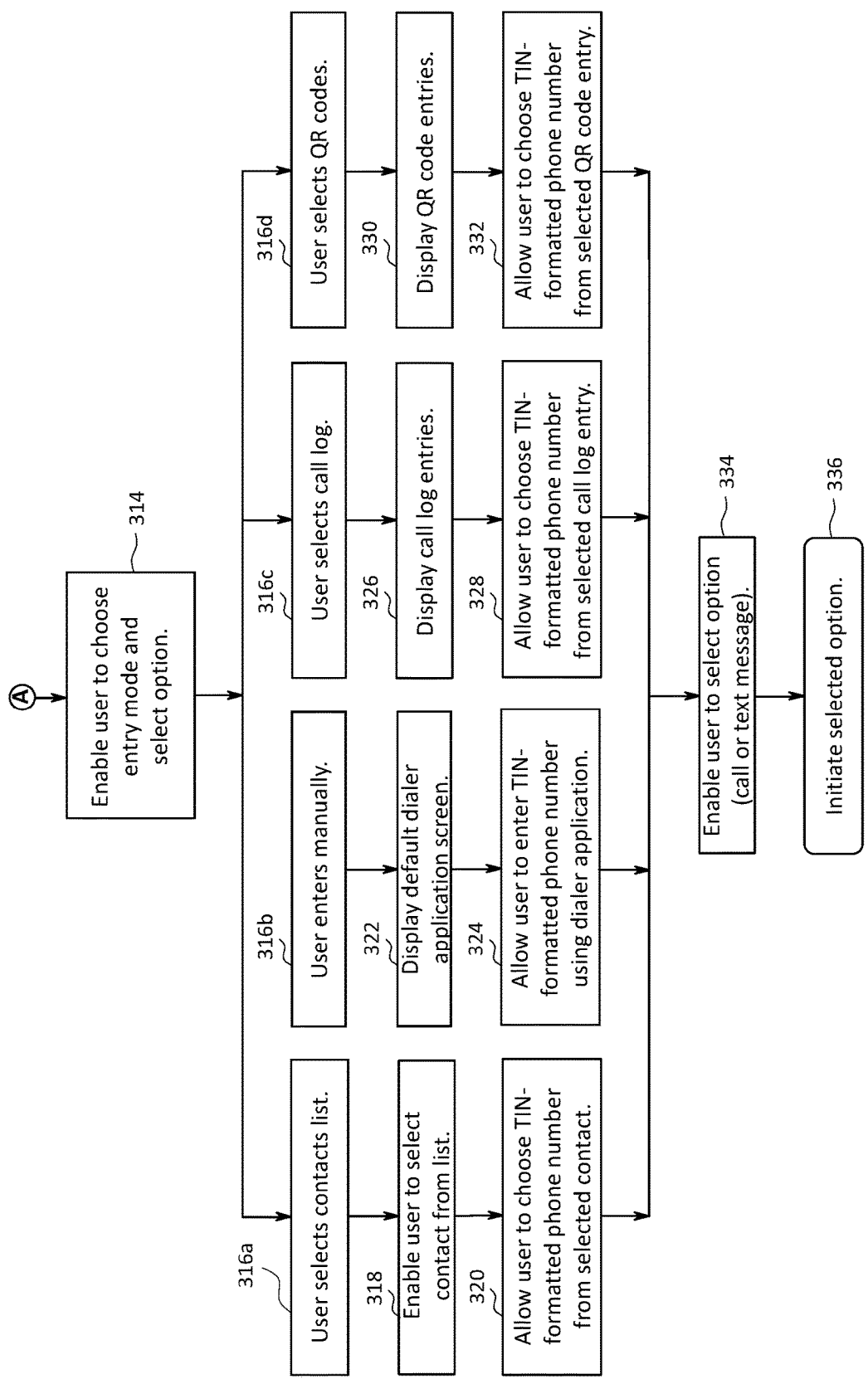

FIGS. 3A and 3B are a logic flow diagram for determining how a phone number may be entered to initiate a call or a text message. The entering of a phone number may be accomplished in one of four ways. The app may enable the user to select the manner in which a phone number is entered. The selection made by the user may be influenced by several factors. FIGS. 3A and 3B depict these factors and how they combine to help the user choose the way a particular phone number will be entered. The selection of an entry mode may begin at block 302 after the app is launched on the user's communication device at block 214.

At block 302, a new contact may be reformatted. The new contact may be converted to the TIN dialing format. The contact is referred to as "new" because it was reformatted after the app was launched.

At block 304, the user's current country may be identified. The current country may be determined automatically or entered manually. The GPS receiver on the communication device may automatically identify the user's current country.

Alternatively, the user may select his or her current country from a list of countries displayed on a screen of the communication device.

At block 306, the user's current country may be compared to the user's home country. The user's home country is the country in which the communication device was configured. If the user's current and home countries are the same, the logic sequence continues at block 314. If the two countries are different, the logic sequence continues at block 308.

At block 308, the user is in a country other than his or her home country and the app may determine if the user previously selected a calling method for the present country. The logic sequence continues at block 312 if a calling method has been selected. Otherwise, the logic sequence continues at block 310.

At block 312, the app may determine if the user is still using the previously selected calling method. If so, the logic sequence continues at block 314. If not, the logic sequence continues at block 310.

At block 310, the logic sequence may enable the user to select a calling method for use in the present country. The options available to the user may include a local SIM card, a global SIM card, a Wi-Fi network, an international calling plan, or the like. The logic sequence continues at block 314 once the user has chosen a calling method.

At block 314, the app may enable the user to choose an entry mode for the TIN-formatted phone number to be called or texted. The user can choose the contacts list at block 316a, manual entry at block 316b, the call log at block 316c, or QR code entries at block 316d. The user's choice determines the actions taken prior to the initiation of the call or text.

The logic sequence continues at block 318 if the user chooses the contacts list at block 316a. At block 318, the app may display the contacts list and enable the user to select a contact from the list. The logic sequence continues at block 320, where the app may allow the user to select the TIN-formatted phone number from the chosen contact.

The logic sequence continues at block 322 if the user chooses manual entry at block 316b. At block 322, the app may display the screen for the default dialer application. The logic sequence continues at block 324. At bock 324, the app allows the user to enter the TIN-formatted phone number using the default dialer application.

The logic sequence continues at block 326 if the user chooses the call log at block 316c. At block 326, the app may display the call log entries and enable the user to choose an entry. The logic sequence continues at block 328. At block 328, the app may allow the user to select the TIN-formatted phone number from the chosen call log entry.

The logic sequence continues at block 330 if the user chooses QR code entries at block 316d. At block 330, the app may display a list of QR code entries and may allow the user to select a QR code entry. The logic sequence continues at block 332. At block 332, the app may allow the user to select the TIN-formatted phone number from the chosen QR code entry.

Block 334 is reached no matter which entry option is selected by the user. The logic sequence may advance from block 320, 324, 328, or 332 to block 334, where the app enables the user to select calling or texting of the TIN-formatted phone number. The selected option—calling or texting—is initiated at block 336.

The phone number selected at block 320, 328, or 332 or entered at block 324 was previously converted to the TIN dialing format by the app. The reformatted phone number may be a concatenation of an ISO country code and a local phone number in the destination country represented by the ISO country code. Reformatting of phone numbers is explained in detail with reference to FIGS. 4A to 9.

For purposes of this disclosure, selecting or entering a TIN-formatted phone number is different from calling or texting a TIN-formatted phone number. This is evident in FIG. 3B, where selecting or entering of the phone number takes place at block 320, 324, 328, or 332 and calling or texting of the phone number is initiated at block 336. Selecting or entering occurs when the digits of the local phone number are input to the user's communication device. TIN dialing logic adds the appropriate dialing codes or prefixes and the concatenated phone number is called or texted when the phone number is passed to a telecommunications network by the communication device. The network routes the call or text to the intended recipient. The distinction between selecting or entering and calling or texting is apparent in other figures that accompany the present disclosure.

Figure 4A:
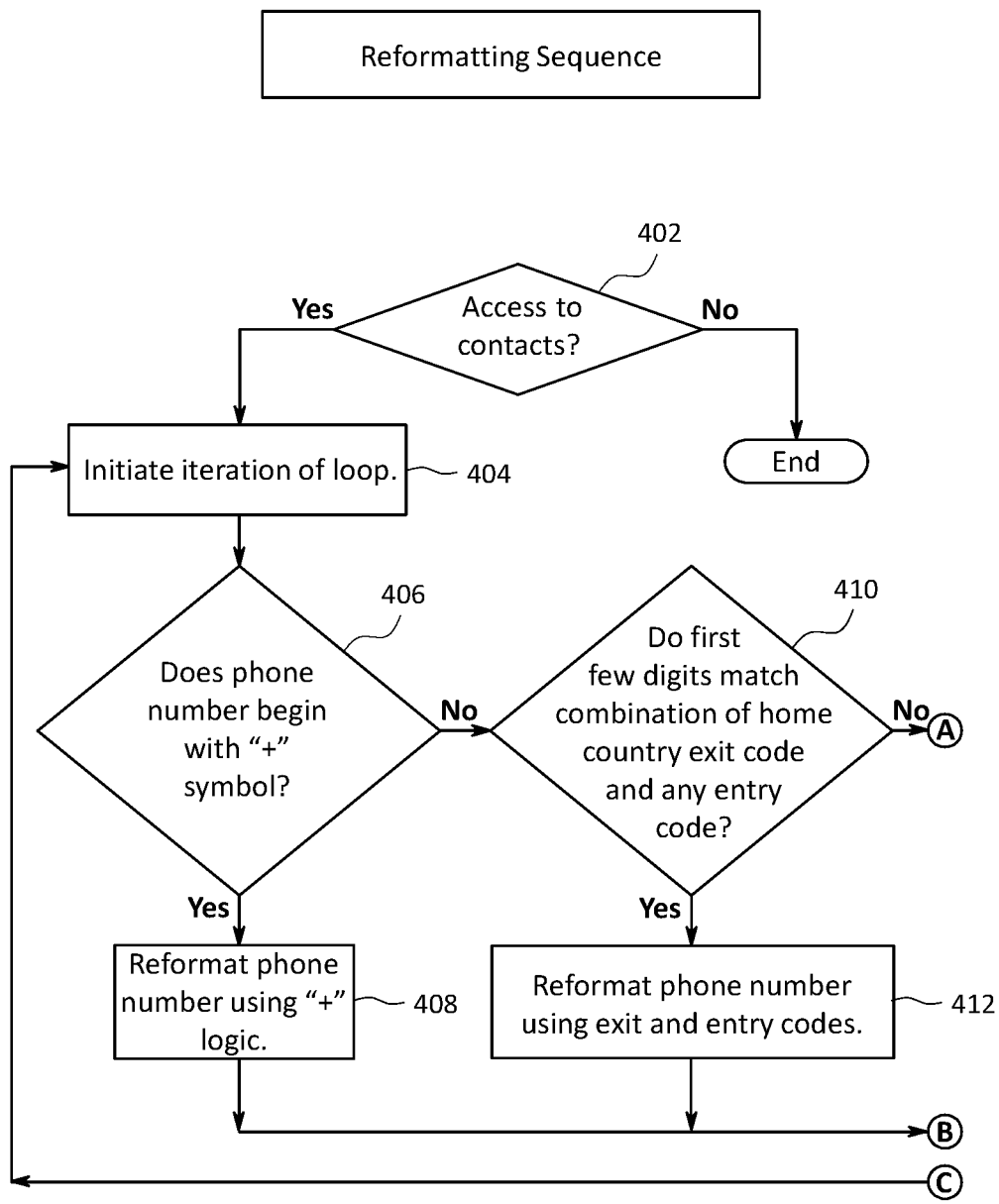
FIGS. 4A and 4B are a logic flow diagram for reformatting contact phone numbers.
Figure 4B:
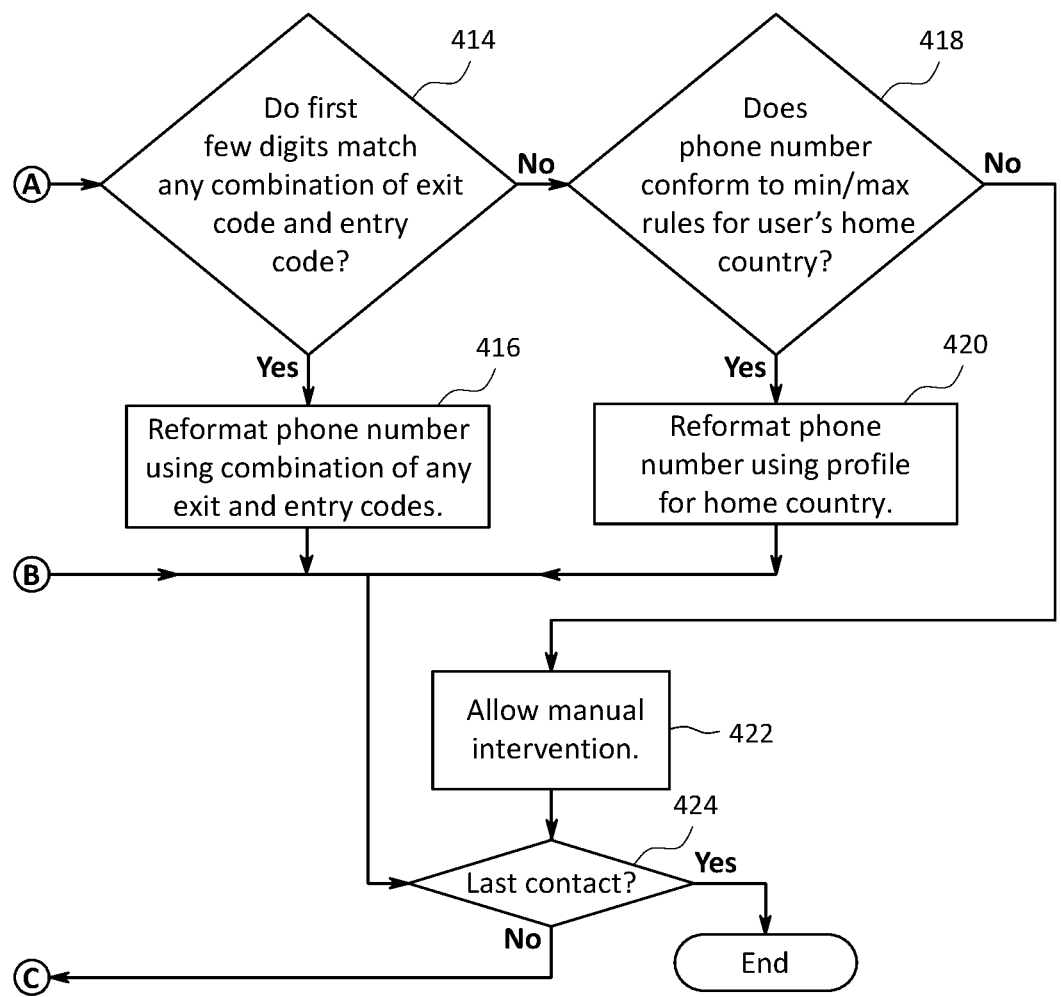

FIGS. 4A and 4B are a logic flow diagram for reformatting contact phone numbers. In particular, the reformatting sequence may convert a contact phone number to the TIN dialing format. The reformatted phone number may be a concatenation of an ISO country code and a local phone number in the destination country represented by the ISO country code. The logic sequence begins at block 402.

At block 402, the app may determine if it has been allowed access to the contacts list on the user's communication device. The user may allow access if his or her contact phone numbers have not been reformatted. If access is allowed, the reformatting sequence may begin at block 404. If access is denied, the reformatting sequence is not executed.

At block 404, the reformatting sequence may begin by initiating a loop. The loop may iterate until all the contact phone numbers have been reformatted. The loop may commence at block 406.

At block 406, the app may determine if the phone number begins with a "+" symbol. The "+" symbol is the exit code for most countries. An exit code should precede a phone number when placing an international call. Exit codes are also known as international call prefixes and dial-out codes.

If the phone number starts with the "+" symbol, the reformatting sequence may progress from block 406 to block 408. At block 408, "+" logic may be utilized to convert the phone number to the global dialing format. The execution of "+" logic is explained in detail with reference to FIGS. 5A and 5B. The reformatting sequence may continue at block 424 after "+" logic has converted the contact phone number to the global dialing format.

The reformatting sequence may progress from block 406 to block 410 if the phone number does not begin with the "+" symbol. At block 410, the app may determine if the first few digits of the phone number match a combination of the exit code for the user's home country and an entry code for any country. The entry code may contain five digits at most and designates which country is to be called or texted. The entry code is dialed after the exit code and before the phone number. The terms "entry code" and "dial-in code" may be used interchangeably.

The reformatting sequence may continue at block 412 if the criterion at block 410 is satisfied. At block 412, the phone number may be reformatted using the combination of the exit and entry codes. Block 412 is explained in detail with reference to FIGS. 6A and 6B. The reformatting sequence may continue at block 424 once the phone number has been converted to the global dialing format.

The reformatting sequence may advance from block 410 to block 414 if the criterion at block 410 is not satisfied. At block 414, the app may determine if the first few digits of the phone number match any combination of an exit code and an entry code. If a matching combination is found, the reformatting sequence may continue at block 416. At block 416, the phone number may be reformatted using the combination of any exit code and any entry code. Block 416 is explained in detail with reference to FIGS. 7A and 7B. The reformatting sequence may progress from block 416 to block 424 once the phone number has been converted to the global dialing format.

The reformatting sequence may continue at block 418 if the criterion at block 414 is not satisfied. At block 418, the app may determine if the phone number contains at least a minimum number of digits and at most a maximum number of digits specified in a minimum rule and a maximum rule for the user's home country. If the phone number satisfies the minimum and maximum rules, the phone number may be a domestic phone number. In other words, the phone number's originating country and destination country are both the user's home country. A domestic phone number may be reformatted at block 420. At block 420, a country profile for the user's home country may be used to reformat the phone number. A country profile may include a set of rules that govern the reformatting of domestic phone numbers. Country profiles may vary because different countries have different reformatting rules. Block 420 is explained in detail with reference to FIG. 8.

The reformatting sequence may progress from block 418 to block 422 if the criterion at block 418 is not satisfied. At block 422, manual intervention may be initiated. Manual intervention is necessary because some phone numbers cannot be converted to the global dialing format at blocks 408, 412, 416, or 420. These phone numbers are termed "ambiguous phone numbers."

One type of ambiguous phone number conforms to the minimum and maximum rules (MMR) and the verification sequences for two or more countries. The phone number "0096536745987" is an example of this type of ambiguous phone number. The first five digits "00965" could be a combination of the exit code "00" for Great Britain and the entry code "965" for Kuwait. The remainder "36745987" conforms to the MMR and a verification sequence for Kuwait. However, the first five digits "00965" could also be a combination of the exit code "009" for Nigeria and the entry code "65" for Singapore. The remainder "36745987" conforms to the MMR and a verification sequence for Singapore. Thus, "0096536745987" could be a phone number in Kuwait or Singapore.

Another type of ambiguous phone number is added to a contacts list while the user is located outside his or her home country. For instance, during a visit to another country, the phone number "0562425648" may be saved to the contacts list on the user's communication device. This phone number begins with the trunk prefix "0" which is the domestic prefix for 95 countries. Of these 95 countries, 64 countries have minimum and maximum rules that are satisfied by the remaining nine digits "562425648." The phone number could be from any of these 64 countries. The reformatting sequence cannot convert "0562425648" to the global dialing format because this phone number could be located in any of a multitude of countries.

During manual intervention, the user may interact with the app to reformat an ambiguous phone number. The user and the app may work together in several different ways. For example, the user may select an ISO country code from a list displayed on his or her communication device. The app may determine if the phone number conforms to the minimum, maximum, and verification rules for the country corresponding to the ISO country code selected by the user. If there is conformity, the app may reformat the phone number. If there is no conformity, there may be an alternative type of interaction that accomplishes the conversion of the phone number to the global dialing format. Manual intervention is explained in detail with reference to FIG. 9.

The logic sequence may continue at block 424 once manual intervention results in the reformatting of an ambiguous phone number. The reformatting sequence advances to block 424 whenever a phone number has been converted to the global dialing format. Reformatting may occur at blocks 408, 412, 416, 420, or 422 and the reformatting sequence may progress from any of these blocks to block 424. At block 424, the app may determine if the last phone number on the contacts list has been converted to the global dialing format. The logic sequence may end if the last of the contact phone numbers has been reformatted. If the contact phone number is not the last, the reformatting sequence continues at block 404 and another iteration of the loop begins. The loop repeats itself until all the contact phone numbers have been converted to the global dialing format.

Figure 5A:
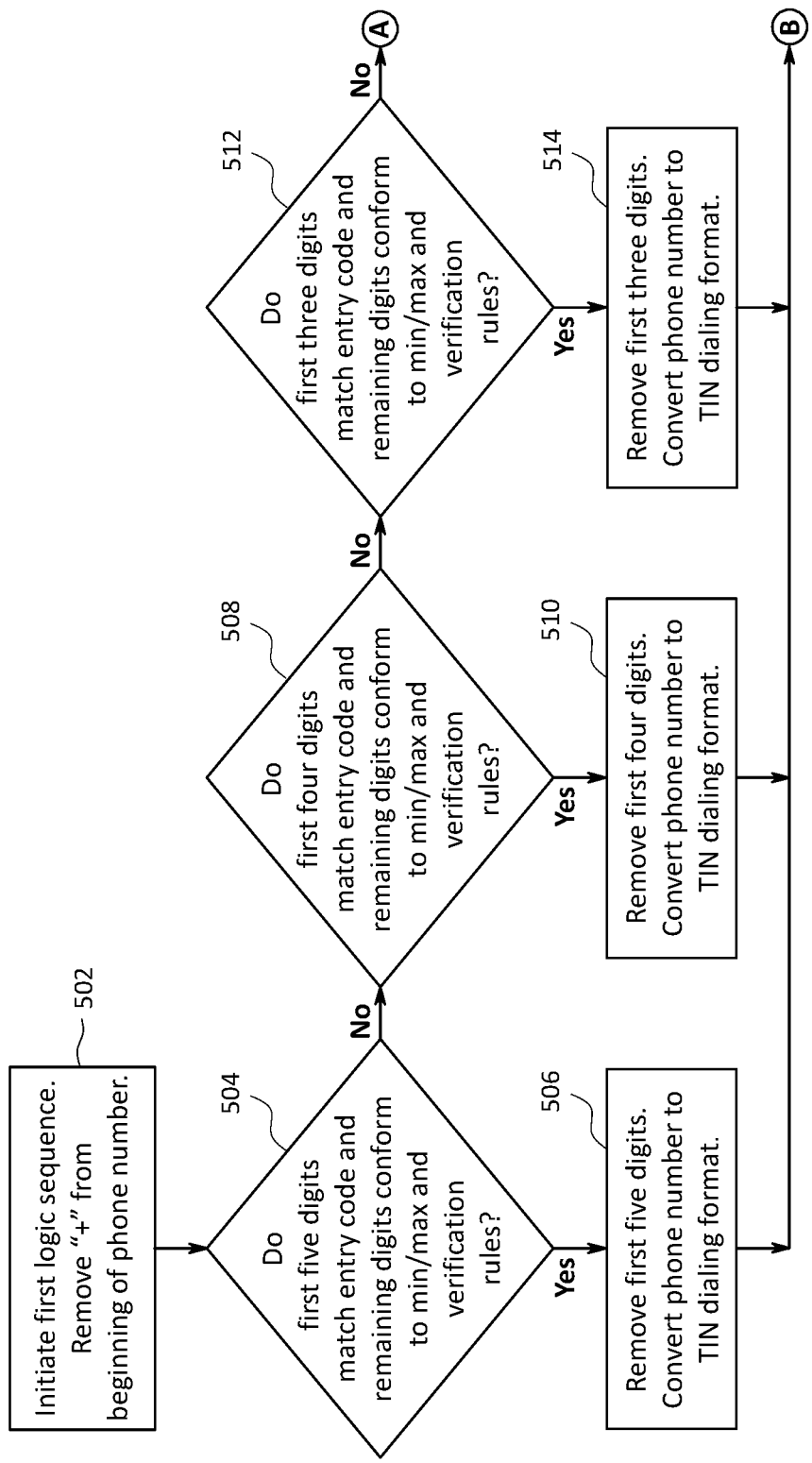
FIGS. 5A and 5B are a logic flow diagram for a first logic sequence of a reformatting sequence.
Figure 5B:
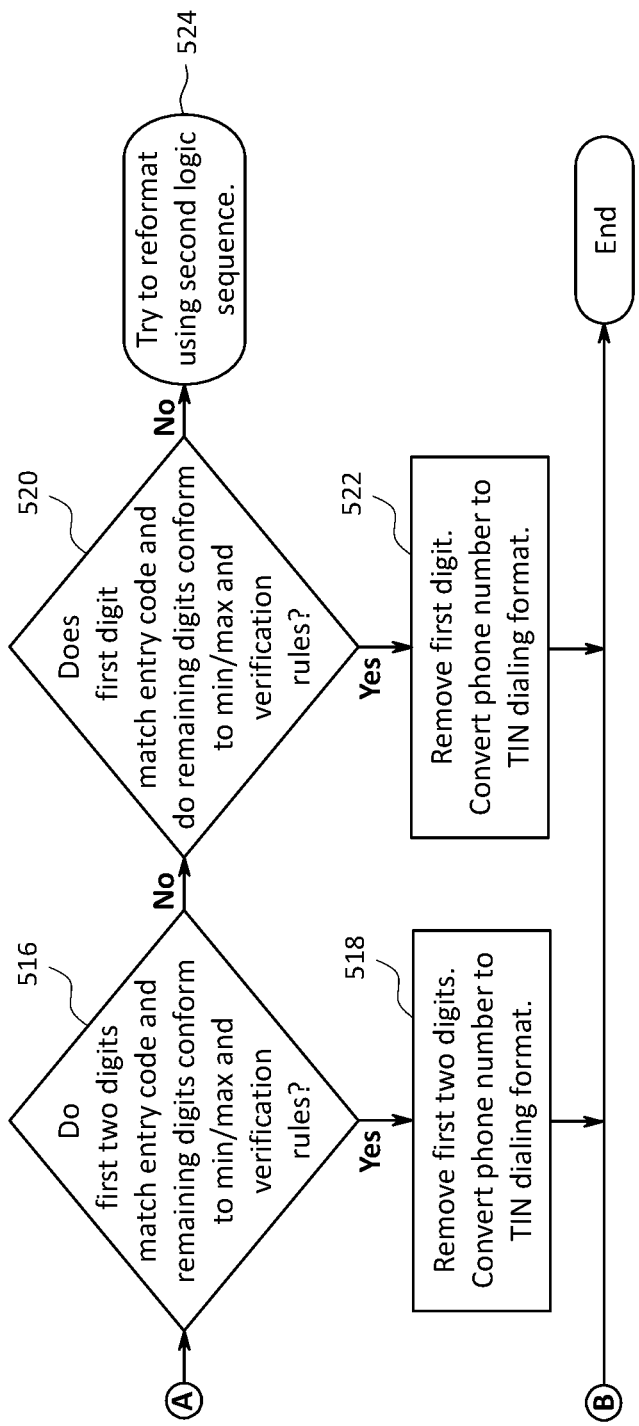

FIGS. 5A and 5B are a logic flow diagram for a first logic sequence of a reformatting sequence. The first logic sequence may be used to reformat phone numbers starting with a "+" symbol. The first logic sequence is the same as the "+" logic discussed with reference to FIGS. 4A and 4B.

The first logic sequence starts at block 502, where the "+" symbol may be removed from the beginning of a phone number. At block 504, the app may determine if the first five digits of the phone number match a country's entry code and the remaining digits conform to the country's minimum, maximum, and verification rules. In an embodiment, the dialing codes database (excerpted in FIGS. 36A and 36B) may be searched for an entry code that matches the first five digits of the phone number. If a match is found, the country associated with the entry code may be identified. The minimum and maximum rules for the country may be found in the dialing codes database and the verification rules may be found in the verification database (excerpted in FIG. 35).

The first logic sequence may continue at block 506 if the criteria at block 504 are satisfied. At block 506, the first five digits may be removed from the phone number and the remaining digits may be converted to the TIN dialing format "ISO.number." "ISO" corresponds to the ISO country code for the country having the matching entry code and "number" corresponds to the digits remaining after the first five digits have been removed. Hence, the TIN dialing format is a concatenation of the ISO country code for the destination country (i.e., the country to be called or texted) and the local phone number in the destination country.

The first logic sequence may continue at block 508 if the criteria at block 504 are not satisfied. At block 508, the app may determine if the first four digits of the phone number match a country's entry code and the remaining digits conform to the country's minimum, maximum, and verification rules. The first logic sequence may continue at block 510 if the criteria at block 508 are satisfied. At block 510, the first four digits may be removed from the phone number and the remaining digits may be converted to the TIN dialing format.

The first logic sequence may continue at block 512 if the criteria at block 508 are not satisfied. At block 512, the app may determine if the first three digits of the phone number match a country's entry code and the remaining digits conform to the country's minimum, maximum, and verification rules. The first logic sequence may continue at block 514 if the criteria at block 512 are satisfied. At block 514, the first three digits may be removed from the phone number and the remaining digits may be converted to the TIN dialing format.

The first logic sequence may continue at block 516 if the criteria at block 512 are not satisfied. At block 516, the app may determine if the first two digits of the phone number match a country's entry code and the remaining digits conform to the country's minimum, maximum, and verification rules. The first logic sequence may continue at block 518 if the criteria at block 516 are satisfied. At block 518, the first two digits may be removed from the phone number and the remaining digits may be converted to the TIN dialing format.

The first logic sequence may continue at block 520 if the criteria at block 516 are not satisfied. At block 520, the app may determine if the first digit of the phone number matches a country's entry code and the remaining digits conform to the country's minimum, maximum, and verification rules. The first logic sequence may continue at block 522 if the criteria at block 520 are satisfied. At block 522, the first digit may be removed from the phone number and the remaining digits may be converted to the TIN dialing format.

The first logic sequence may continue at block 524 if the criteria at block 520 are not satisfied. If block 524 is reached, the app has failed to reformat the phone number using the first logic sequence. At block 524, the first logic sequence may transition to the second logic sequence.

FIGS. 5A and 5B show one configuration of the first logic sequence. Blocks 504, 508, 512, 516, and 520 are queries that determine how the first logic sequence progresses. These blocks are arranged linearly in FIGS. 5A and 5B. Alternatively, the first logic sequence may be configured as a loop. Prior to execution of the loop, the "+" symbol may be removed from the beginning of the phone number and a current loop counter may be set to five.

The loop may commence when the phone number is divided into a beginning series having a number of digits equal to the current loop counter and a remaining series of digits equal to the phone number minus the beginning series of digits. The app may determine if the beginning series of digits matches a country's entry code and the remaining series of digits conforms to the country's minimum, maximum, and verification rules. If these criteria are satisfied, the beginning series of digits may be removed from the phone number and the remaining series of digits may be converted to the TIN dialing format "ISO.number." "ISO" corresponds to the ISO country code for the country having the matching entry code and "number" corresponds to the remaining series of digits. Hence, the TIN dialing format is a concatenation of the ISO country code for the destination country (i.e., the country to be called or texted) and the local phone number in the destination country.

If the criteria are not satisfied, the current loop counter may be decremented by one and the loop may be repeated. For example, the current loop counter would be equal to four when the loop iterates for the second time and the beginning series of digits would be four digits in length. The loop may repeat itself until the phone number is reformatted or five iterations have been completed. After five iterations, the first logic sequence has failed to reformat the phone number and the app may proceed to execute the second logic sequence.

Figure 6A:
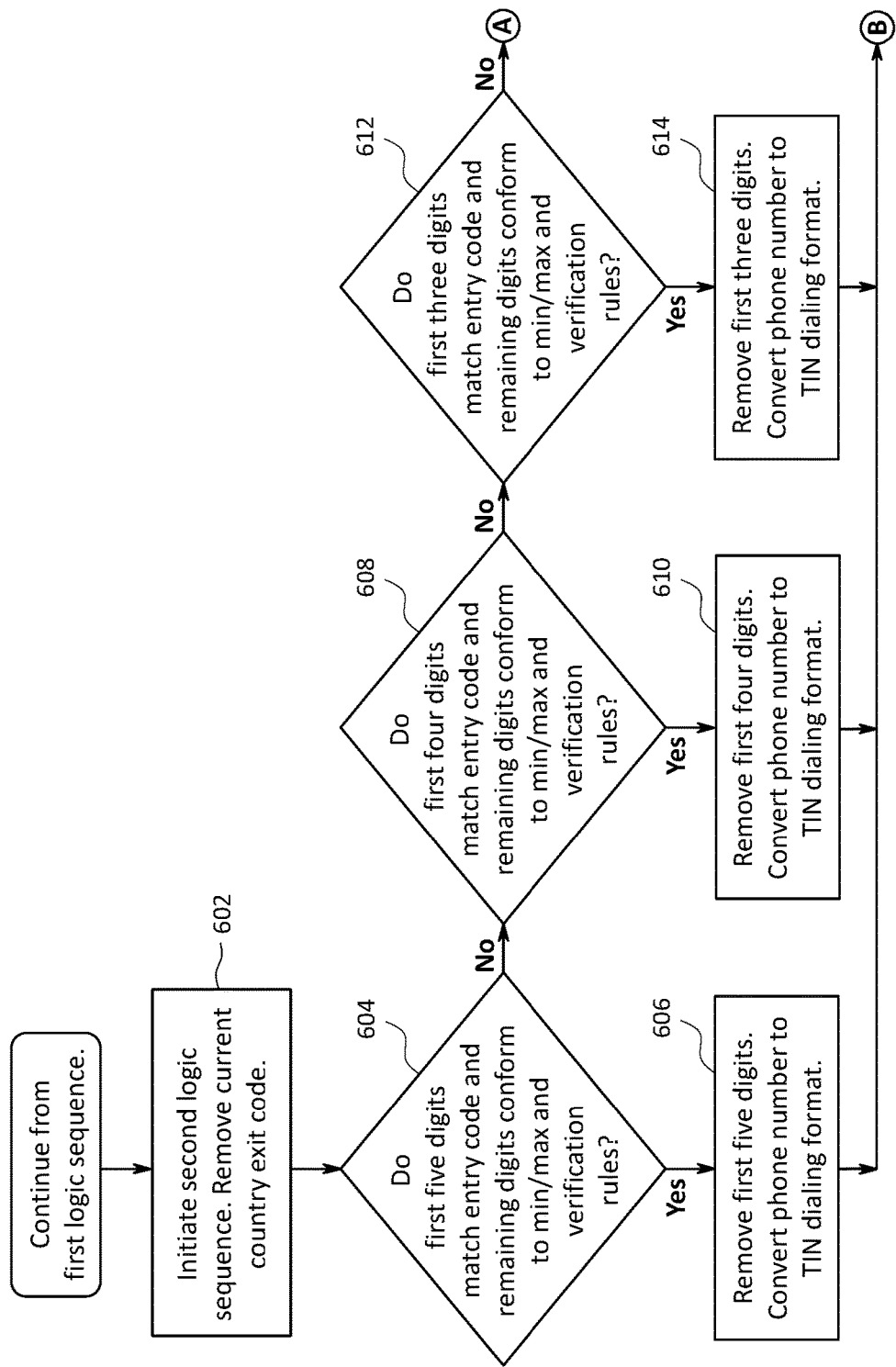
FIGS. 6A and 6B are a logic flow diagram for a second logic sequence of the reformatting sequence.
Figure 6B:
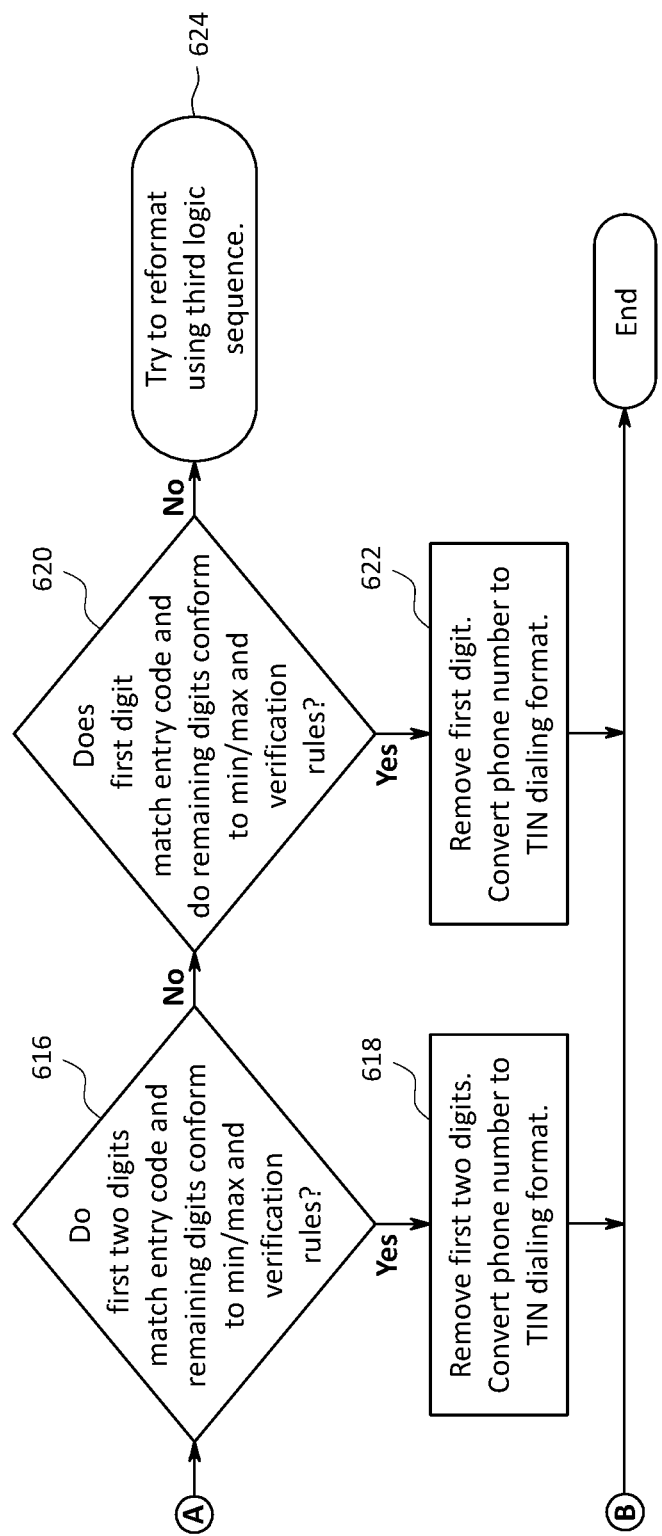

FIGS. 6A and 6B are a logic flow diagram for a second logic sequence of the reformatting sequence. The second logic sequence may be used to reformat phone numbers starting with the exit code for the user's home country.

The second logic sequence starts at block 602, where the exit code for the user's current country may be removed from the beginning of the phone number. A remainder of the phone number may result. At block 604, the app may determine if the first five digits of the remainder of the phone number match a country's entry code and the remaining digits conform to the country's minimum, maximum, and verification rules. In an embodiment, the dialing codes database (excerpted in FIGS. 36A and 36B) may be searched for an entry code that matches the first five digits of the remainder of the phone number. If a match is found, the country associated with the entry code may be identified. The minimum and maximum rules for the country may be found in the dialing codes database and the verification rules may be found in the verification database (excerpted in FIG. 35).

The second logic sequence may continue at block 606 if the criteria at block 604 are satisfied. At block 606, the first five digits may be removed from the remainder of the phone number and the remaining digits may be converted to the TIN dialing format "ISO.number." "ISO" corresponds to the ISO country code for the country having the entry code that matches the first five digits and "number" corresponds to the digits remaining after the first five digits have been removed. Hence, the TIN dialing format is a concatenation of the ISO country code for the destination country (i.e., the country to be called or texted) and the local phone number in the destination country.

The second logic sequence may continue at block 608 if the criteria at block 604 are not satisfied. At block 608, the app may determine if the first four digits of the remainder of the phone number match a country's entry code and the remaining digits conform to the country's minimum, maximum, and verification rules. The second logic sequence may continue at block 610 if the criteria at block 608 are satisfied. At block 610, the first four digits may be removed from the remainder of the phone number and the remaining digits may be converted to the TIN dialing format.

The second logic sequence may continue at block 612 if the criteria at block 608 are not satisfied. At block 612, the app may determine if the first three digits of the remainder of the phone number match a country's entry code and the remaining digits conform to the country's minimum, maximum, and verification rules. The second logic sequence may continue at block 614 if the criteria at block 612 are satisfied. At block 614, the first three digits may be removed from the remainder of the phone number and the remaining digits may be converted to the TIN dialing format.

The second logic sequence may continue at block 616 if the criteria at block 612 are not satisfied. At block 616, the app may determine if the first two digits of the remainder of the phone number match a country's entry code and the remaining digits conform to the country's minimum, maximum, and verification rules. The second logic sequence may continue at block 618 if the criteria at block 616 are satisfied. At block 618, the first two digits may be removed from the remainder of the phone number and the remaining digits may be converted to the TIN dialing format.

The second logic sequence may continue at block 620 if the criteria at block 616 are not satisfied. At block 620, the app may determine if the first digit of the remainder of the phone number matches a country's entry code and the remaining digits conform to the country's minimum, maximum, and verification rules. The second logic sequence may continue at block 622 if the criteria at block 620 are satisfied.

At block 622, the first digit may be removed from the remainder of the phone number and the remaining digits may be converted to the TIN dialing format.

The second logic sequence may continue at block 624 if the criteria at block 620 are not satisfied. If block 624 is reached, the app has failed to reformat the phone number using the second logic sequence. At block 624, the second logic sequence may transition to the third logic sequence.

FIGS. 6A and 6B show one configuration of the second logic sequence. Blocks 604, 608, 612, 616, and 620 are queries that determine how the second logic sequence progresses. These blocks are arranged linearly in FIGS. 6A and 6B. Alternatively, the second logic sequence may be configured as a loop. Prior to execution of the loop, the exit code for the user's current country may be removed from the beginning of the phone number. A remainder of the phone number may result. In addition, a current loop counter may be set to five.

The loop may commence when the remainder of the phone number is divided into a beginning series having a number of digits equal to the current loop counter and a remaining series of digits equal to the remainder of the phone number minus the beginning series of digits. The app may determine if the beginning series of digits matches a country's entry code and the remaining series of digits conforms to the country's minimum, maximum, and verification rules. If these criteria are satisfied, the beginning series of digits may be removed from the remainder of the phone number and the remaining series of digits may be converted to the TIN dialing format "ISO.number." "ISO" corresponds to the ISO country code for the country having the entry code that matches the beginning series of digits and "number" corresponds to the remaining series of digits. Hence, the TIN dialing format is a concatenation of the ISO country code for the destination country (i.e., the country to be called or texted) and the local phone number in the destination country.

If the criteria are not satisfied, the current loop counter may be decremented by one and the loop may be repeated. For example, the current loop counter would be equal to four when the loop iterates for the second time and the beginning series of digits would be four digits in length. The loop may repeat itself until the phone number is reformatted or five iterations have been completed. After five iterations, the second logic sequence has failed to reformat the phone number and the app may proceed to execute the third logic sequence.

Figure 7A:
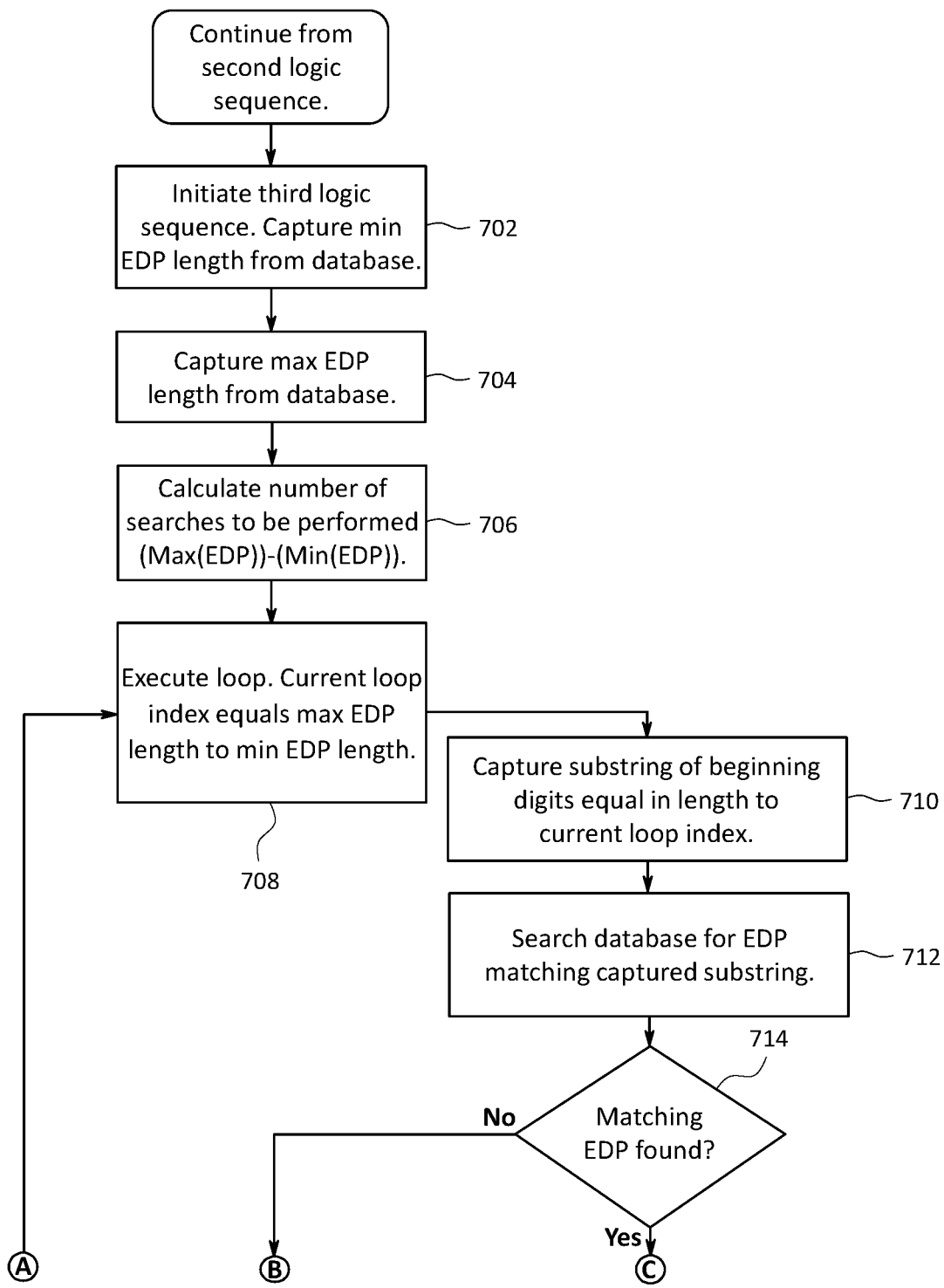
FIGS. 7A and 7B are a logic flow diagram for a third logic sequence of the reformatting sequence.
Figure 7B:
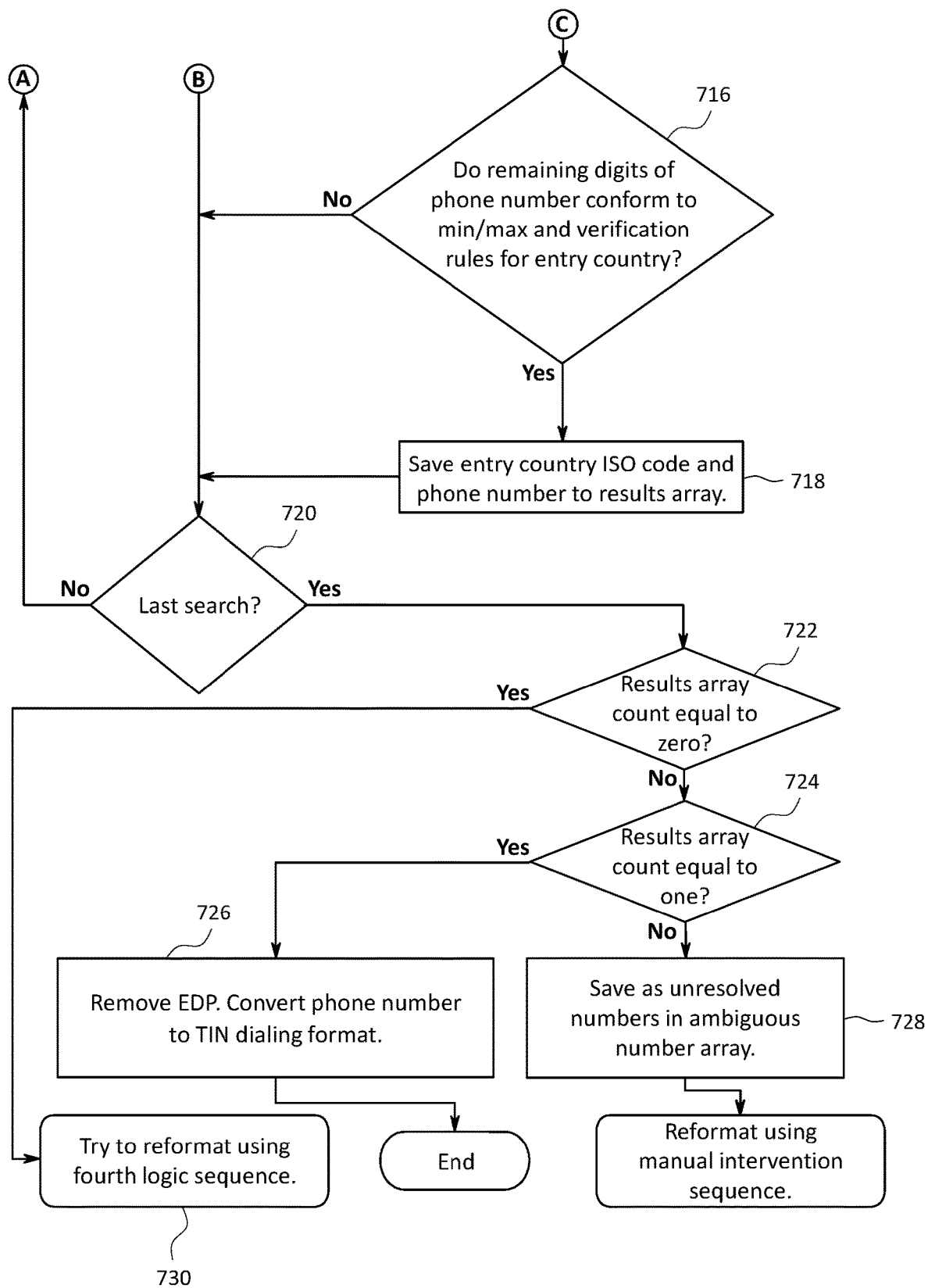

FIGS. 7A and 7B are a logic flow diagram for a third logic sequence of the reformatting sequence. The third logic sequence may identify an external dialing protocol (EDP) at the beginning of a phone number. An EDP is a combination of an exit code and an entry code. For example, an international phone call from the United States to Poland would have an EDP of "01148." This EDP is a combination of the exit code "011" for the United States and the entry code "48" for Poland.

The third logic sequence may begin at block 702, where a minimum EDP length may be captured from a database stored on the user's communication device. The database may contain all possible EDPs. The EDPs may be surveyed and the EDP(s) having the fewest number of digits may be identified. For example, the minimum EDP length may be equal to three. At block 704, the maximum EDP length may be captured from the database. For example, the maximum EDP length may be equal to eight.

At block 706, the app may determine how many times the database has to be searched to identify the EDP at the beginning of a phone number. The number of searches to be performed may be calculated by subtracting the minimum EDP length from the maximum EDP length. For example, the number of searches to be performed may be calculated by subtracting the minimum EDP length of three from the maximum EDP length of eight to obtain five.

A loop may be initiated at block 708. A search of the database may occur each time the loop iterates. Hence, the number of iterations of the loop may equal the number of searches calculated at block 706. For example, the loop may iterate five times. A current loop index for the first iteration may be equal to the maximum EDP length captured from the database. For example, the current loop index for the first iteration of the loop may be equal to eight. As the loop iterates, the current loop index may decrement until the number of completed iterations equals the calculated number of searches. For example, the second iteration of the loop may have a current loop index equal to seven and the current loop index may continue to decrement until five iterations have been completed. The last iteration may have a current loop index equal to three, the minimum EDP length captured from the database.

At block 710, the app may capture a substring of the digits at the beginning of the phone number. The number of digits in the captured substring may equal the current loop index. The capture of the substring may create a remainder of the phone number. The remainder is equal to the phone number minus the captured substring.

At block 712, the database stored on the user's communication device may be searched for an EDP that matches the captured substring. At block 714, the app may determine if a matching EDP has been located. If a match is found, the app may identify the country associated with the entry code in the EDP. This country is designated the destination country. The third logic sequence may advance to block 716 once the destination country has been identified. If a match is not found at block 714, the third logic sequence may continue at block 720.

At block 716, the app may determine if the remainder of the phone number conforms to the minimum, maximum, and verification rules for the destination country. If the criteria at block 716 are satisfied, the third logic sequence may continue at block 718, where the ISO country code for the destination country and the phone number are saved to a results array. The third logic sequence may progress to block 720. The third logic sequence may also advance to block 720 if the criteria at block 716 are not satisfied.

At block 720, the app may determine if the current search is the last search. If the criterion at block 720 is satisfied, the third logic sequence may continue at block 722. If the current search is not the last search, the third logic sequence may continue at block 708 and another iteration of the loop may begin.

At block 722, the app may determine if a results array count is equal to zero. The results array count is the number of phone numbers saved to the results array during the iterations of the loop. The third logic sequence may advance to block 730 if the results array count equals zero.

The empty results array may indicate that the substrings of the phone number's beginning digits did not match any of the combinations of exit codes and entry codes in the database stored on the user's communication device. Consequently, the phone number cannot be reformatted by the third logic sequence. At block 730, the fourth logic sequence may be invoked in an attempt to reformat the phone number using the minimum, maximum, and verification rules for the user's default country. The fourth logic sequence is explained in detail with reference to FIG. 8.

The third logic sequence may continue at block 724 if the results array count does not equal zero at block 722. At block 724, the app may determine if the results array count equals one. The third logic sequence may advance to block 726 if the results array contains a single phone number.

At block 726, the app may remove the substring from the beginning of the phone number. The substring may match a combination of an exit code and an entry code found in the database stored on the user's communication device. The substring may be the EDP for the phone number. The destination country may be determined from the entry code in the EDP. The phone number is converted to the TIN dialing format "ISO.number," where "ISO" is the ISO country code for the destination country and "number" is the digits of the phone number that remain after the EDP has been removed.

The third logic sequence may continue at block 728 if the results array count is not equal to one at block 724. At block 728, multiple phone numbers found during the series of searches may be saved as an unresolved numbers array. The phone numbers in the array are ambiguous; the first, second, and third logic sequences were unable to convert them to the TIN dialing format. Manual intervention is needed to reformat the unresolved phone numbers. Manual intervention is discussed in detail with reference to FIG. 9.

Figure 8:
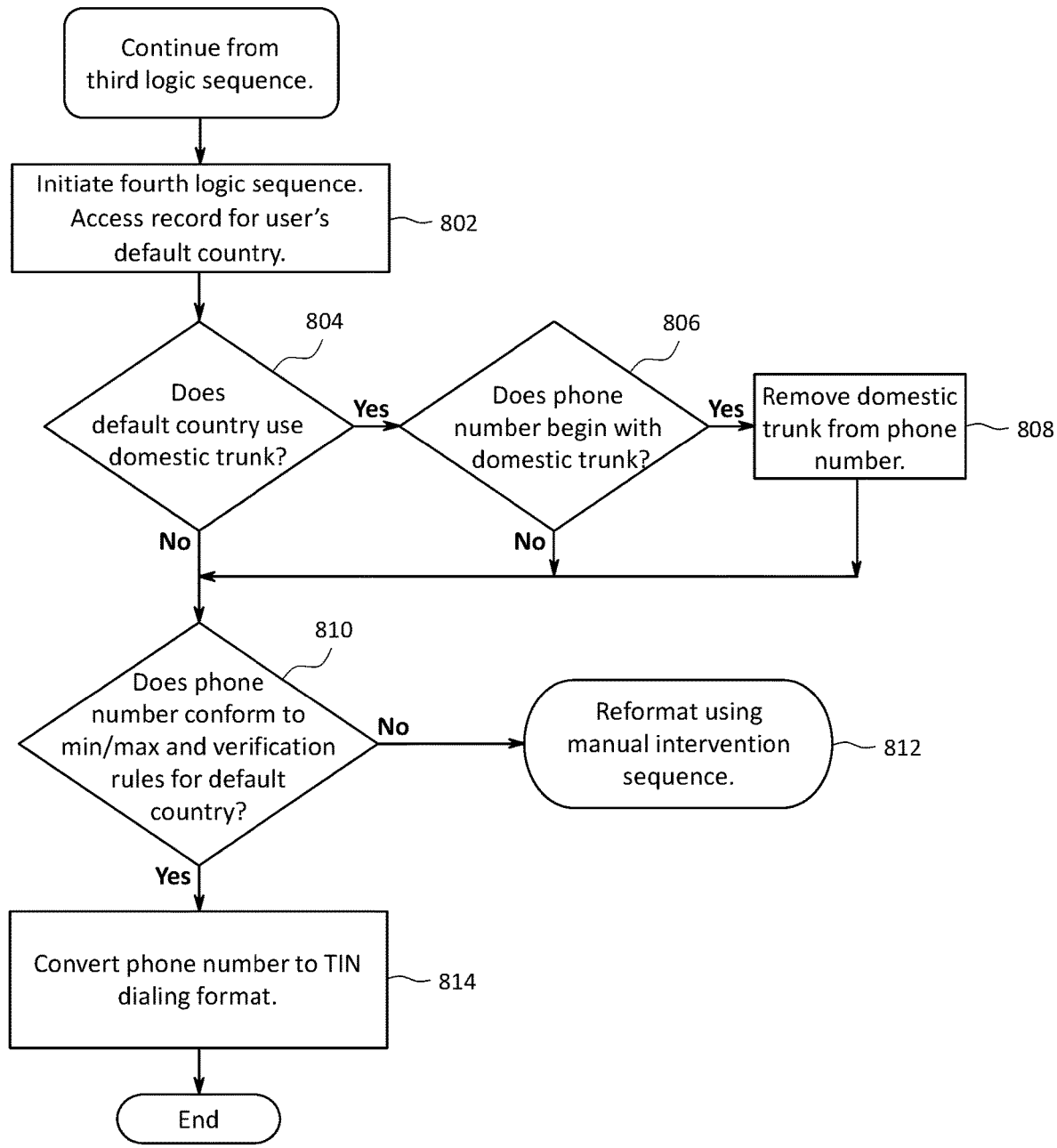
FIG. 8 is a logic flow diagram for a fourth logic sequence of the reformatting sequence.

FIG. 8 is a logic flow diagram for a fourth logic sequence of the reformatting sequence. The fourth logic sequence may convert domestic phone numbers to the global dialing format. The first, second, and third logic sequences may reformat international phone numbers. If a phone number has not been reformatted by one of these logic sequences, the phone number is most likely a domestic phone number and may be converted to the TIN dialing format by the fourth logic sequence.

At block 802, the record for the user's current country may be accessed in the dialing codes database (excerpted in FIGS. 36A and 36B). The record may be accessed to determine if the user's current country uses a domestic trunk. The domestic trunk may contain one to four digits that precede a domestic phone number. The terms "domestic trunk" and "local trunk prefix" may be used interchangeably.

At block 804, the app may determine if the dialing codes database indicates that the user's current country uses a domestic trunk. The fourth logic sequence may continue at block 806 if the criterion at block 804 is satisfied. Otherwise, the fourth logic sequence may continue at block 810.

At block 806, the app may determine if the phone number begins with the domestic trunk for the user's current country. If so, the fourth logic sequence may continue at block 808. If not, the fourth logic sequence may continue at block 810.

At block 808, the domestic trunk may be removed from the phone number. The fourth logic sequence may advance from block 808 to block 810. Block 810 may also be reached if the app determines that the user's current country does not use a domestic trunk at block 804. Alternatively, block 810 may be reached if the user's current country does use a domestic trunk, but the app determines that the phone number does not begin with the domestic trunk at block 806. The phone number that is the subject of the query at block 810 does not begin with the domestic trunk for the user's current country irrespective of the preceding block.

At block 810, the app may determine if the phone number conforms to the minimum, maximum, and verification rules for the user's current country. If the criteria at block 810 is not satisfied, the phone number cannot be reformatted by the fourth logic sequence and becomes available for manual intervention at block 812.

The fourth logic sequence may progress from block 810 to block 814 if the phone number conforms to the minimum, maximum, and verification rules for the user's current country. At block 814, the phone number may be reformatted. The phone number may be converted to the TIN dialing format "ISO.number," where "ISO" is the ISO country code for the user's current country and "number" is the phone number in the user's current country.

Figure 9:
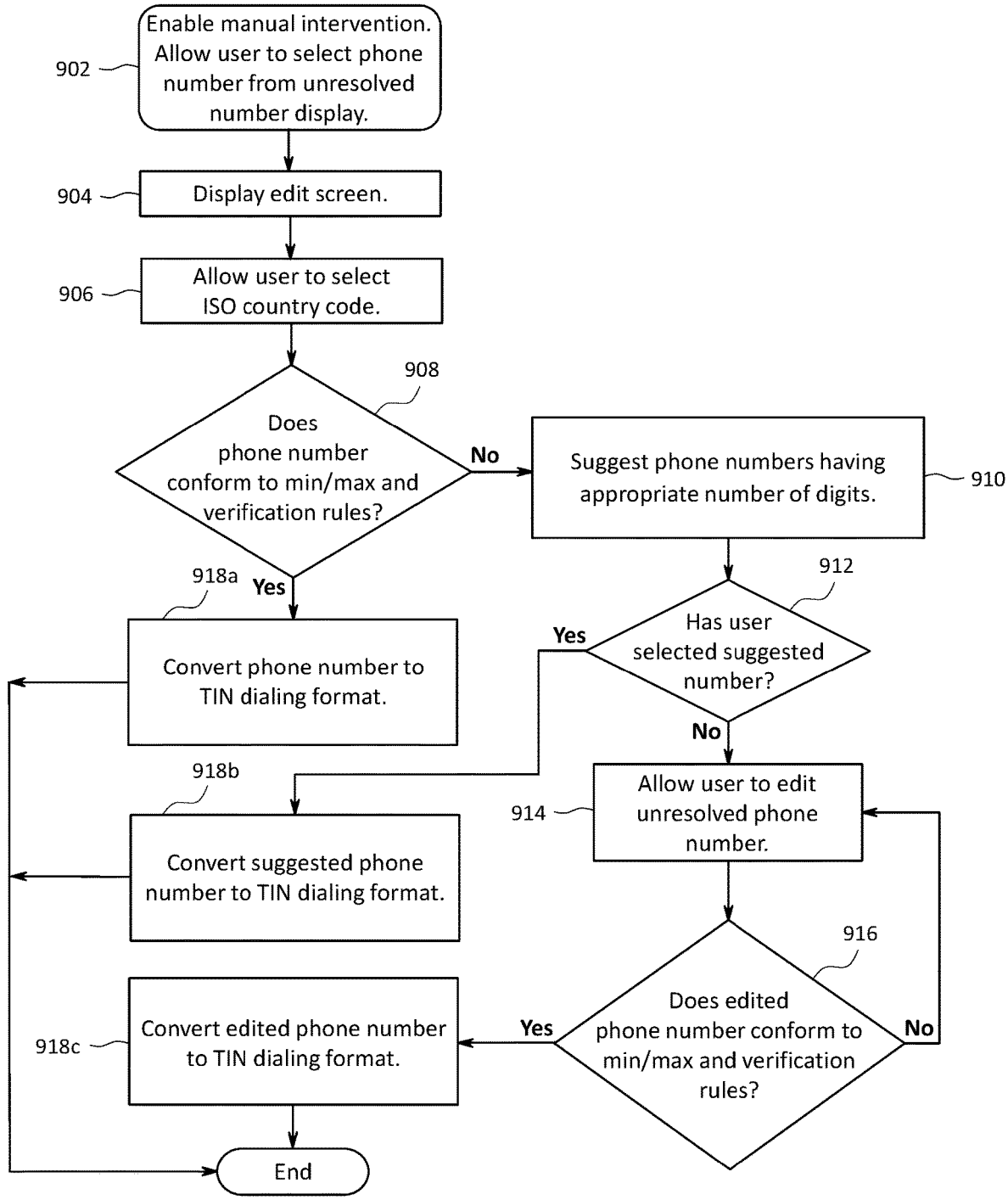
FIG. 9 is a logic flow diagram for a manual intervention sequence.

FIG. 9 is a logic flow diagram for a manual intervention sequence. Manual intervention may be used to convert an unresolved phone number to the TIN dialing format. An unresolved phone number cannot be reformatted by the reformatting sequence.

At block 902, the app may initiate manual intervention by allowing the user to select a phone number from the unresolved number display on his or her communication device. At block 904, the app may display the interface used to convert an unresolved phone number to the global dialing format. This interface is referred to as the edit screen. At block 906, the edit screen may allow the user to select the ISO country code for the destination country associated with the unresolved phone number. The selected ISO country code may be retrieved and saved.

The saved ISO country code may be used to retrieve the minimum, maximum, and verification rules for the destination country. To retrieve the rules, the ISO country code may be used to identify the destination country's record in the dialing codes database (excerpted in FIGS. 36A and 36B). The record for the destination country may be accessed and the minimum and maximum rules may be captured. To retrieve the verification rules (i.e., the verification sequences), the ISO country code may be used to identify the destination country's record in the verification database (excerpted in FIG. 35). The record for the destination country may be accessed and the verification rules may be captured. Hence, the minimum, maximum, and verification rules for the destination country may be available for use at block 908.

At block 908, the app may determine if the unresolved phone number conforms to the captured minimum, maximum, and verification rules. The logic sequence may advance to block 918a if the criteria at block 908 are satisfied. At block 918a, the phone number may be converted to the TIN dialing format "ISO.number." "ISO" is the ISO country code selected by the user at block 906 and "number" is the phone number selected by the user at block 902.

The manual intervention sequence may continue at block 910 if the phone number does not conform to the minimum, maximum, and verification rules at block 908. At block 910, the app may suggest phone numbers that range in length from the minimum number of digits to the maximum number of digits specified in the minimum and maximum rules for the destination country.

At block 912, the app may determine if the user selected a suggested phone number. The manual intervention sequence may continue at block 918b if a suggested phone number has been selected. At block 918b, the suggested phone number may be converted to the TIN dialing format "ISO.number," where "ISO" is the ISO country code for the destination country and "number" is the suggested phone number selected by the user.

The manual intervention sequence may continue at block 914 if the user does not select a suggested phone number. At block 914, the app may allow the user to edit the unresolved phone number selected at block 902. The user may edit the phone number using the edit screen displayed on his or her communication device.

At block 916, the app may determine if the edited phone number conforms to the minimum, maximum, and verification rules for the destination country. The manual intervention sequence may return to block 914 if the edited phone number does not satisfy the criteria at block 916. At block 914, the user may further edit the phone number. The manual intervention sequence may continue at block 916, where the app may determine if the additional editing has resulted in a phone number that conforms to the minimum, maximum, and verification rules for the destination country. The manual intervention sequence may once again return to block 914 if the phone number still fails to satisfy the criteria at block 916. Execution of blocks 914 and 916 may continue until the edited phone number conforms to the minimum, maximum, and verification rules for the destination country. The manual intervention sequence may advance to block 918c once the edited phone number satisfies the criteria at block 916.

At block 918c, the manual intervention sequence may reformat the conforming phone number. The phone number may be converted to the TIN dialing format "ISO.number," where "ISO" is the ISO country code selected by the user and "number" is the edited phone number.

FIG. 10 is an illustration of a screen that appears on a user's communication device during the manual intervention sequence. The screen is one of a number of screens that may be displayed when user input is needed. The screen may allow the user to select the country associated with an unresolved phone number.

In the embodiment shown, the unresolved phone number "07056835411" needs to be converted to the TIN dialing format. Before conversion can occur, the user has to enter the country associated with the phone number. To accomplish this, the user taps the country field 1002 and enters the first letter of the associated country's name. A dropdown list appears on the screen. The names of the listed countries all start with the letter entered by the user. The user selects the correct country from the dropdown list. For example, Nigeria may be the country associated with the unresolved phone number "07056835411." The user taps the country field 1002 and enters the letter "N." The countries having names that begin with "N" appear in the dropdown list. The user selects "Nigeria" and the record for Jack Jones is updated.

FIG. 11 is an illustration of a screen that displays unresolved phone numbers. For example, Nigeria may have been selected from the dropdown list that appeared after the user entered the letter "N" in the country field 1002 shown in FIG. 10. The screen shown in FIG. 11 displays stored phone numbers that conform to the verification rules for Nigeria.

The user selects one of the phone numbers displayed on the screen. For example, the user may select the phone number "7056835411." The selected phone number is converted to the TIN dialing format. The concatenation that results is "NGA.7056835411," where "NGA" is the ISO country code for Nigeria and "7056835411" is the selected phone number. If the user does not select a displayed phone number, he or she may choose the manual entry option or the cancel option.

Figure 12:
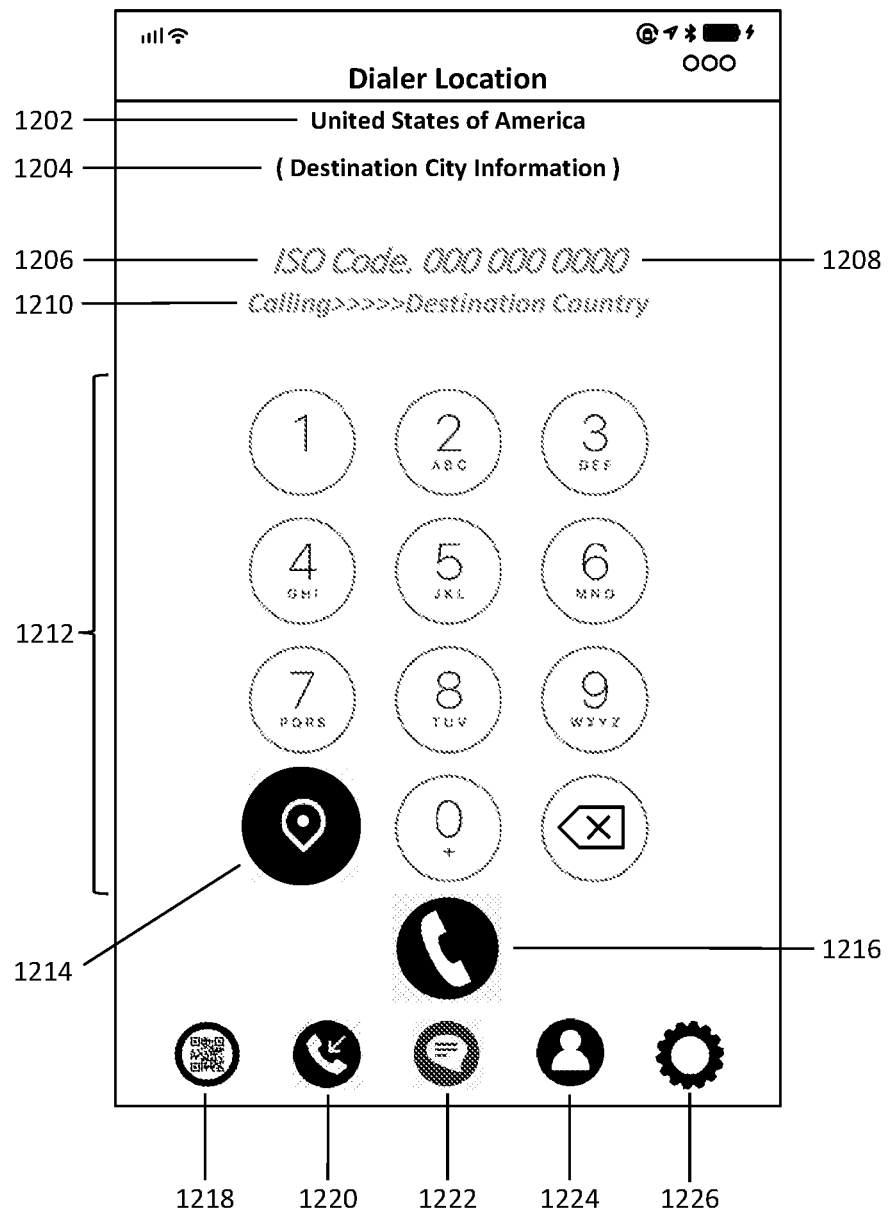
FIG. 12 is an illustration of a home screen that appears on the user's communication device after launch of the app.

FIG. 12 is an illustration of a home screen that appears on the user's communication device after launch of the app. A dialer location field 1202 displays the country in which the communication device is currently located. In FIG. 12, the dialer location field 1202 indicates that the communication device is located in the "United States of America." The dialer location may be automatically determined. However, there may be some instances when the communication device is unable to detect the current country. When this occurs, the user may tap the dialer location field 1202, enter the first few letters of the name of the current country, and select the current country from the dropdown list that appears.

Once a phone number has been dialed, a destination city field 1204 may display the city that is the destination of the phone call. The destination city field 1204 may help the user determine if the phone number has been dialed correctly. For example, if the user inadvertently dials an incorrect phone number, the destination city field 1204 may display a city other than the intended destination city. When this occurs, the user may realize that he or she dialed an incorrect phone number and may retry entering the correct phone number.

For some countries, the destination city field 1204 may display geographical areas instead of cities. For other countries, the app may determine if the recipient device is a mobile device or a land line. Accordingly, the type of the recipient device may be displayed in the destination city field 1204 along with the destination city. If an international phone number is dialed, the destination city field 1204 may display the destination city along with the local date and time.

An ISO country code field 1206 may be used to select the destination country. The user may tap the ISO country code field 1206 and a dropdown list appears. The user selects the appropriate country from the list and the ISO country code for the selected country appears in the ISO country code field 1206.

The app may compare the destination country that has the ISO country code displayed in the ISO country code field 1206 to the country displayed in the dialer location field 1202. The user is making a domestic phone call if the two countries are the same. If the two countries are different, the user is making an international phone call.

A phone number field 1208 may show the local phone number dialed by the user. The local phone number is in the destination country having the ISO country code displayed in the ISO country code field 1206. The ISO country code and the local phone number are combined to display the phone number in the TIN dialing format "ISO.number," where "ISO" is the ISO country code for the destination country and "number" is the local phone number in the destination country.

A calling field 1210 may display the country that is the destination of the phone call. The destination country appearing in the calling field 1210 should be the same as the destination country the user intends to call. If the two are different, the user did not select the correct country from the dropdown list that appeared after he or she tapped the ISO country code field 1206. The user should continue to tap the ISO country code field 1206 and select a country from the dropdown list until the country displayed in the calling field 1210 is the same as the country the user plans to call.

A keypad 1212 may enable the user to dial a local phone number in the destination country. The dialed local phone number may be shown in the phone number field 1208. Accordingly, the user may review the displayed phone number to determine if the phone number was dialed correctly.

An automatic country locator 1214 may be a global positioning system (GPS) receiver that determines the country in which the communication device is currently located. The current country is displayed in the dialer location field 1202. The automatic country locator 1214 does not function when there is a GPS outage. The user may compensate for the failure of the automatic country locator 1214 by using the dialer location field 1202 to select the current country. As explained above, the user may tap the dialer location field 1202, enter the first few letters of the name of the current country, and select the current country from the dropdown list that appears.

The user may tap the caller icon 1216 to place a phone call after he or she has confirmed that the appropriate destination country is displayed in the calling field 1210 and the correct local phone number appears in the phone number field 1208. The TIN dialing logic adds the appropriate codes or prefixes to the dialed number and the concatenated phone number is passed to a telecommunications network by the communication device. The network routes the phone call to its intended recipient.

A QR code icon 1218 may be located at the bottom of the dialer screen. The QR code menu appears once the QR code icon 1218 is tapped. Options on the QR code menu enable the user to import and export contact information using QR codes. The QR code menu and its options are explained in detail with reference to FIG. 13.

A call log icon 1220 may be located at the bottom of the dialer screen adjacent to the QR code icon 1218. The call log icon 1220 is tapped to make the call log appear. The call log is a list of phone numbers called by the user. Both domestic and international phone numbers are included. The phone numbers are saved to the call log in the TIN dialing format. The call log is explained in detail with reference to FIG. 14.

A texting icon 1222 may be located next to the call log icon 1220 at the bottom of the dialer screen. The texting menu appears once the texting icon 1222 has been tapped. A text message may be initiated in several ways. The options available on the texting menu allow the user to select how he or she intends to initiate a text. The texting menu and its options are explained in detail with reference to FIG. 15.

A contacts icon 1224 may be adjacent to the texting icon 1222 near the bottom of the dialer screen. The contacts icon 1224 is tapped and the contacts list appears. The contacts are saved to the list by the user. The contacts list may be displayed in one of several ways as explained in detail with reference to FIG. 16. Further, phone calls may be made from the contacts list as explained in detail with reference to FIG. 22.

A settings icon 1226 may be the last of the icons found at the bottom of the dialer screen. A settings menu is displayed when the settings icon 1226 is tapped. The menu lists the settings that may be changed. The user selects the setting he or she wants to change. Several options appear. The user chooses the option that matches his or her preference for the selected setting. In this manner, the user customizes the various settings for the communication device.

Figure 13:
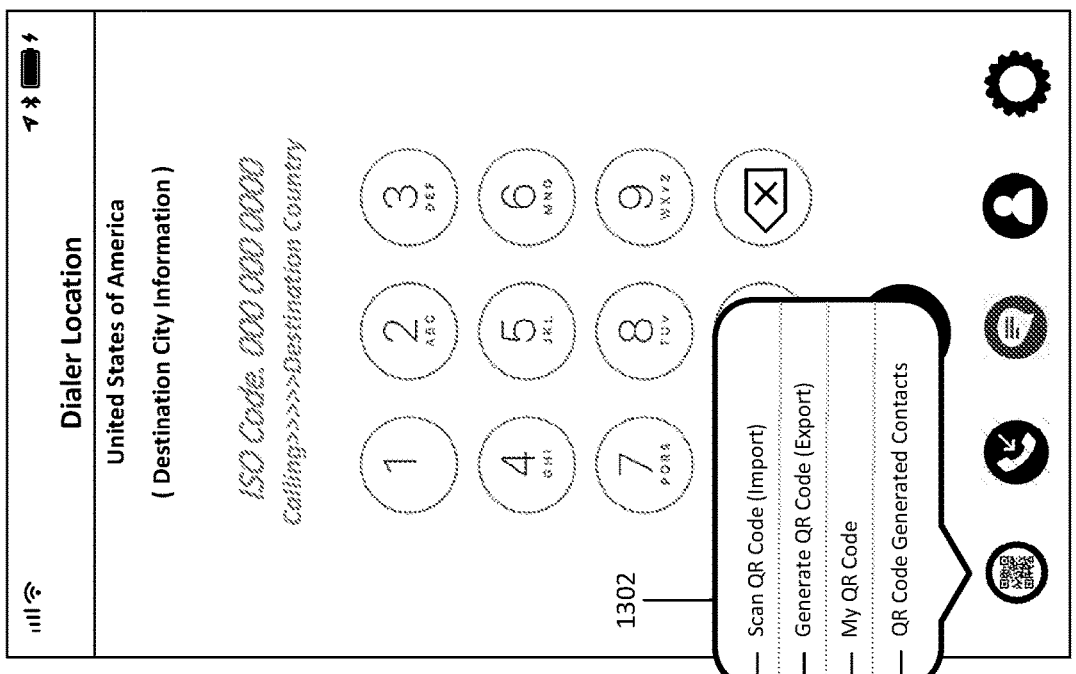
FIG. 13 is an illustration of the dialer screen after the QR code icon has been selected.

FIG. 13 is an illustration of the dialer screen after the QR code icon 1218 has been selected. The QR code menu 1302 appears and its options allow the user to import or export contact information contained in QR codes. When "Scan QR Code (Import)" 1304 is selected, the user may use the camera on his or her communication device to capture a QR code displayed on another user's communication device. In this manner, the user obtains the contact information represented by the QR code. The import of QR codes is explained in detail with reference to FIG. 25.

The app displays a list of contacts when "Generate QR Code (Export)" 1306 is selected. The user chooses the contacts whose information he or she will export. The app may generate a QR code that contains the information about the contacts. Another user may use the camera on his or her communication device to capture the QR code that is generated and then displayed on the user's communication device. In this manner, the user shares the contact information represented by the QR code. The export of QR codes is explained in detail with reference to FIG. 24.

When "My QR Code" 1308 is selected, the app displays the QR code that represents the user's contact information. The user chooses this option when he or she wants to use a QR code to export his or her contact information only.

When "QR Code Generated Contacts" 1310 is selected, the app may display a database containing contacts whose information was imported via a QR code. A contact may be selected from the list and his or her information may be displayed. The contact information was extracted from an imported QR code.

Figure 14:
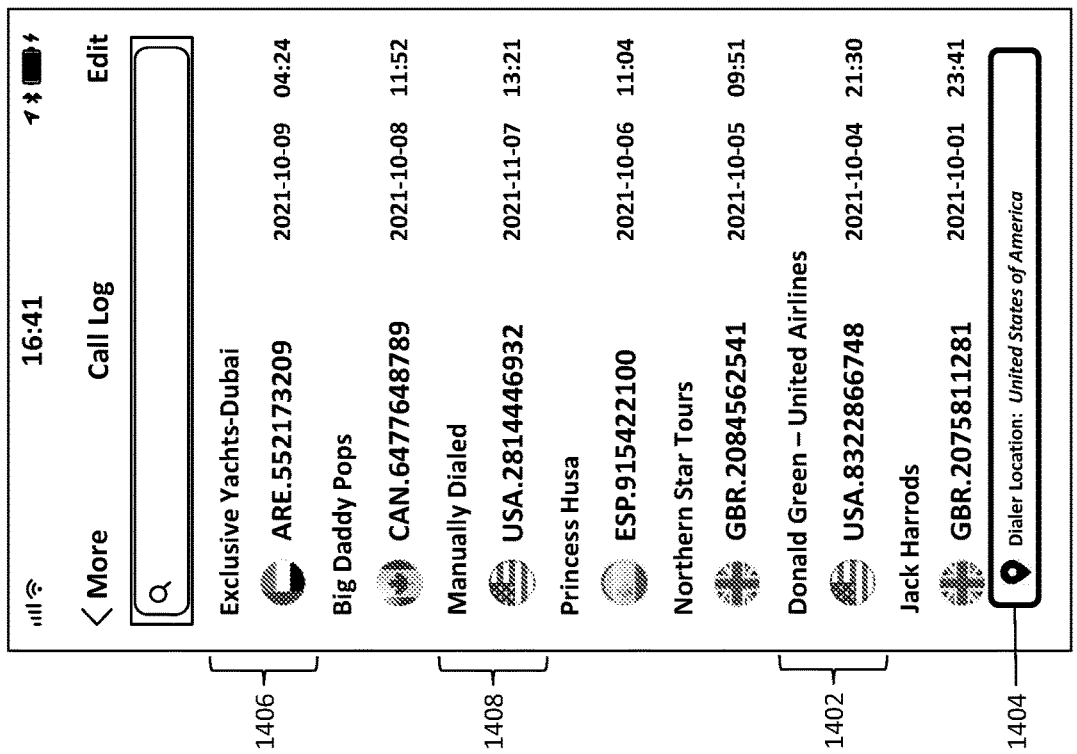
FIG. 14 is an illustration of a call log on the user's communication device.

FIG. 14 is an illustration of a call log on the user's communication device. The call log is a list of phone numbers called by the user. The phone numbers are saved to the call log in the TIN dialing format. Accordingly, each phone number is displayed as a concatenation of the three-letter ISO country code for the destination country and the local phone number in the destination country. Further, each phone number may be preceded by an icon representing the destination country's flag. For example, Donald Green's phone number 1402 is a combination of the ISO country code for the United States "USA" and a ten-digit United States phone number "8322866748." An icon representing the flag of the United States appears to the left of the TIN-formatted phone number. In addition, each phone number may be followed by the date and time it was called. For example, Donald Green's phone number 1402 was called on "2021-10-04" at "21:30."

The call log may display domestic and international phone numbers called by the user. A current country field 1404 indicates that the communication device is located in the "United States of America." Accordingly, for the call log shown in FIG. 14, domestic phone numbers begin with the ISO country code "USA." For example, Donald Green's phone number 1402 begins with "USA" and is, therefore, a domestic phone number. In contrast, international phone numbers begin with an ISO country code other than "USA." For example, Exclusive Yachts' phone number 1406 begins with "ARE," the ISO country code for the United Arab Emirates. Hence, this phone number is an international phone number.

In addition, the call log may indicate if a phone number was dialed manually. For example, "Manually Dialed" appears above the phone number "USA.2814446932" 1408. As such, the user dialed this phone number using the default dialer application. The remaining phone numbers were called by selecting them from the contacts list, a call log entry, or a QR code entry. (See FIG. 3B).

Figure 15:
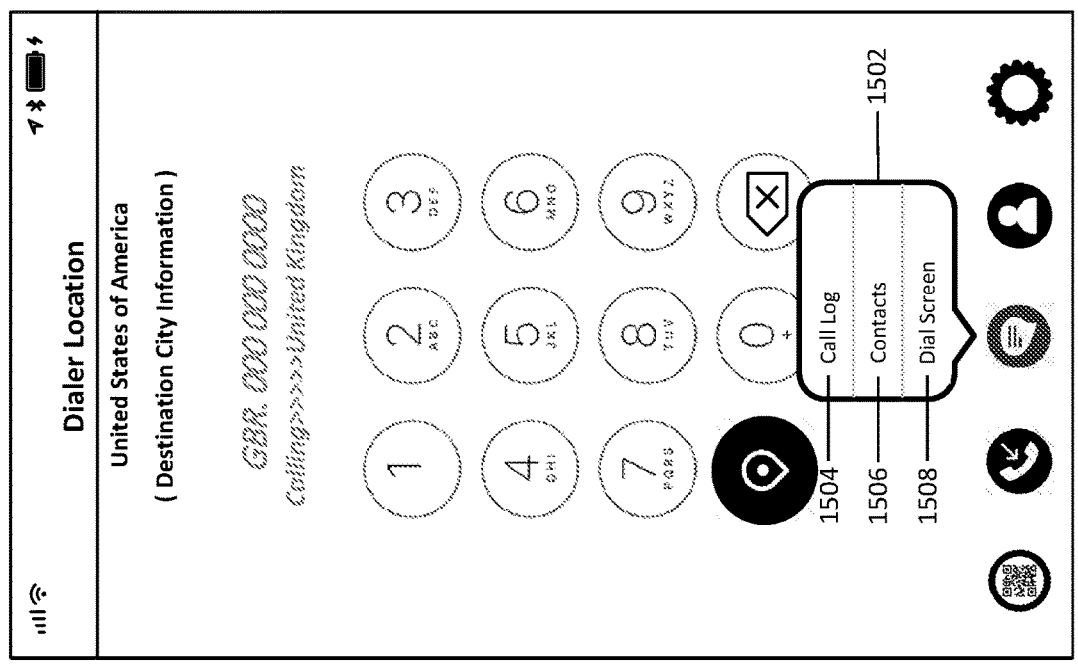
FIG. 15 is an illustration of the dialer screen on a communication device after the texting icon has been selected.

FIG. 15 is an illustration of the dialer screen on a communication device after the texting icon 1222 has been selected. The texting menu 1502 appears and the user may select one of the options to initiate a text message. When "Call Log" 1504 is chosen, the app may display the call log and the user may select a phone number to receive the text. The call log is explained in detail with reference to FIG. 14. When "Contacts" 1506 is chosen, the app may display the list of contacts saved by the user. A phone number may be selected to receive the text. The contacts list is explained in detail with reference to FIG. 16. When "Dial Screen" 1508 is chosen, the app may display the dialer screen shown in FIG. 12. The user is allowed to enter the phone number to be texted using the ISO country code field 1206 to select the country where the text's recipient is located and the keypad 1212 to manually enter the recipient's local phone number.

Figure 16:
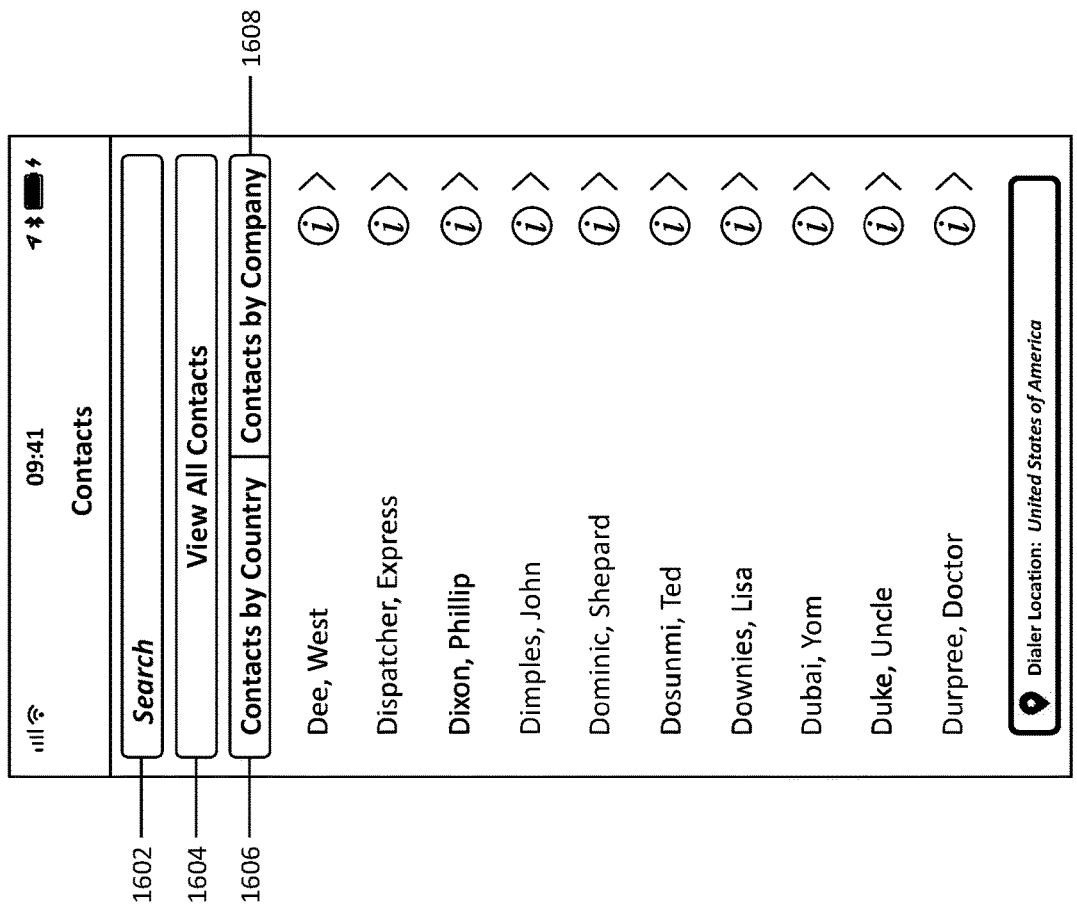
FIG. 16 is an illustration of a screen that appears on the communication device after the contacts icon has been selected.

FIG. 16 is an illustration of a screen that appears on the communication device after the contacts icon 1224 has been selected. The list on the screen is a compilation of the contacts saved by the user. The names of the contacts are listed in alphabetical order on the left side of the screen. To the right of each name is a stylized "i" in a circle and an arrowhead pointing to the right. When this combination is tapped, the information about the corresponding contact is displayed. The information may include first name, last name, company, local phone number, and ISO country code for the country in which the phone number is registered.

There is a search function 1602 that may assist the user in locating a particular contact. Further, the contacts may be listed in one of three ways depending upon the user's preference. All contacts are listed if "View All Contacts" 1604 is chosen. Alternatively, the contacts may be grouped. If "Contacts by Country" 1606 is selected, the screen displays the contacts grouped by country. The contacts are grouped by company if "Contacts by Company" 1608 is selected.

Figures 17, 18:
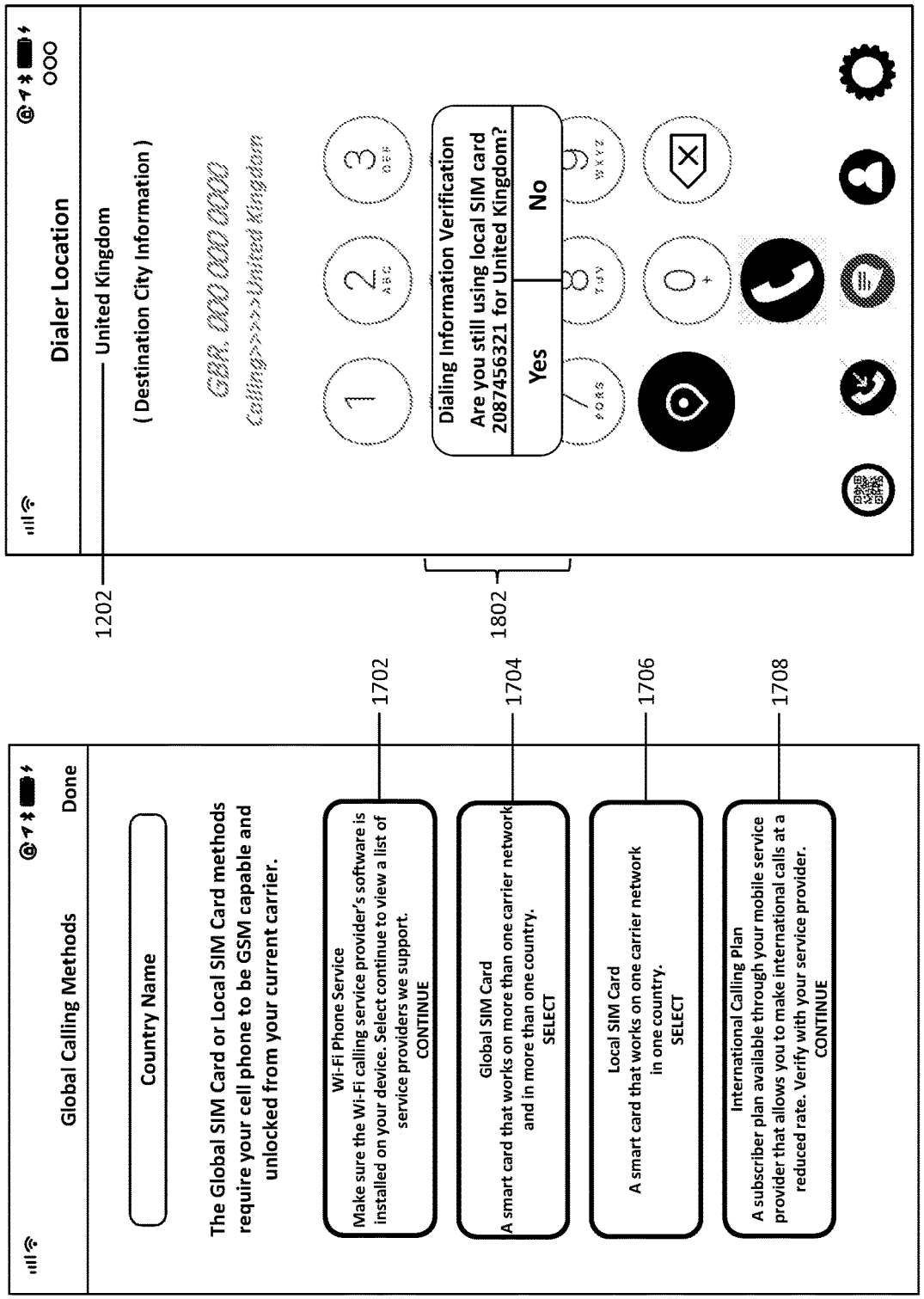
FIG. 17 is an illustration of a screen that shows global calling methods available on the communication device.
FIG. 18 is an illustration of a screen that asks for verification of dialing information when a local SIM card option is selected.

FIG. 17 is an illustration of a screen that shows global calling methods available on the communication device. The screen may appear when the app determines that the user's current country differs from his or her home country. The screen allows the user to select a method for calling TIN-formatted phone numbers saved on the user's communication device. The calling methods may include "Wi-Fi Phone Service" 1702, "Global SIM Card" 1704, "Local SIM Card" 1706, and "International Calling Plan" 1708.

"Wi-Fi Phone Service" 1702 enables the user to call multiple countries by connecting his or her communication device to a Wi-Fi network. When "Wi-Fi Phone Service" 1702 is selected, a list of Wi-Fi service providers is displayed. These service providers are supported by the user's wireless carrier. "Global SIM Card" 1704 is a smart card that allows the user to access multiple carrier networks in multiple countries. "International Calling Plan" 1708 is a subscriber plan available from a mobile service provider that permits the user to make international phone calls at reduced rates.

"Local SIM Card" 1706 is a smart card that allows the user to access a single carrier network in a certain area of the world. In some areas, each SIM provider (telecommunications carrier) has its own exit code. As a result, multiple exit codes may be used in these areas. Countries with multiple exit codes include Australia, Bolivia, Brazil, Cambodia, Chile, Colombia, Fiji, Finland, Ga., Indonesia, Israel, Palau, Peru, Singapore, South Korea, and Thailand. Other areas having multiple exit codes include Hong Kong and Taiwan.

When a phone call is made from an area having multiple exit codes, a list of local telecommunications carriers may be displayed after "Local SIM Card" 1706 is selected from the screen shown in FIG. 17. In an embodiment, the user may choose a carrier from the list. A multiple carriers database (excerpted in FIG. 37) is accessed to determine the exit code for the selected carrier.

FIG. 18 is an illustration of a screen that asks for verification of dialing information when a local SIM card option is selected. In an embodiment, the user may have traveled to the United Kingdom and used a local SIM card to make domestic phone calls (i.e., phone calls that originate and terminate in the United Kingdom).

When the user returns to the UK, "United Kingdom" may appear in the dialer location field 1202. The user's communication device may remember that a local SIM card was used during the user's previous visit to the United Kingdom. The communication device may display a query 1802 asking if the user wants to use the same local SIM card during his or her current visit. If the user selects "Yes," the local SIM card is once again the selected calling method. If the user selects "No," he or she is returned to the screen shown in FIG. 17. From this screen, the user may select a different calling method.

Figures 19, 20:
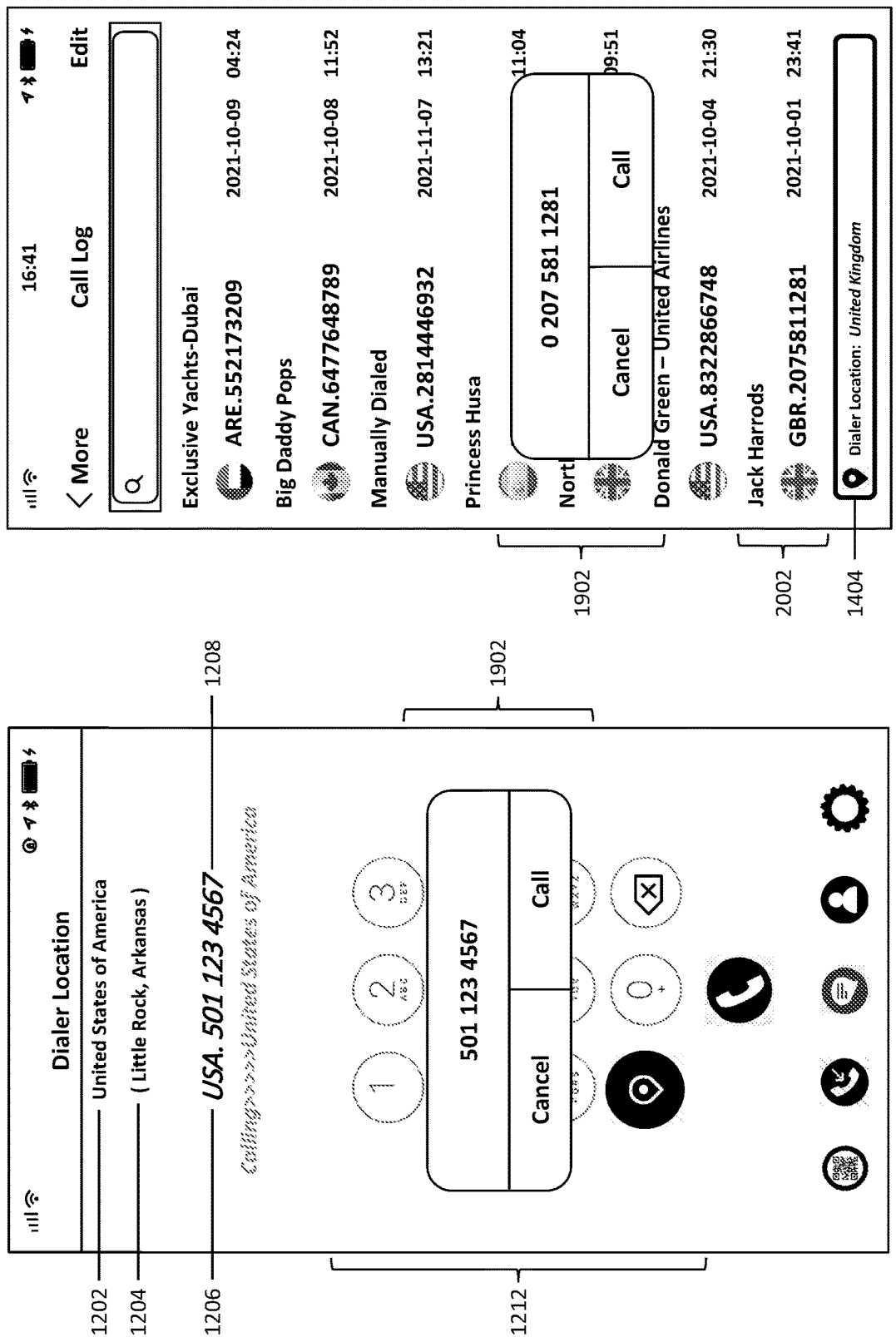
FIG. 19 is an illustration of a screen used to make a domestic phone call.
FIG. 20 is an illustration of a screen used to make a phone call from the call log on the user's communication device.

FIG. 19 is an illustration of a screen used to make a domestic phone call. In particular, this screen may be used to manually dial a domestic phone number. To place a domestic call, the country appearing in the dialer location field 1202 has to match the country represented by the ISO country code displayed in the ISO country code field 1206. This situation is depicted in the embodiment shown in FIG. 19. The "United States of America" appears in the dialer location field 1202 and the United States has the ISO country code "USA" displayed in the ISO country code field 1206. However, the user may not have to select "United States" from the dropdown list that appears when the ISO country code field 1206 is tapped. Instead, the ISO country code field 1206 may default to the ISO country code for the current country.

The keypad 1212 may be used to manually enter the domestic phone number. The app may determine if the user dialed a series of digits that satisfies the current country's dialing protocol. If the protocol is satisfied, the series of digits may be displayed in the phone number field 1208 and in a notification 1902. In FIG. 19, the user has dialed the series of digits "501 123 4567." The dialing protocol of the United States is satisfied because there are ten digits in the series of digits dialed by the user. Accordingly, the series of digits "501 123 4567" appears in the phone number field 1208 and the notification 1902.

The notification 1902 may offer the user two options—"Call" or "Cancel"—in addition to displaying the dialed series of digits. The user selects "Call" if the series of dialed digits is the phone number he or she wants to call. The user selects "Cancel" if the series of digits does not constitute the phone number of the intended recipient.

The destination city field 1204 may help the user determine if the phone number was dialed correctly. For example, the intended recipient of the phone call may reside in Little Rock, Ark. If the user dials the phone number correctly, "Little Rock, Arkansas" is displayed in the destination city field 1204 as shown in FIG. 19. However, if the user inadvertently dials "502 123 4567," "Louisville, Ky." will appear in the destination city field 1204 and the user will know that the phone number was dialed incorrectly. Hence, the user has the opportunity to correct the dialed phone number before the phone number is called.

FIG. 20 is an illustration of a screen used to make a phone call from the call log on the user's communication device. As shown in FIG. 20, "United Kingdom" follows "Dialer Location" in the current country field 1404. Hence, the user is located in the United Kingdom. He or she intends to call Jack Harrods' phone number 2002. Like all phone numbers saved to the call log, Jack Harrod's phone number 2002 is in the TIN dialing format. The phone number is a concatenation of the ISO country code for the United Kingdom "GBR" and Jack Harrods' local phone number "2075811281." The user's current country is the same as the country corresponding to the ISO country code in the TIN-formatted phone number. The domestic call logic sequence is initiated and an internal dialing protocol (IDP) is concatenated with the local phone number. The IDP is a code dialed before domestic phone numbers. The United Kingdom's IDP is "0" and the concatenation "0 207 581 1281" appears in the notification 1902 displayed on the screen. The series of digits is called if the user selects "Call."

Figures 21, 22:
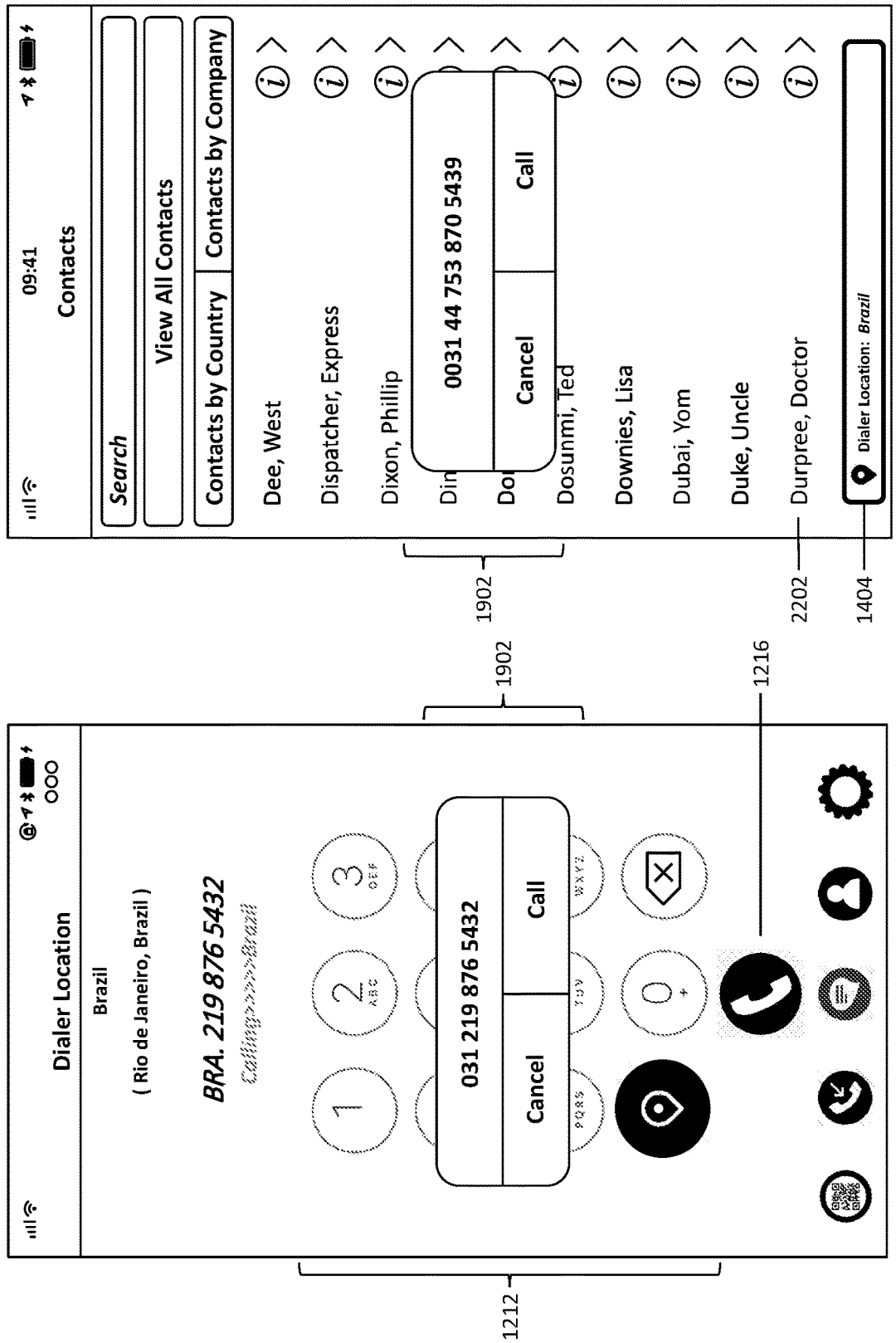
FIG. 21 is an illustration of a screen used to manually dial a domestic phone number.
FIG. 22 is an illustration of a screen used to make a phone call from the contacts list on the user's communication device.

FIG. 21 is an illustration of a screen used to manually dial a domestic phone number. In an embodiment, a user may travel to Sao Paulo, Brazil, decide to make a domestic phone call, and purchase a local SIM card. As discussed with reference to FIG. 17, a local SIM card is a smart card that allows the user to access a single carrier network in countries having multiple carrier networks. Brazil is such a country. Its multiple domestic carriers are shown in the multiple carriers database (excerpted in FIG. 37). Each carrier has its own local trunk (IDP).

To call Rio de Janeiro, the user selects "Local SIM Card" 1706 from the options displayed on the "Global Calling Methods" screen shown in FIG. 17. The next screen displays a list of the domestic carriers in Brazil. The user selects the carrier Oi from the list. The local trunk for Oi is "031" as shown in the multiple carriers database.

The user enters the domestic phone number "219 876 5432" using the keypad 1212. To place the phone call, the user taps the caller icon 1216. The app initiates the domestic call logic sequence which concatenates the local trunk "031" for the selected carrier Oi and the phone number "219 876 5432" in Rio de Janeiro. The concatenation "031 219 876 5432" appears in the notification 1902 displayed on the screen. The user selects "Call" to complete the phone call and the series of digits is saved to the call log as "BRA.2198765432."

The user in Sao Paulo, Brazil, may also initiate a domestic phone call to Rio de Janeiro by selecting "International Calling Plan" 1708 from the options displayed on the "Global Calling Methods" screen shown in FIG. 17. The user enters the domestic phone number "219 876 5432" using the keypad 1212. To place the phone call, the user taps the caller icon 1216. The app initiates the domestic call logic sequence because the phone call's originating country and destination country are the same. The call logic sequence concatenates the local trunk "0" for the international calling plan and the phone number "219 876 5432" in Rio de Janeiro. The concatenation "0 219 876 5432" appears in the notification 1902 displayed on the screen. To complete the phone call, the user selects the "Call" option included in the notification 1902. The series of digits is saved to the call log as "BRA.2198765432."

FIG. 22 is an illustration of a screen used to make a phone call from the contacts list on the user's communication device. As shown in FIG. 22, "Brazil" follows "Dialer Location" in the current country field 1404. Hence, the user is located in Brazil. In an embodiment, the user in Brazil decides to call Dr. Durpree 2202 in the United Kingdom. The user has selected Brazilian carrier Oi as the local carrier for his or her communication device.

To place the phone call, the user taps Dr. Durpree's name. The app identifies Brazil as the origin of the phone call and the United Kingdom as the destination. The international call logic sequence is initiated because the origin and destination countries are different. The call logic sequence recognizes that local carrier Oi has been selected by the user. The multiple carriers database (excerpted in FIG. 37) is accessed and the call logic sequence captures the exit code "0031" for the Brazilian carrier Oi. The dialing codes database (excerpted in FIGS. 36A and 36B) is also accessed and the call logic sequence captures the entry code "44" for the United Kingdom. Therefore, the external dialing protocol (EDP) for the call from Brazil (Oi) to the United Kingdom is "0031 44."

The international call logic sequence accesses the verification database (excerpted in FIG. 35) and compares the first few digits of Dr. Durpree's phone number to the verification sequences for the United Kingdom. If a match is found, the call logic sequence combines the EDP "0031 44" and Dr. Durpree's phone number "753 870 5439." The concatenation "0031 44 753 870 5439" appears in the notification 1902 displayed on the screen. The series of digits is called when the user selects "Call" and is saved to the call log in the TIN dialing format "GBR.7538705439."

Figure 23:
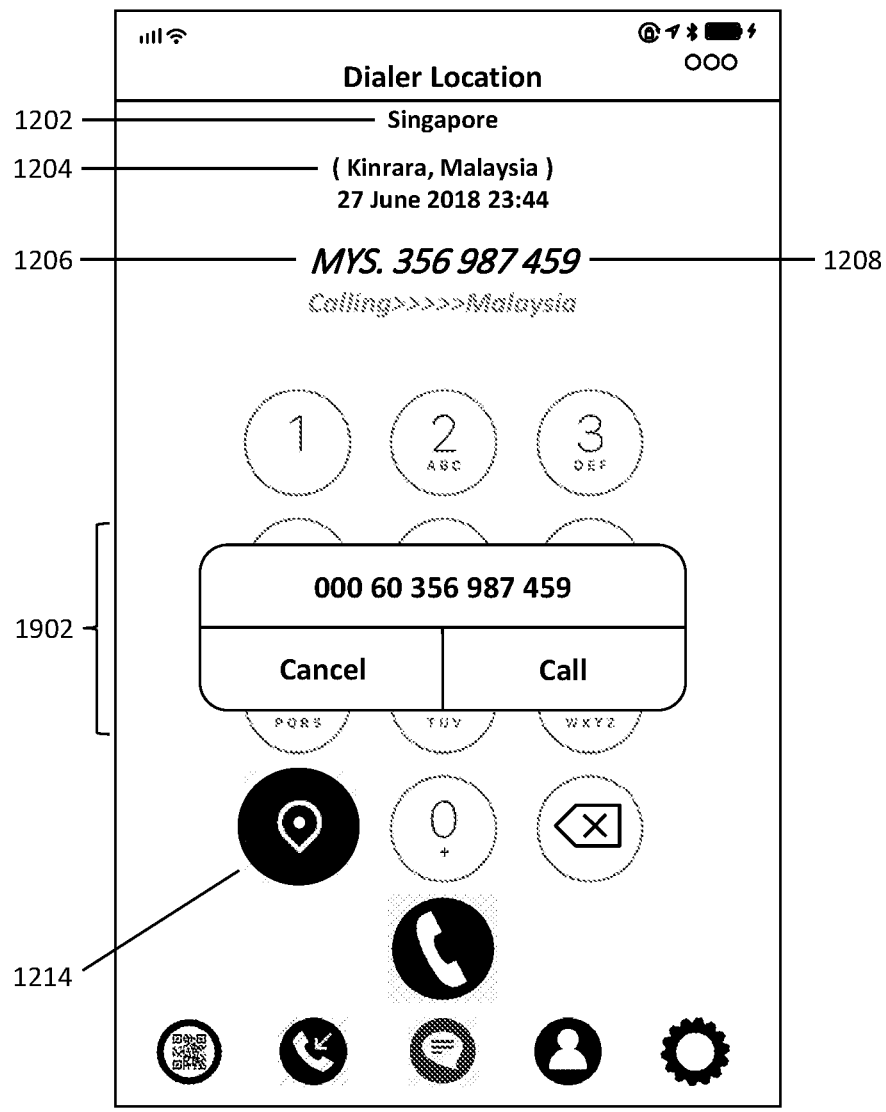
FIG. 23 is an illustration of a screen used to manually dial an international phone number.

FIG. 23 is an illustration of a screen used to manually dial an international phone number. In an embodiment, a user located in Singapore decides to make a phone call to Malaysia. Before dialing the local phone number, the user selects "International Calling Plan" 1708 from the options displayed on the "Global Calling Methods" screen shown in FIG. 17. The user dials the local phone number "356 987 459" and it is displayed in the phone number field 1208.

The app has to determine the user's current country and the phone call's destination country before the appropriate call logic sequence can be initiated. The automatic country locator 1214 may identify the user's current country. Alternatively, if the automatic country locator 1214 is not functioning, the user may select his or her current country from a list that is displayed when the dialer location field 1202 is tapped. In the present embodiment, "Singapore" appears in the dialer location field 1202. The user may select the destination country from the dropdown list that appears when the ISO country code field 1206 is tapped. In the present embodiment, the user has selected "Malaysia" from the list. Accordingly, Malaysia's ISO country code "MYS" is displayed in the ISO country code field 1206. The international call logic sequence is invoked because the user's current country differs from the phone call's destination country.

The international call logic sequence determines the destination city in the destination country and displays it in the destination city field 1204. In the present embodiment, the destination city field 1204 indicates that "Kinrara, Malaysia" is the destination city for the international phone call. The local date and time in Kinrara are displayed below the destination city field 1204.

The international call logic sequence accesses the dialing codes database and retrieves the exit code "000" for Singapore and the entry code "60" for Malaysia. The verification database (excerpted in FIG. 35) is accessed and the call logic sequence compares the first few digits of the local phone number to the verification sequences for Malaysia. If the first few digits match a verification sequence, the international call logic sequence concatenates the exit code for Singapore, the entry code for Malaysia, and the local phone number. The resulting concatenation "000 60 356 987 459" is displayed in the notification 1902 displayed on the screen. The series of digits is called once the user selects "Call" and is saved to the call log in the TIN dialing format "MYS.356987459."

Figure 24:
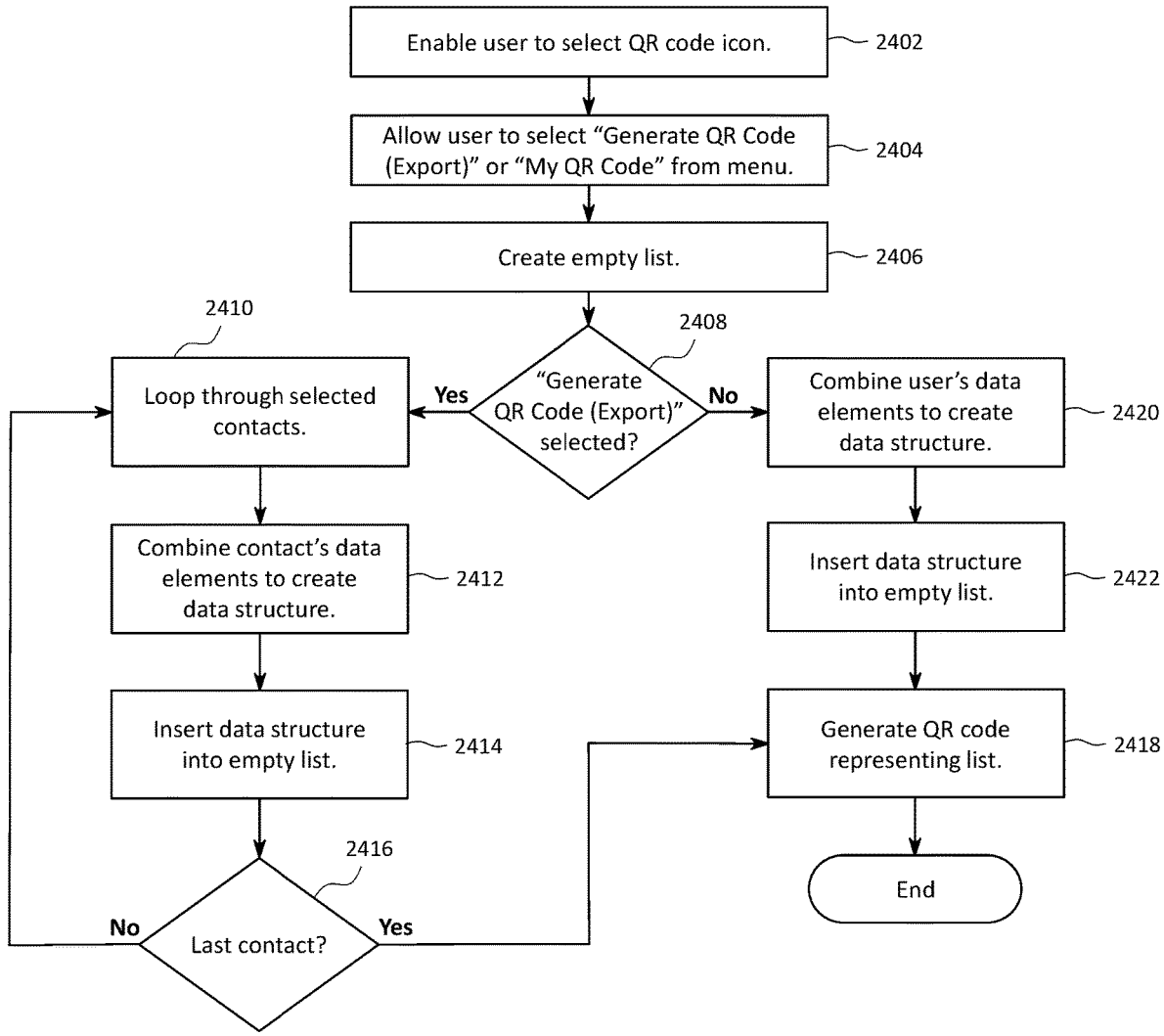
FIG. 24 is a logic flow diagram for creating a QR code to enable contact sharing.

FIG. 24 is a logic flow diagram for creating a QR code to enable contact sharing. The QR code may represent contact information for the user or a number of the user's contacts and may be exported to the communication device of another user. The export logic sequence may begin at block 2402, where the user is enabled to select the QR code icon 1218 located at the bottom of the dialer screen shown in FIG. 12.

At block 2404, the user may select "Generate QR Code (Export)" 1306 or "My QR Code" 1308 when the QR code menu 1302 appears. The user chooses "Generate QR Code (Export)" 1306 when the user wants to create a QR code for multiple contacts he or she has selected. Alternatively, the user may choose "My QR Code" 1308 when he or she wants to export his or her own contact information.

At block 2406, the export logic sequence may create an empty list that will eventually store data structures for the selected contacts. Alternatively, the list will store a single data structure for the user. A data structure may consist of data elements that include the first name, last name, company, ISO country code, and phone number of a selected contact or the user.

Block 2408 is a query that determines which menu option was selected by the user at block 2404. The export logic sequence continues at block 2410 if "Generate QR Code (Export)" 1306 was chosen. At block 2410, a loop may be initiated. The loop may iterate until the last of the selected contacts has been processed. A contact is processed at blocks 2412 and 2414. At block 2412, the data elements for a selected contact may be combined to create a data structure. At block 2414, the data structure may be inserted into the empty list created at block 2406.

At block 2416, the export logic sequence may determine if the last of the selected contacts has been processed. If so, the logic sequence continues at block 2418. Otherwise, the logic sequence continues at block 2410, the loop iterates again, and another contact is processed.

The export logic sequence may continue at block 2420 if it is determined at block 2408 that the user did not select "Generate QR Code (Export)" 1306 at block 2404. Instead, the user selected "My QR Code" 1308. The user's data elements are processed at blocks 2420 and 2422 just like a contact's data elements are processed at blocks 2412 and 2414. At block 2420, the data elements for the user may be combined to create a data structure. At block 2422, the data structure may be inserted into the empty list created at block 2406.

The export logic sequence continues at block 2418. This block is also reached from block 2416 when the logic sequence determines that the last of the selected contacts has been processed. At block 2418, a QR code may be generated from the list populated by data structures for the selected contacts or a data structure for the user. Export may occur when the camera on another user's communication device scans the QR code. Hence, the user shares the contact information represented by the QR code with another user.

Figure 25:
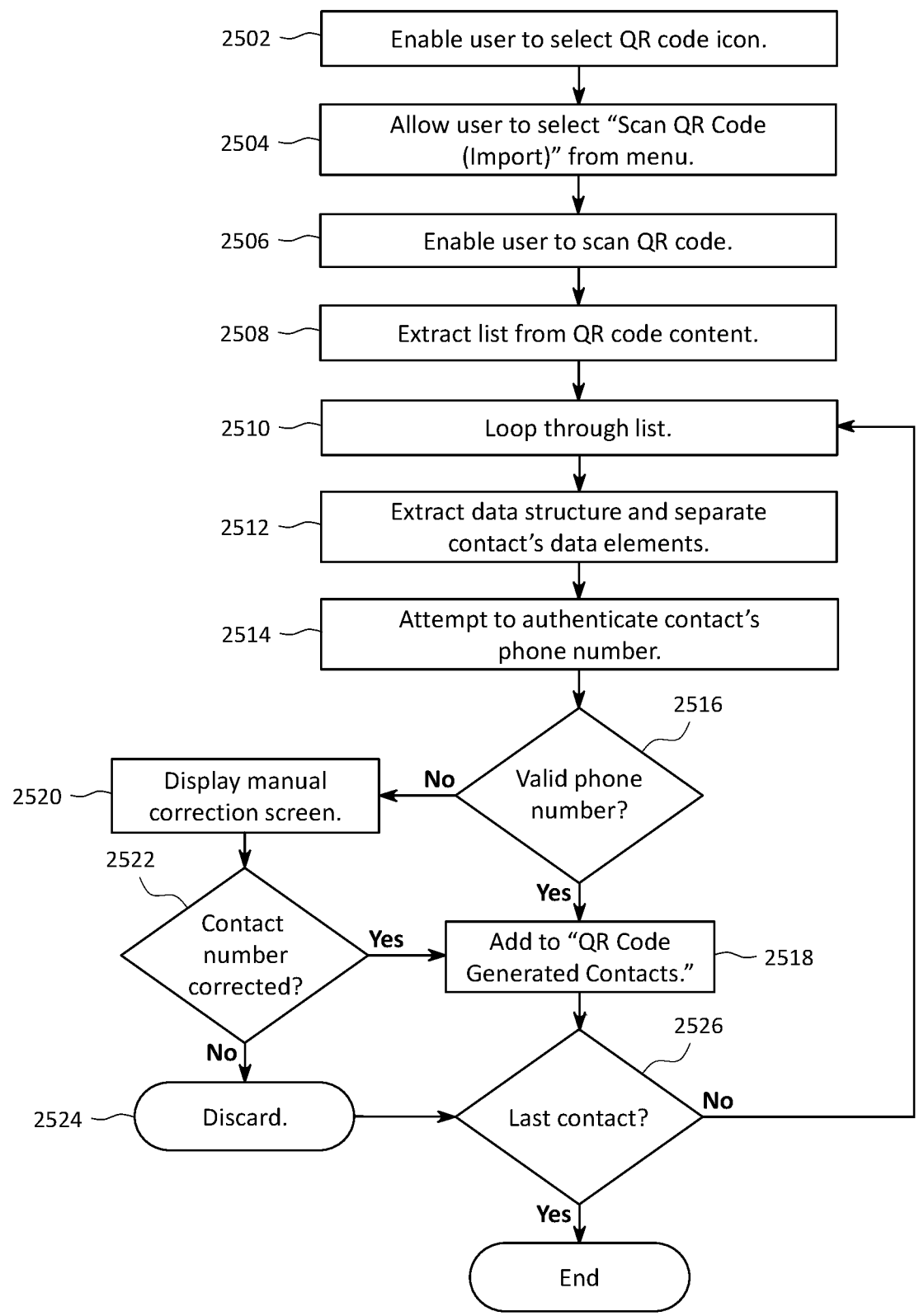
FIG. 25 is a logic flow diagram for importing a QR code.

FIG. 25 is a logic flow diagram for importing a QR code. When a user imports a QR code, he or she receives contact information from another user. The other user initiates the export logic sequence on his or her communication device to generate the QR code that is scanned by the user. The QR code may contain contact information for multiple contacts or the other user.

The import logic sequence may begin at block 2502, where the user is enabled to select the QR code icon 1218 located at the bottom of the dialer screen shown in FIG. 12. At block 2504, the user may select "Scan QR Code (Import)" 1304 when the QR code menu 1302 appears. The import logic sequence continues at block 2506, where the user is enabled to scan the QR code generated by the other user. The QR code is scanned using the camera on the user's communication device.

At block 2508, the list of data structures may be extracted from the QR code content. At block 2510, a loop may be initiated. The loop may iterate until the logic sequence has processed the data structure for each contact. Processing may begin at block 2512, where a data structure is extracted from the list and separated into the contact's data elements.

At block 2514, the import logic sequence may attempt to authenticate the contact's phone number included in the data elements. Authentication confirms that the phone number is an actual phone number in the destination country. The phone number is compared to the destination country's minimum, maximum, and verification rules. A phone number is authenticated if the number of digits conforms to the minimum and maximum rules and the first few digits match a verification sequence for the destination country.

Block 2516 is a query that determines if the contact's phone number was authenticated at block 2514. The import logic sequence may continue at block 2518 if authentication confirmed that the contact's phone number is a valid phone number in the destination country. If the contact's phone number was not authenticated, the logic sequence may continue at block 2520, where a manual correction screen is displayed. The screen is shown in FIG. 11. It allows the user to edit the contact's phone number. Block 2522 is a query that determines if the user edited the phone number. If editing occurred, the logic sequence may continue at block 2518. Otherwise, the unedited unauthenticated phone number is discarded at block 2524 and the import logic sequence advances to block 2526.

Only a successfully authenticated phone number reaches block 2518. The phone number may be an unaltered phone number authenticated at block 2514.

Alternatively, the phone number may be a manually-edited phone number. The phone number is edited when the user interacts with the manual correction screen to convert an unauthenticated phone number to a valid phone number in the destination country. At block 2518, the unaltered phone number or the manually-edited phone number and the remaining data elements may be written to the database containing QR code generated contacts.

At block 2526, the app may determine if the data structure for the last contact has been processed. The import logic sequence ends if the criterion at block 2526 is satisfied. Otherwise, the logic sequence continues at block 2510, the loop iterates again, and another data structure is processed.

Alternatively, block 2526 may be reached from block 2524. In this instance, block 2526 may determine if the data structure that contained the discarded phone number is the data structure for the last contact. The import logic sequence progresses as discussed above once it advances from block 2524 to block 2526.

In an implementation, JavaScript Object Notation (JSON) is used to exchange contact information via QR codes. JSON is an open standard file format and data interchange format that uses human-readable text to store and transmit data objects and arrays. It is cross-platform compatible allowing the present application to freely exchange contact information between iOS and Android cellular devices.

A JSON array is used to share contact information via a QR code because the array allows the present app to use a standardized procedure for importing contact information whether the QR code represents the contact information for a single contact (i.e., the user) or multiple contacts. A JSON array contains JSON objects. Each JSON object consists of attribute/value pairs that convey a contact's information. In the present embodiment, a JSON object is a combination of the following attribute/value pairs: first name/contact's first name; last name/contact's last name; company/contact's employer (optional); ISO/ISO country code for the country where the contact's phone number is registered; and phone number/contact's local phone number.

In FIGS. 24 and 25, a list may be a JSON array; a data structure may be a JSON object; and an element may be a JSON attribute/value pair. At block 2406, an empty JSON array may be created. For each of the selected contacts, a JSON object may be formed by combining the attribute/value pairs for the contact at block 2412 and the JSON object may be inserted into the JSON array at block 2414. Alternatively, a single JSON object may be created by combining the attribute/value pairs for the user at block 2420. The single JSON object may be inserted into the JSON array at block 2422. At block 2418, a QR code that represents the JSON array may be generated whether the JSON array contains a single JSON object or multiple JSON objects. The QR code is a graphical representation of the text in the JSON array.

A JSON array is assembled to export contact information as shown in FIG. 24. In contrast, a JSON array is disassembled to import contact information as shown in FIG. 25. Before disassembly can occur, the QR code is scanned by the camera on the user's communication device at block 2506. At block 2508, a JSON array may be extracted from the QR code content. The present app may loop through the JSON array. Each iteration of the loop may extract a contact's JSON object at block 2512. The contact's JSON object may be separated into its component attribute/value pairs. The contact's local phone number may be taken from the appropriate attribute/value pair and subjected to the authentication process at block 2514. If the phone number is authenticated, the phone number and the information in the remaining attribute/value pairs may be added to the database of QR code generated contacts at block 2518.

The present embodiment uses JSON and QR codes to share contact information. However, other embodiments may share contact information using other data interchange formats and methods for representing information. Further, additional embodiments may use hybrids of JSON and QR codes and the other formats and methods to achieve the sharing of contact information.

Figure 26:
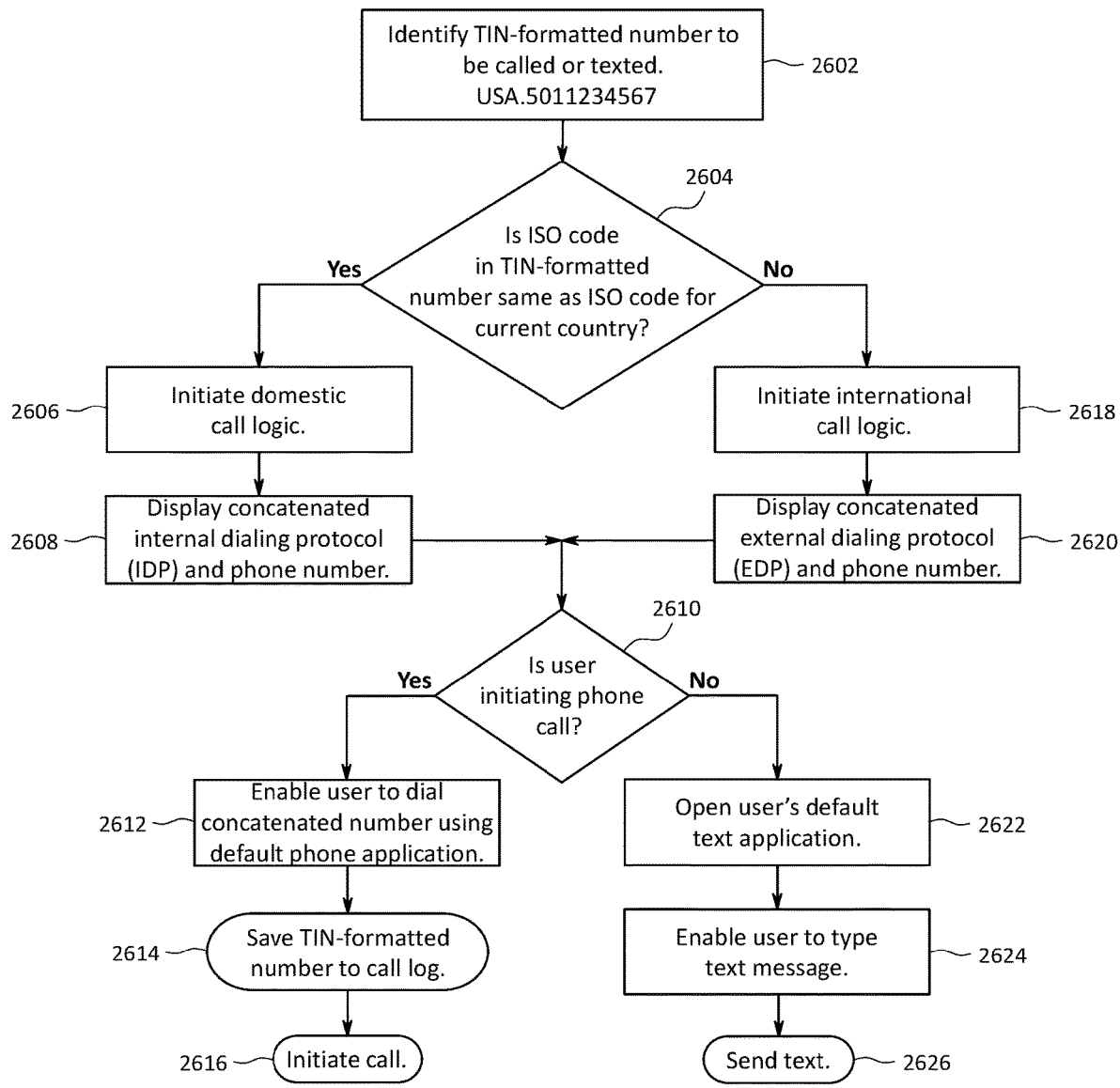
FIG. 26 is a logic flow diagram for a call logic sequence used to call or text a phone number.

FIG. 26 is a logic flow diagram for a call logic sequence used to call or text a phone number. Block 2602 indicates that the TIN-formatted phone number to be called or texted is "USA.5011234567." "USA" is the ISO country code for the United States and "5011234567" is a ten-digit U.S. phone number.

At block 2604, the app may determine if the ISO country code in the TIN-formatted phone number is the same as the ISO country code for the user's current country. The call logic sequence may continue at block 2606 if the ISO country codes are the same. At block 2606, the app may initiate a domestic call logic sequence. At block 2608, the app may display a domestic concatenation which is a combination of the IDP (if any) and the local phone number. Blocks 2606 and 2608 are explained in detail with reference to FIGS. 27A and 27B. The call logic sequence may continue at block 2610.

In an embodiment, a user located in the United States may want to use his or her communication device to call or text the TIN-formatted phone number "USA.5011234567." The ISO country code in the TIN-formatted phone number is the same as the ISO country code for the user's current country. Accordingly, the domestic call logic sequence is initiated. However, concatenation is not needed because there is no IDP for mobile phone calls or texts in the United States.

The call logic sequence may continue at block 2618 if the app determines that the ISO country codes differ at block 2604. At block 2618, the app may initiate an international call logic sequence. At block 2620, the app may display an international concatenation which is a combination of an EDP and the local phone number. Blocks 2618 and 2620 are explained in detail with reference to FIGS. 29A-29C. The call logic sequence may continue at block 2610.

Block 2610 may be reached whether the domestic call logic is invoked at block 2606 or the international call logic is invoked at block 2618. At block 2610, the app may determine if the user is initiating a phone call. If so, the app may advance to block 2612. Otherwise, the user is initiating a text message and the app may progress to block 2622.

At block 2612, the app may enable the user to dial the domestic concatenation displayed at block 2608 or the international concatenation displayed at block 2620. Block 2612 is followed by block 2614, where the TIN-formatted phone number is saved to the call log on the user's communication device. The app may advance from block 2614 to block 2616. At this block, the phone call is initiated.

Block 2622 may be reached if the user is not initiating a phone call at block 2610. Instead, the user is preparing to send a text message. Accordingly, at block 2622, the app may open the default text application on the user's communication device. Block 2622 is followed by block 2624, where the user is enabled to type the text message. At block 2626, the text message is sent once the user is finished typing at block 2624.

Figure 27A:
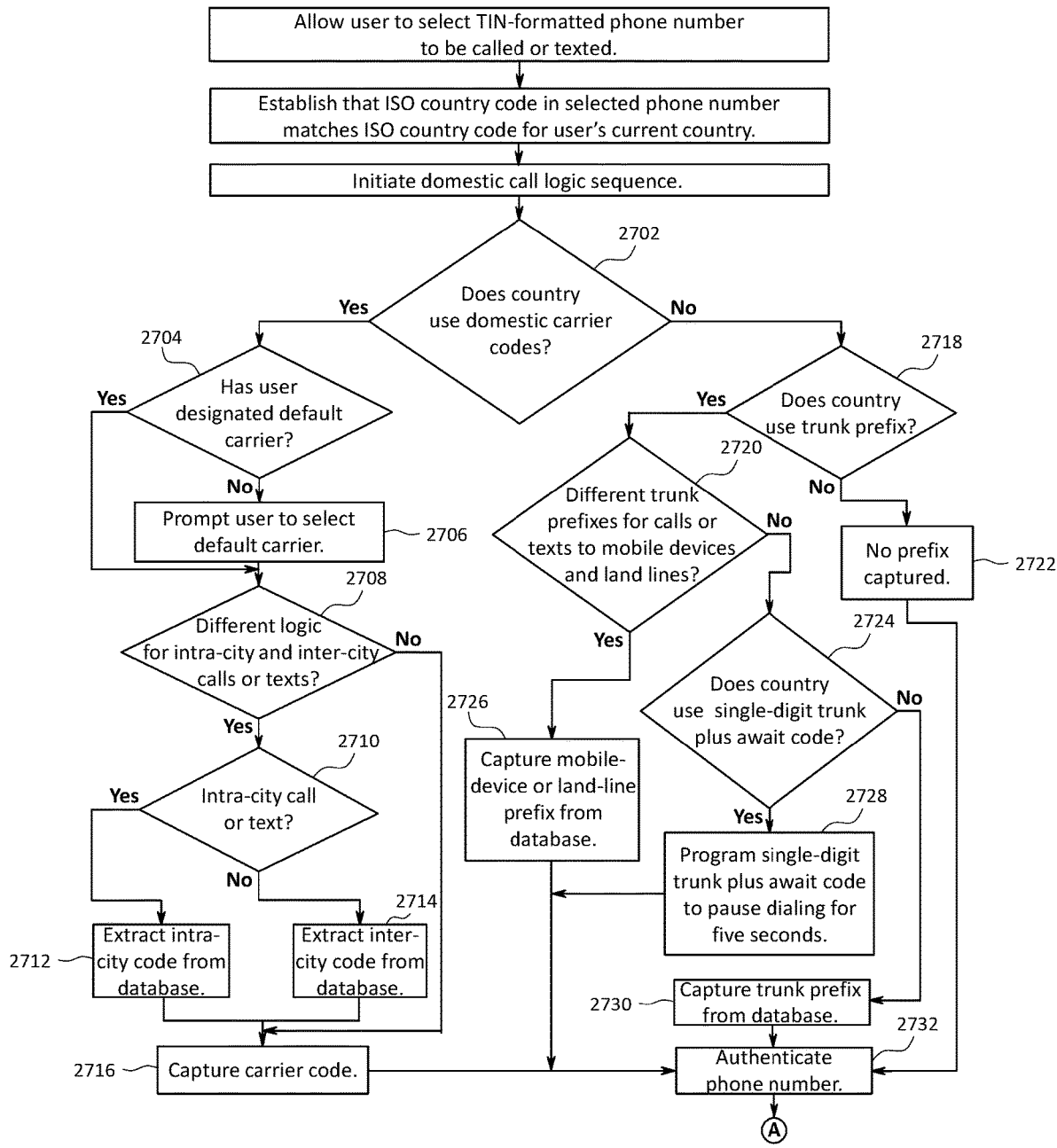
FIGS. 27A and 27B are a logic flow diagram for a domestic call logic sequence.
Figure 27B:
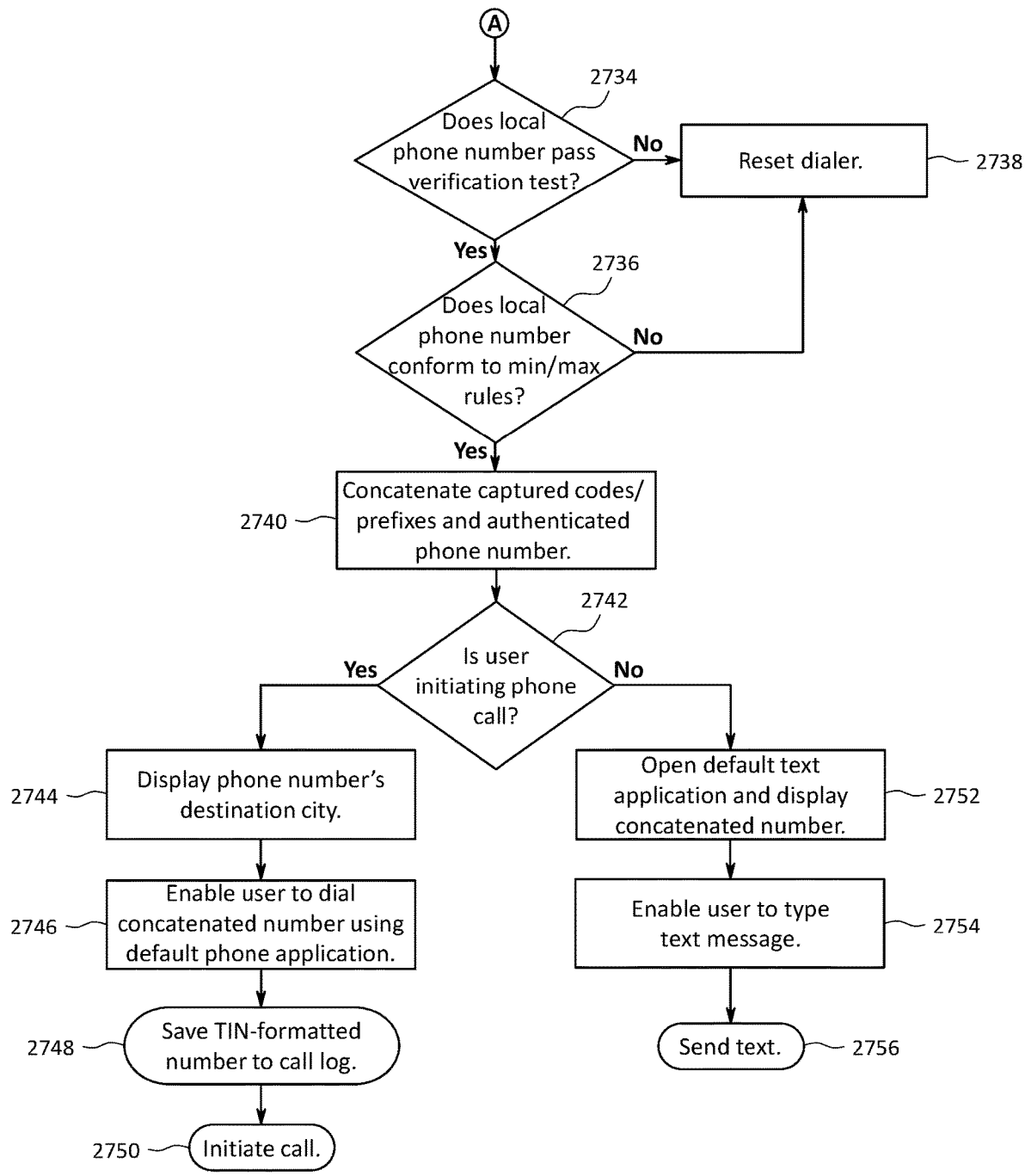

FIGS. 27A and 27B are a logic flow diagram for a domestic call logic sequence. The user may select a TIN-formatted phone number to be called or texted. The ISO country code in the selected phone number may match the ISO country code for the user's current country. The matching ISO country codes may indicate that the user will be calling or texting a domestic phone number. Accordingly, the domestic call logic sequence may be initiated.

At block 2702, the app may determine if the country uses domestic carrier codes. The domestic call logic sequence may continue at block 2704 if domestic carrier codes are used. Otherwise, the logic sequence may continue at block 2718.

At block 2704, the app may determine if the user previously designated a default carrier. If so, the domestic call logic sequence may continue at block 2708. If not, the logic sequence may continue at block 2706, where the app prompts the user to select a carrier and saves the selected carrier as the default carrier. The logic sequence may advance to block 2708.

At block 2708, the app may determine if the default carrier utilizes different logic for intra-city and inter-city phone calls or texts. In an embodiment, a user in Buenos Aires, Argentina, may select "Local SIM Card" 1706 from the options displayed on the "Global Calling Methods" screen shown in FIG. 17. Phone calls made to Buenos Aires are intra-city phone calls. Phone calls made to other cities in Argentina are inter-city phone calls. Inter-city calls are also referred to as domestic long-distance phone calls.

The domestic call logic sequence may continue at block 2710 if the app determines at block 2708 that different dialing logic is used. The call logic sequence may continue at block 2716 if the same dialing logic is used for intra-city and inter-city phone calls or texts.

At block 2710, the app may determine if the phone call or text has an intra-city terminus. If so, the domestic call logic sequence may continue at block 2712. At this block, the app may extract the default carrier's intra-city code from a database stored on the user's communication device. The domestic call logic sequence may advance to block 2716.

If the phone call or text does not have an intra-city terminus at block 2710, the call or text has an inter-city terminus and the domestic call logic sequence may continue at block 2714. At this block, the default carrier's inter-city code may be extracted from the database. The domestic call logic sequence may progress from block 2714 to block 2716.

Block 2716 may be reached from three different blocks. The domestic call logic sequence may advance from block 2708 to block 2716 if different dialing logic is not used for intra-city and inter-city phone calls or texts. If this is the case, the default carrier's code may be captured at block 2716. The call logic sequence may progress to block 2716 once the default carrier's intra-city code has been extracted from the database at block 2712. The default carrier's intra-city code may be captured at block 2716. The call logic sequence may proceed to block 2716 once the default carrier's inter-city code has been extracted from the database at block 2714. The default carrier's inter-city code may be captured at block 2716. Once one of the three carrier codes has been captured at block 2716, the domestic call logic sequence may progress to block 2732.

At block 2702, the app may determine that the country does not use domestic carrier codes. The domestic call logic sequence may continue at block 2718 when domestic carrier codes are not used. At block 2718, the app may determine if the country uses a trunk prefix.

Trunk prefixes are used by more than 100 countries. The most common trunk prefixes are "1" for countries subscribing to the North American Numbering Plan (NANP), "8" for countries of the former Soviet Union, and "0" for the majority of European, African, Asian, Pacific, and Middle Eastern countries.

The domestic call logic sequence may continue at block 2720 if a trunk prefix is used. At block 2720, the app may determine if the country's trunk prefix differs depending upon the type of device called or texted. In other words, the app may determine if the country uses different trunk prefixes for calls or texts to mobile devices and land lines.

In an embodiment, a user may travel to Argentina and decide to make a domestic phone call. To place the call, the user selects "Local SIM Card" 1706 from the options displayed on the "Global Calling Methods" screen shown in FIG. 17. In Argentina, one trunk prefix is used for inter-city phone calls regardless of the type of device called. However, different trunk prefixes are used for intra-city phone calls. One trunk prefix is used if an intra-city phone call is made to a mobile device and another trunk prefix is used if an intra-city phone call is made to a land line. Thus, when the user places an intra-city phone call in Argentina, an alert appears on the screen of his or her communication device. The alert informs the user that Argentina uses different trunk prefixes for intra-city phone calls and prompts the user to select either the mobile device option or the land line option.

The domestic call logic sequence may progress from block 2720 to block 2726 if the app recognizes that the country uses different trunk prefixes. At block 2726, the app may access a database stored on the user's communication device and capture the trunk prefix for mobile devices or the trunk prefix for land lines. The domestic call logic sequence may continue at block 2732.

At block 2720, the app may determine that the country does not use different trunk prefixes for mobile devices and land lines. If this determination is made, the domestic call logic sequence may continue at block 2724. At block 2724, the app may determine if the country uses a single-digit trunk plus await code. If this combination code is used, the domestic call logic sequence may continue at block 2728.

At block 2728, the app may capture the single-digit trunk plus await code from the database stored on the user's communication device. The app may program the captured digit and await code to pause dialing of a phone number for five seconds. For example, Belarus uses the digit "8" as the single-digit trunk code for domestic phone calls. In an embodiment, a user located in Belarus may decide to call the domestic phone number "25 639 8752." The digit "8" is followed by a special character and the app programs the digit and character to pause dialing and concatenates them with the domestic phone number. The pause character for iOS and Android devices is a comma. The app concatenates "8," the pause character, and the domestic phone number. When the concatenation "8, 25 639 8752" is dialed, there is a five-second pause between the digit "8" and the digit "2" at the beginning of the domestic phone number. After the single-digit trunk code plus await code have been programmed, the domestic call logic sequence may continue at block 2732.

At block 2724, the app may determine that the country does not use a single-digit trunk plus await code. When this combination code is not used, the domestic call logic sequence may continue at block 2730. At this block, the country's trunk prefix may be captured from the dialing codes database (excerpted in FIGS. 36A and 36B). The domestic call logic sequence may continue at block 2732.

At block 2718, the app may recognize that the country does not use a trunk prefix. Accordingly, there is no trunk prefix to capture at block 2722 and the domestic call logic sequence may continue at block 2732.

Block 2732 may be reached from five different blocks in the domestic call logic sequence. The blocks are 2716, 2722, 2726, 2728, and 2730. The answers to the various queries in the logic sequence determine which of these blocks immediately precedes block 2732.

At block 2732, the app may attempt to authenticate the local phone number. The authentication process has two steps. The first step is the verification test. The app compares the first few digits of the local phone number to the country's verification sequences found in the verification database (excerpted in FIG. 35). The local phone number passes the verification test if the first few digits match a verification sequence. The verification test is explained in detail with reference to FIG. 28.

The second step of the authentication process compares the number of digits in the local phone number to the country's minimum and maximum rules (MMR) found in the dialing codes database (excerpted in FIGS. 36A and 36B). The local phone number conforms to the MMR if it has an acceptable number of digits. Authentication occurs if the local phone number passes the verification test and conforms to the MMR.

Blocks 2734 and 2736 determine the outcome of the authentication process. At block 2734, the app may determine if the local phone number passes the verification test. If the criterion at block 2734 is satisfied, the domestic call logic sequence may continue at block 2736. If a matching verification sequence is not found, the call logic sequence may continue at block 2738, where the dialer resets.

At block 2736, the app may determine if the local phone number conforms to the current country's MMR. If the local phone number has an appropriate number of digits, the domestic call logic sequence may continue at block 2740. If the local phone number has too few or too many digits, the call logic sequence may continue at block 2738, where the dialer resets.

At block 2740, the app may concatenate any captured code or prefix and the local phone number. The result is a domestic concatenation. The captured code may be a domestic carrier code, carrier intra-city code, carrier inter-city code, or single-digit trunk plus await code. The captured prefix may be a trunk prefix, mobile-device trunk prefix, or land-line trunk prefix. Alternatively, the app may not capture a code or prefix. This occurs when the country does not use a domestic carrier code at block 2702 and does not use a trunk prefix at block 2718. Accordingly, the local phone number may remain unchanged and is called or texted at subsequent blocks in the domestic call logic sequence (provided the local phone number passes the country's verification test at block 2734 and conforms to the country's minimum and maximum rules at block 2736).

The domestic call logic sequence may progress to block 2742. At this block, the app determines if the user intends to initiate a phone call. If so, the call logic sequence may continue at block 2744. If not, the user intends to send a text message and the call logic sequence may continue at block 2752.

At block 2744, the destination city for the local phone number may be displayed in the destination city field 1204 near the top of the dialer screen shown in FIG. 12. At block 2746, the app may enable the user to dial the domestic concatenation utilizing the user's default phone application. The TIN-formatted phone number may be saved to the call log at block 2748 and the phone call may be initiated at block 2750.

If the user is sending a text message, the app may open the user's default text application and display the domestic concatenation at block 2752. The user may be enabled to type the text message at block 2754 and the text message may be sent at block 2756.

Figure 28:
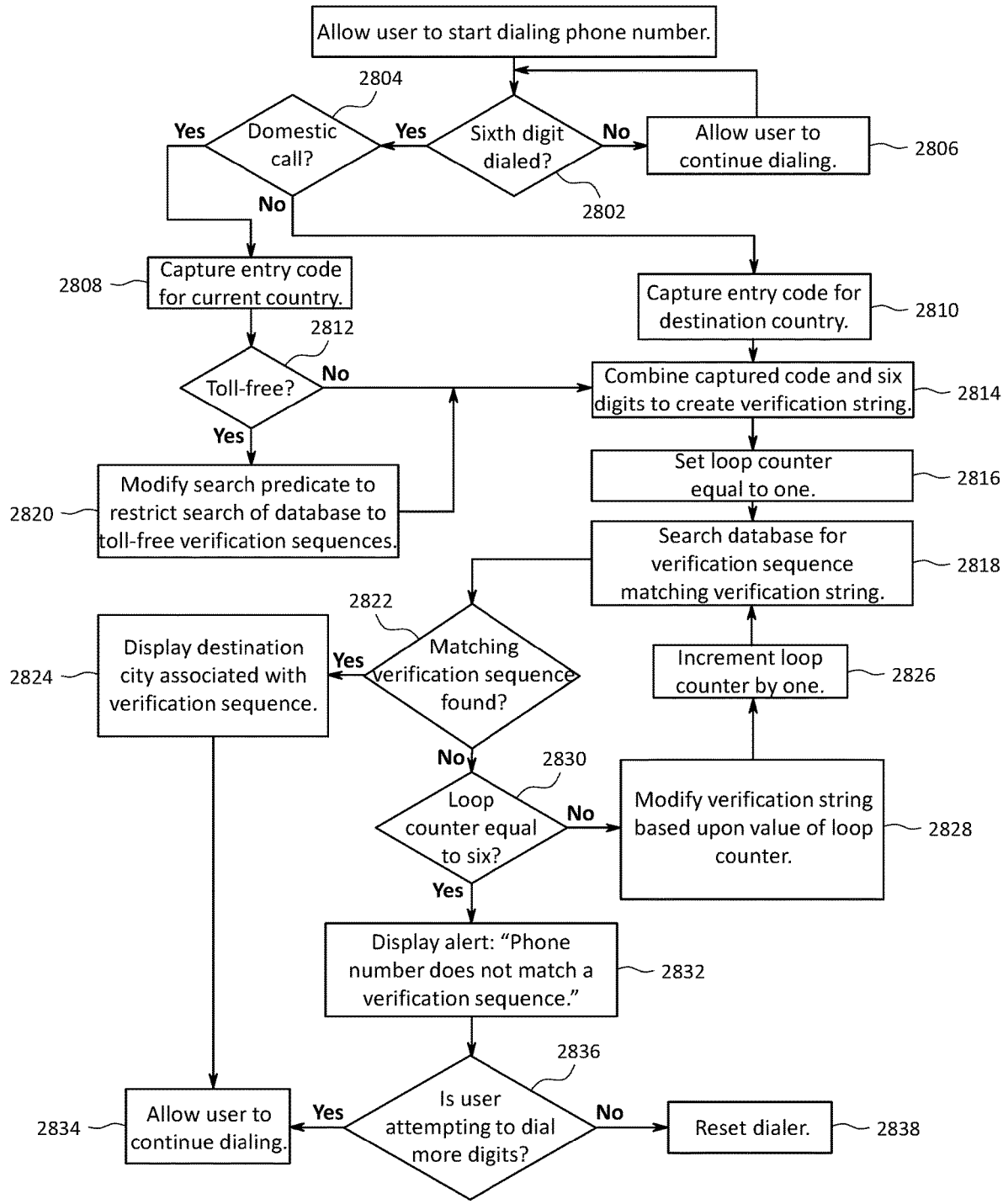
FIG. 28 is a logic flow diagram for a verification logic sequence.

FIG. 28 is a logic flow diagram for a verification logic sequence. In particular, FIG. 28 illustrates the logic sequence used to determine if a phone number matches a verification sequence at block 2734 in FIG. 27B (domestic call logic sequence) or at block 2928 in FIG. 29B (international call logic sequence). A user starts to dial a phone number and the verification logic sequence may commence at block 2802.

At block 2802, the app may determine if the sixth digit of the phone number has been dialed. If the user has dialed six digits, the verification logic sequence may advance from block 2802 to block 2804. If fewer than six digits have been dialed, the user may continue to dial at block 2806 using the keypad 1212 on the dialer screen shown in FIG. 12. The user may continue to dial digits until the sixth digit has been dialed. The criterion at block 2802 is satisfied and the verification logic sequence may continue at block 2804.

At block 2804, the app may determine if the user is making a domestic phone call. The app may compare the user's current country to the country corresponding to the ISO country code displayed in the ISO country code field 1206 on the dialer screen shown in FIG. 12. If the countries are the same, the user is making a domestic call and the verification logic sequence may continue at block 2808. At this block, the app may capture the entry code for the current country from the dialing codes database (excerpted in FIGS. 36A and 36B).

The verification logic sequence may continue at block 2812, where the app may determine if the domestic phone call is toll-free. If the user is making a toll-free domestic call, the verification logic sequence may continue at block 2820. At this block, the search predicate may be modified so that the search of the verification database at block 2818 is restricted to toll-free verification sequences. In other words, the app will only search the verification sequences that begin toll-free domestic phone numbers. Once the search predicate has been changed, the verification logic sequence may continue at block 2814. The verification logic sequence may also continue at block 2814 if the app determines at block 2812 that the domestic phone call is not toll-free.

At block 2804, the app may determine that the user is not making a domestic phone call. As discussed above, the app may determine if the phone call is a domestic or international call by comparing the user's current country to the country corresponding to the ISO country code displayed in the ISO country code field 1206 on the dialer screen shown in FIG. 12. If the countries are not the same, the user is making an international phone call and the verification logic sequence may continue at block 2810. At this block, the app may capture the entry code for the destination country from the dialing codes database (excerpted in FIGS. 36A and 36B). The verification logic sequence may continue at block 2814 after the entry code is captured.

At block 2814, the app may combine one of two codes and the six digits dialed by the user. The code may be the entry code for the current country captured at block 2808 or the entry code for the destination country captured at block 2810. The captured code and the six dialed digits may be combined to create a verification string. The verification logic sequence may continue at block 2816 after the verification string has been created. At block 2816, a loop counter is set to one before a verification loop begins at block 2818.

At block 2818, the app may search the verification database for a verification sequence that matches the verification string. If the phone call is a toll-free domestic call, the app only searches the toll-free verification sequences for a match. The verification logic sequence may continue at block 2822, where the app may determine if a matching verification sequence has been found. The verification logic sequence may continue at block 2824 if the verification database contains a verification sequence that matches the verification string.

At block 2824, the destination city associated with the matching verification sequence may be displayed in the destination city field 1204 on the dialer screen shown in FIG. 12. Once the destination city is displayed, the verification logic sequence advances to block 2834, where the user may continue dialing the phone number.

The verification logic sequence may continue at block 2830 if the app determines at block 2822 that the verification database does not contain a verification sequence that matches the verification string. At block 2830, the app may determine if the loop counter is equal to six. If the loop counter is less than six, the verification logic sequence may continue at block 2828, where the app may modify the verification string based upon the value of the loop counter. The app modifies the verification string by replacing the digits at the end of the string with the "*" character. The app determines the number of digits to replace based upon the loop counter value. The number of digits replaced is equal to the loop counter minus one. In an embodiment, the verification string for a phone number in the USA may be "128192." If the loop counter is equal to two, block 2828 creates the verification string "12819*." If the loop counter is equal to three, the verification string is "1281." Once the verification string has been modified, the verification logic sequence may continue at block 2826. At this block, the loop counter may be incremented by one. The verification logic sequence may continue at block 2818** after the loop counter has been updated.

At block 2818, the app may search the verification database for a verification sequence that matches the modified verification string. The verification loop composed of blocks 2818, 2822, 2830, 2828, and 2826 may iterate until a matching verification sequence is found at block 2822 or until the loop counter is equal to six at block 2830. The verification logic sequence may continue at block 2832 once the loop counter equals six. At block 2832, the app may display an alert on the dialer screen shown in FIG. 12. The alert may inform the user that the phone number does not match a verification sequence. This message indicates that the beginning digits of the phone number do not constitute the beginning digits of a valid phone number in the destination country.

The verification logic sequence may continue at block 2836, where the app determines if the user is attempting to dial more than six digits of the phone number. If the user is attempting to dial more digits, the verification logic sequence may advance to block 2834, where the app allows the user to continue dialing. The user may opt to continue dialing even though the verification loop failed to find a verification sequence that matches the beginning digits of the phone number. If the user is not attempting to dial more digits, the verification logic sequence advances to block 2838, where the app resets the dialer.

Figure 29A:
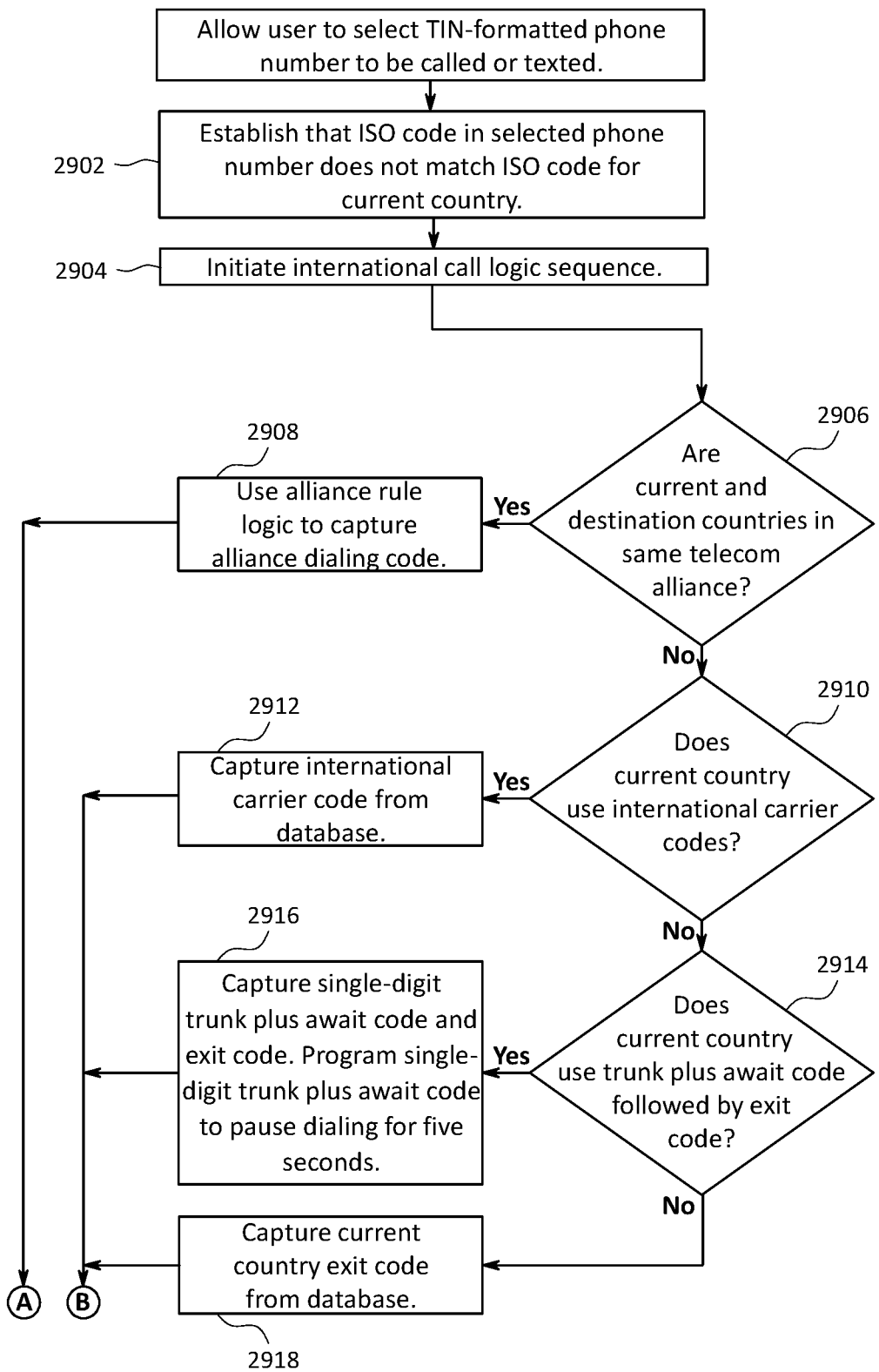
FIGS. 29A-29C are a logic flow diagram for an international call logic sequence.
Figure 29B:
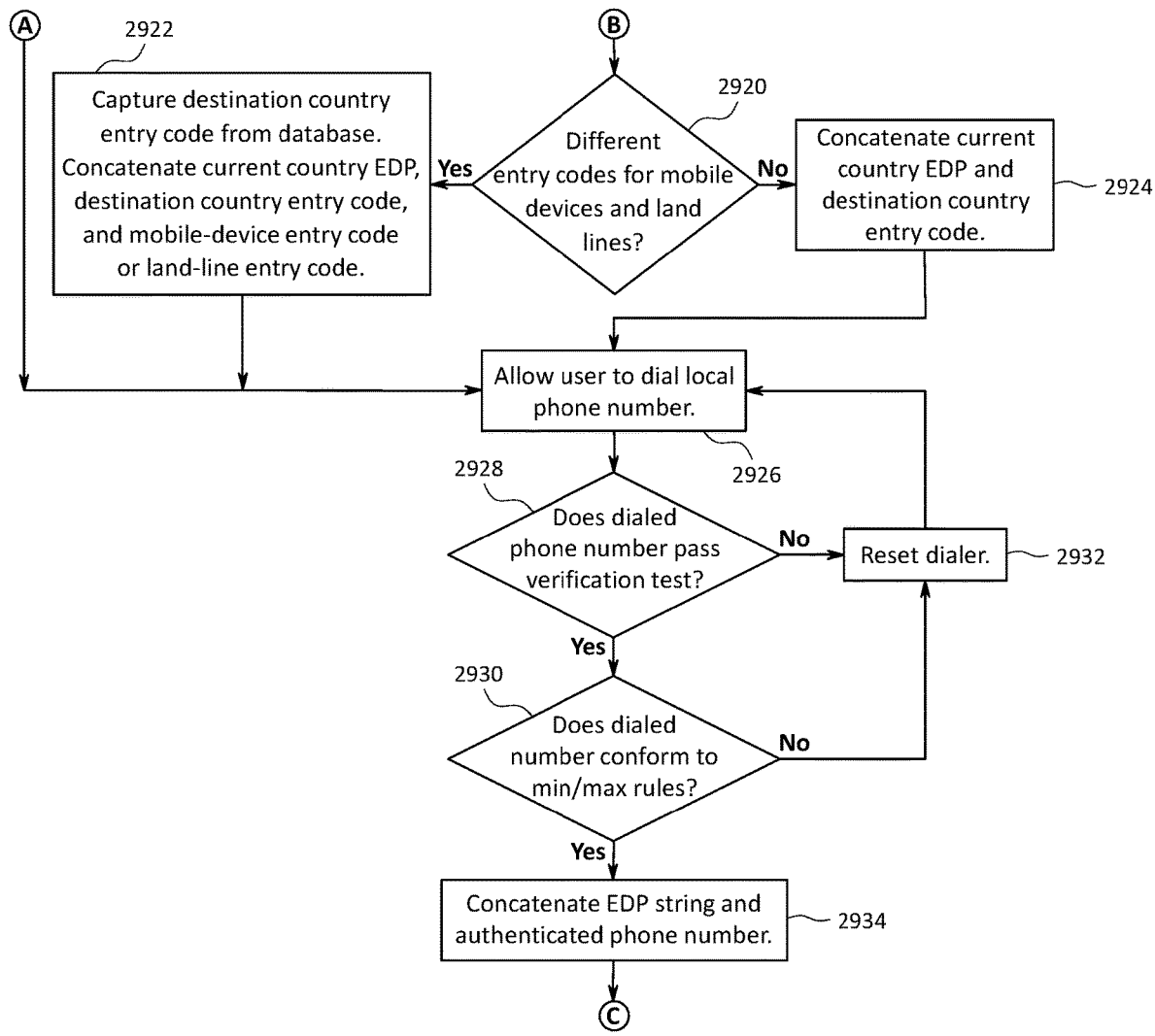
Figure 29C:
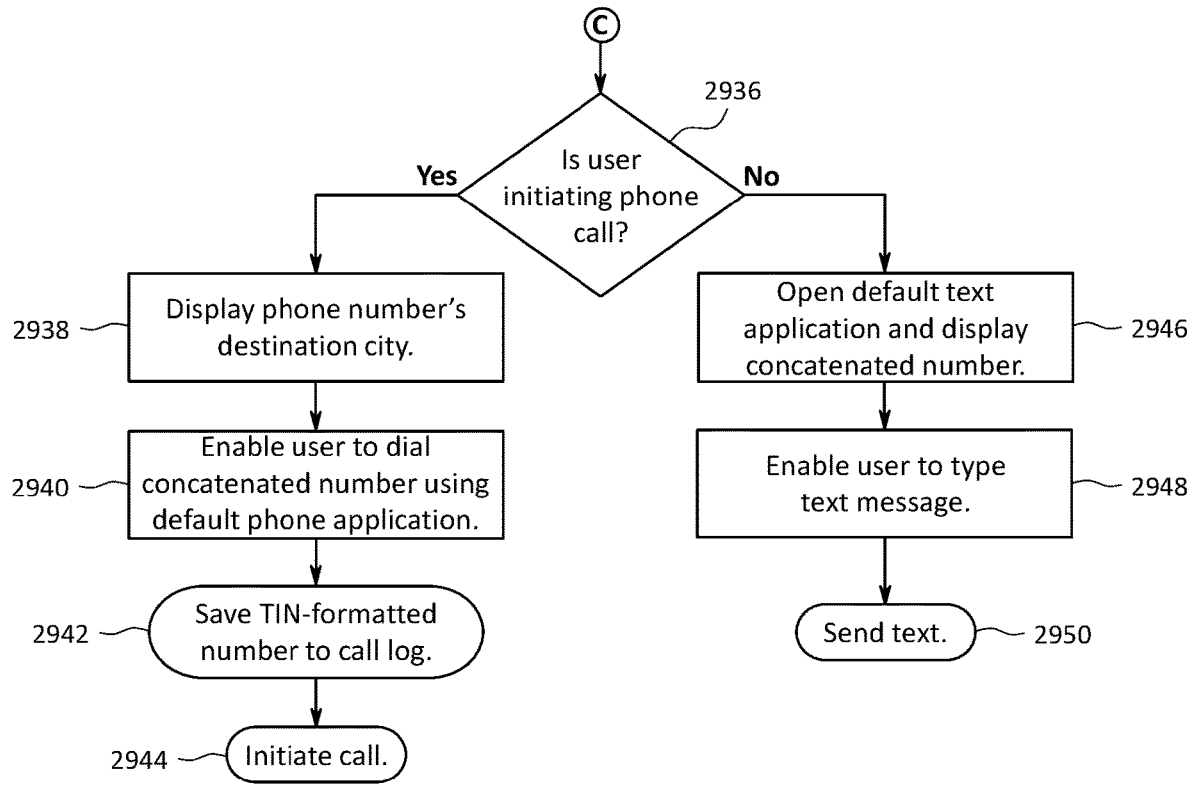

FIGS. 29A-29C are a logic flow diagram for an international call logic sequence. The user selects the TIN-formatted phone number to be called or texted. At block 2902, the app establishes that the ISO country code in the selected phone number does not match the ISO country code for the user's current country. The different ISO country codes indicate that the user intends to make an international phone call. Accordingly, the international call logic sequence may be initiated at block 2904. The logic sequence may begin at block 2906.

At block 2906, the app may determine if the user's current country and the destination country are members of the same telecommunications alliance. To make this determination, the app may access the dialing codes database (excerpted in FIGS. 36A and 36B). The records for the current country and the destination country may be compared to ascertain if both records refer to the same telecommunications alliance. For example, the North American Numbering Plan (NANP) is an alliance that includes countries in North America and the Caribbean and territories of the United States. The East African Numbering Plan (EANP) is another example of a telecommunications alliance. The members of this alliance are Tanzania, Uganda, and Kenya.

The international call logic sequence may continue at block 2908 if the current country and the destination country are members of the same alliance. At block 2908, alliance rule logic may be used to capture an alliance dialing code from the dialing codes database. The captured alliance dialing code may be a first external dialing protocol (EDP) string. Alliance rule logic is explained in detail with reference to FIG. 30. The international call logic sequence may continue at block 2926.

If the current country and the destination country are not members of the same telecommunications alliance, the international call logic sequence may advance to block 2910. At this block, the app may determine if the current country uses international carrier codes. If so, the international call logic sequence continues at block 2912. At this block, the appropriate international carrier code may be captured from a database stored on the user's communication device. Once the international carrier code is captured, the international call logic sequence continues at block 2920.

If the current country does not use international carrier codes, the international call logic sequence may advance to block 2914. At this block, the app may determine if the current country uses a single-digit trunk plus await code followed by an exit code. If so, the international call logic sequence continues at block 2916.

At block 2916, the dialing codes database may be accessed and the current country's single-digit trunk plus await code and exit code may be captured. The single-digit trunk plus await code may be programmed to pause dialing for five seconds. In an embodiment, the single-digit trunk plus await code may be dialed. After a five-second pause, dialing may resume and the exit code is dialed. For example, the single-digit trunk plus await code and the exit code for Belarus are "8," and "10," respectively. If a user makes an international phone call from Belarus, "8," is dialed and dialing pauses for five seconds. After the pause, dialing resumes and the digits "10" are dialed. The international call logic sequence may continue at block 2920 after the single-digit trunk plus await code and the exit code are captured.

At block 2914, the app may determine that the current country does not use a single-digit trunk plus await code followed by the country's exit code. When the combination of codes is not used, the international call logic sequence may progress to block 2918. At this block, the current country's exit code may be captured from the dialing codes database (excerpted in FIGS. 36A and 36B). The international call logic sequence may continue at block 2920 after capture of the exit code.

At this point in the international call logic sequence, the app may have captured the current country's international carrier code at block 2912, the single-digit trunk plus await code and the current country's exit code at block 2916, or the current country's exit code at block 2918. The individual captured codes constitute an exit-code portion of the EDP for the international phone call. At subsequent blocks in the international call logic sequence, the app will append the entry code(s) for the destination country to complete the EDP.

At block 2920, the app may determine if the destination country uses different entry codes for mobile devices and land lines. The international call logic sequence continues at block 2922 if different entry codes are used. At block 2922, the app may capture the destination country's entry code from the dialing codes database. The app may concatenate the current country's EDP, the destination country's entry code, and the mobile-device entry code or the land-line entry code. The resulting series of digits is a second EDP string. After the second EDP string is formed, the international call logic sequence may continue at block 2926.

At block 2920, the app may determine that the destination country does not use different entry codes for mobile devices and land lines. The international call logic sequence continues at block 2924 if different entry codes are not used. At block 2924, the app may combine the current country's EDP and the destination country's entry code. The resulting series of digits is a third EDP string. After the third EDP string is formed, the international call logic sequence may continue at block 2926.

At block 2926, the user may dial the local phone number in the destination country. The international call logic sequence may continue at block 2928 once the local phone number has been dialed.

At block 2928, the app may determine if the dialed phone number passes the verification test. This test involves the comparison of the first few digits of the dialed phone number to the destination country's verification sequences found in the verification database (excerpted in FIG. 35). In other words, the app may execute the verification logic sequence which is explained in detail with reference to FIG. 28.

If the first few digits of the dialed phone number match a verification sequence, the phone number passes the verification test and the international call logic sequence continues at block 2930. If a matching verification sequence is not found, the phone number does not pass the verification test for one of two reasons. The user may have inadvertently dialed the phone number incorrectly or the phone number is not a valid phone number in the destination country. The international call logic sequence may continue at block 2932, where the dialer resets. The call logic sequence may return to block 2926 and the user may once again attempt to dial the local phone number. Blocks 2926, 2928, and 2932 are repeated until the user dials the correct phone number and it passes the verification test or until the user is satisfied that the phone number is not a valid phone number in the destination country.

If the local phone number passes the verification test, the international call logic sequence may continue at block 2930. At this block, the app may determine if the dialed phone number conforms to the destination country's minimum and maximum rules (MMR) found in the dialing codes database (excerpted in FIGS. 36A and 36B). The MMR specify the minimum and maximum number of digits contained in a country's phone numbers. The app may compare the number of digits in the dialed phone number to the MMR for the destination country. If the dialed phone number has an appropriate number of digits, the international call logic sequence may continue at block 2934.

If the dialed phone number has too few or too many digits, it does not conform to the MMR for the destination country for one of two reasons. The user may have inadvertently dialed the phone number incorrectly or the phone number is not a valid phone number in the destination country. The international call logic sequence may continue at block 2932, where the dialer resets. The call logic sequence may return to block 2926 and the user may once again attempt to dial the local phone number. Blocks 2926, 2928, 2930, and 2932 are repeated until the user dials the correct phone number and it conforms to the destination country's MMR or until the user is satisfied that the phone number is not a valid phone number in the destination country. In the latter instance, the dialed phone number passed the verification test, but had too few or too many digits. A valid phone number has to pass the verification test and conform to the MMR for the destination country. Hence, the dialed phone number is not an actual phone number in the destination country even though it passed the verification test.

If the dialed phone number conforms to the MMR, the international call logic sequence may continue at block 2934. At this block, the dialer may concatenate an EDP string and the dialed local phone number. The EDP string may be the first EDP string obtained at block 2908, the second EDP string obtained at block 2922, or the third EDP string obtained at block 2924. The EDP string consists of a series of digits determined by the answers to the sequence of questions at blocks 2906, 2910, 2914, and 2920. The first EDP string is the captured alliance dialing code. The second EDP string is composed of the current country's EDP, the destination country's entry code, and the mobile-device entry code or the land-line entry code. The third EDP string consists of the current country's EDP plus the destination country's entry code. The appropriate EDP string may be concatenated with the dialed local phone number to form an international concatenation.

Once concatenation has occurred, the international call logic sequence may progress to block 2936. At this block, the app determines if the user intends to initiate a phone call. If so, the call logic sequence may continue at block 2938. If not, the user intends to send a text message and the call logic sequence may continue at block 2946.

At block 2938, the destination city for the local phone number may be displayed in the destination city field 1204 near the top of the dialer screen shown in FIG. 12. At block 2940, the app may enable the user to dial the international concatenation utilizing the user's default phone application. The TIN-formatted phone number may be saved to the call log at block 2942 and the phone call may be initiated at block 2944.

If the user is sending a text message, the app opens the user's default text application and displays the international concatenation at block 2946. The user is enabled to type the text message at block 2948 and the text message is sent at block 2950.

Figure 30:
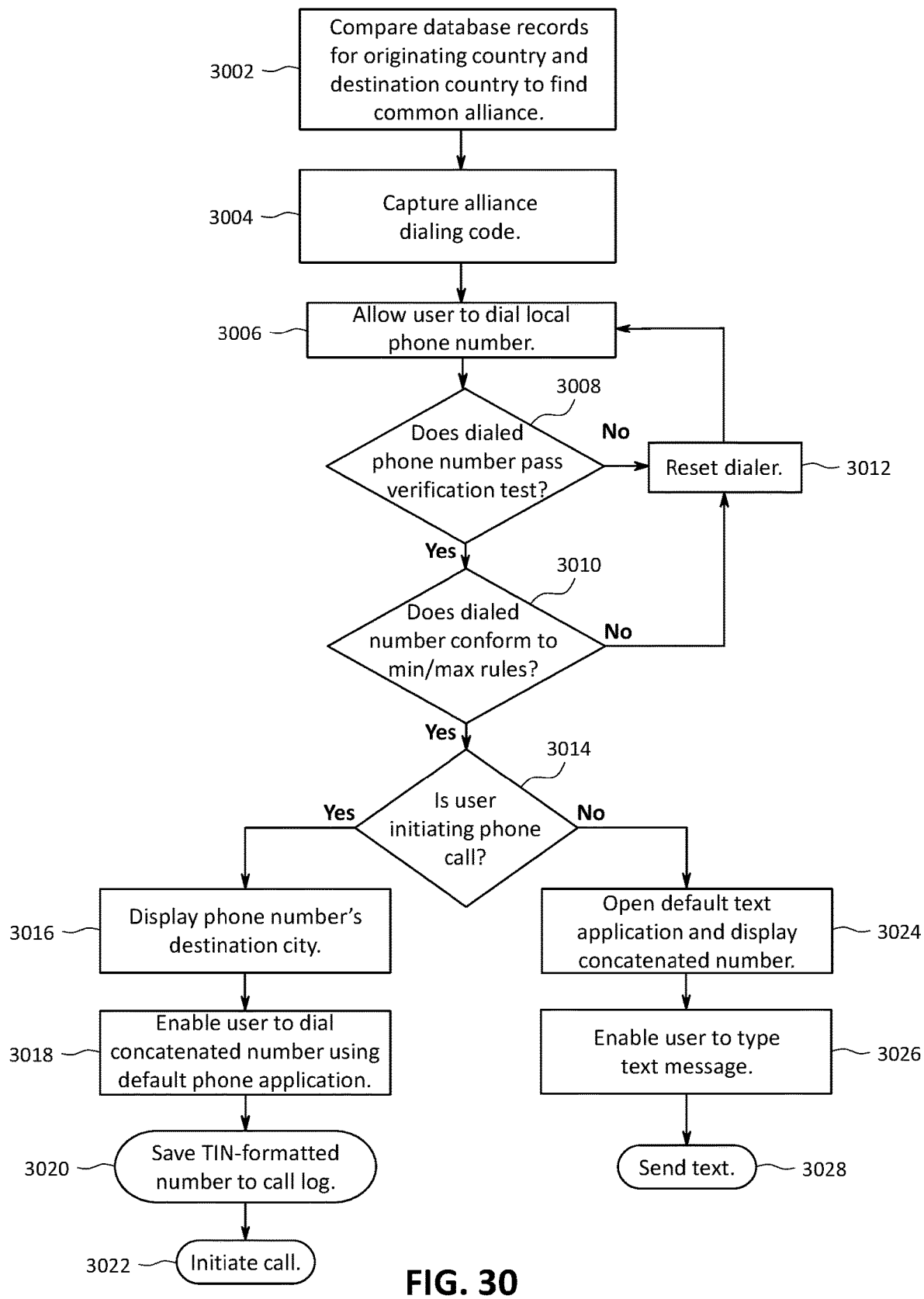
FIG. 30 is a logic flow diagram for an alliance rule logic sequence.

FIG. 30 is a logic flow diagram for an alliance rule logic sequence. The logic sequence is used at block 2908 in FIG. 29A to capture the alliance dialing code. The logic sequence may begin at block 3002.

At block 3002, a common alliance may be found by accessing the dialing codes database (excerpted in FIGS. 36A and 36B) and comparing the records for the international phone call's originating country and destination country. The app may determine that the originating and destination countries are members of the same telecommunications alliance if the records for both countries contain a reference to the alliance. For example, if a user in the Bahamas is calling Barbados, the app accesses the dialing codes database, compares the records for the Bahamas and Barbados, and determines that both countries are members of the North American Numbering Plan (NANP) alliance.

The alliance rule logic sequence may continue at block 3004 once the common alliance is identified. At block 3004, an alliance dialing code may be captured from the destination country's record. The logic sequence may advance from block 3004 to block 3006.

At block 3006, the user may dial the local phone number in the destination country. The alliance rule logic sequence may continue at block 3008 once the local phone number has been dialed.

At block 3008, the app may determine if the dialed phone number passes the verification test. This test involves the comparison of the first few digits of the dialed phone number to the destination country's verification sequences found in the verification database (excerpted in FIG. 35). In other words, the app may execute the verification logic sequence which is explained in detail with reference to FIG. 28.

If the first few digits of the dialed phone number match a verification sequence, the phone number passes the verification test and the alliance rule logic sequence continues at block 3010. If a matching verification sequence is not found, the dialed phone number does not pass the verification test for one of two reasons. The user may have inadvertently dialed the phone number incorrectly or the phone number is not a valid phone number in the destination country. The alliance rule logic sequence may continue at block 3012, where the dialer resets. The logic sequence may return to block 3006 and the user may once again attempt to dial the local phone number. Blocks 3006, 3008, and 3012 are repeated until the user dials the correct phone number and it passes the verification test or until the user is satisfied that the phone number is not a valid phone number in the destination country.

If the dialed phone number passes the verification test, the alliance rule logic sequence may continue at block 3010. At this block, the app may determine if the dialed phone number conforms to the destination country's minimum and maximum rules (MMR) found in the dialing codes database (excerpted in FIGS. 36A and 36B). The MMR specify the minimum and maximum number of digits contained in a country's phone numbers. The app may compare the number of digits in the dialed phone number to the MMR for the destination country. If the dialed phone number has an appropriate number of digits, the alliance rule logic sequence may continue at block 3014.

If the dialed phone number has too few or too many digits, it does not conform to the MMR for the destination country for one of two reasons. The user may have inadvertently dialed the phone number incorrectly or the phone number is not a valid phone number in the destination country. The alliance rule logic sequence may continue at block 3012, where the dialer resets. The logic sequence may return to block 3006 and the user may once again attempt to dial the local phone number. Blocks 3006, 3008, 3010, and 3012 are repeated until the user dials the correct phone number and it conforms to the destination country's MMR or until the user is satisfied that the phone number is not a valid phone number in the destination country. In the latter instance, the dialed phone number passed the verification test, but had too few or too many digits. A valid phone number has to pass the verification test and conform to the MMR for the destination country. Hence, the dialed phone number is not an actual phone number in the destination country even though it passed the verification test.

If the dialed phone number conforms to the MMR, the alliance rule logic sequence may continue at block 3014. At this block, the app determines if the user intends to initiate a phone call. If so, the logic sequence may continue at block 3016. If not, the user intends to send a text message and the logic sequence may continue at block 3024.

At block 3016, the destination city for the local phone number may be displayed in the destination city field 1204 near the top of the dialer screen shown in FIG. 12. At block 3018, the app enables the user to dial the alliance concatenation which is the combination of the alliance dialing code captured at block 2908 in FIG. 29A and the local phone number. The user may dial the alliance concatenation using the default phone application on the user's communication device. The TIN-formatted phone number may be saved to the call log at block 3020 and the phone call may be initiated at block 3022.

If the user is sending a text message, the app may open the default text application and display the alliance concatenation at block 3024. The user is enabled to type the text message at block 3026 and the text message is sent at block 3028.

Figure 31A:
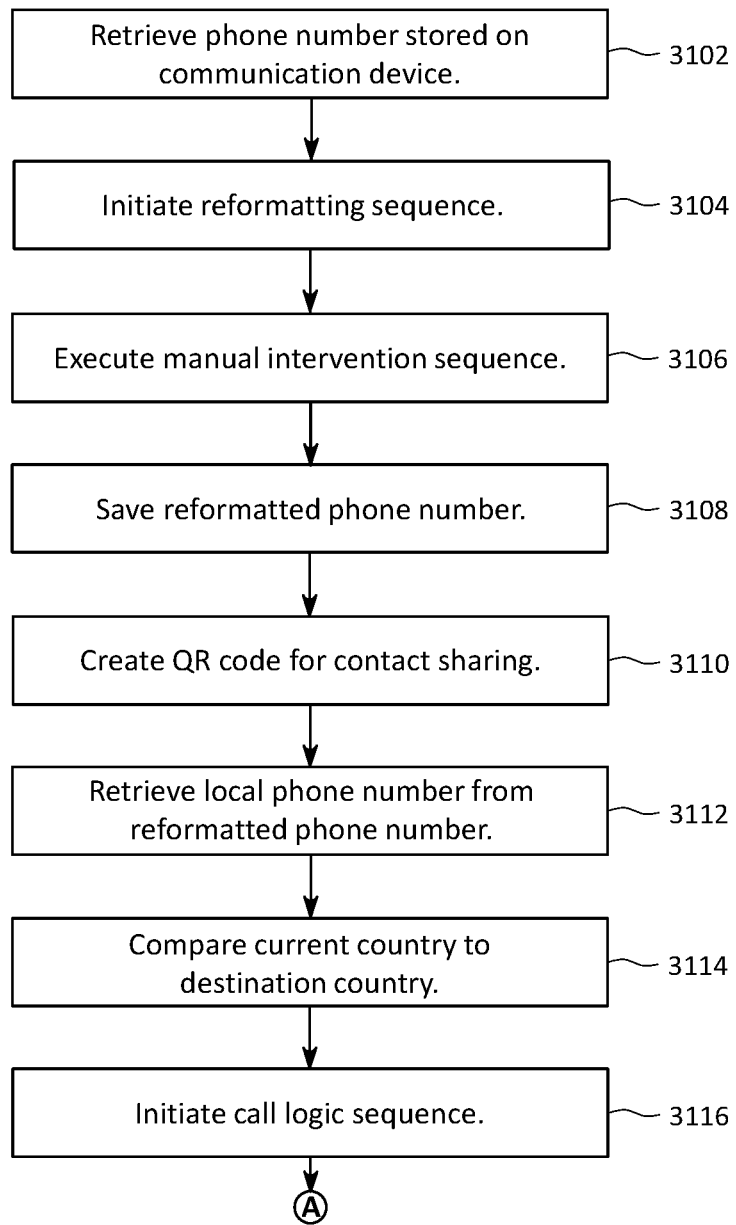
FIGS. 31A and 31B are a process flow diagram of a method for using a global dialing format.
Figure 31B:
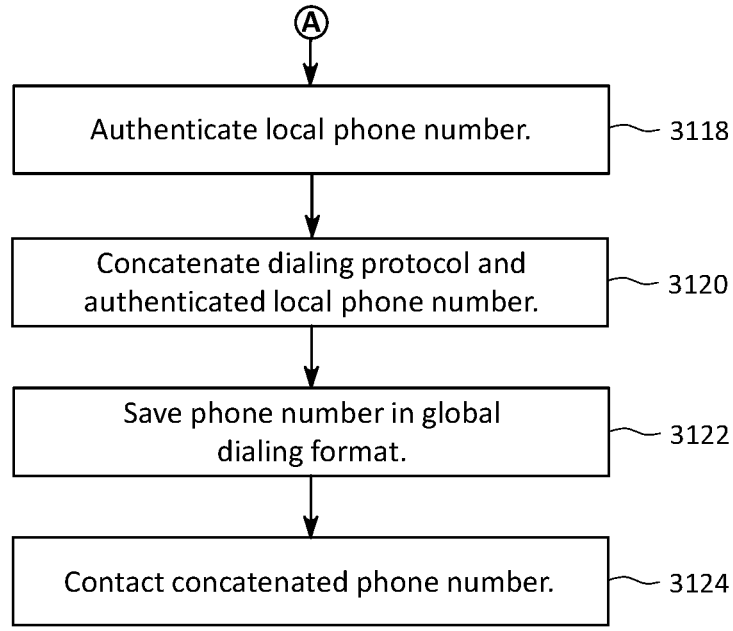

FIGS. 31A and 31B are a process flow diagram of a method for using a global dialing format. The method may be performed when the logic sequence shown in FIG. 1 is implemented as instructions that are read and executed by at least one processor.

At block 3102, a phone number stored on a communication device may be retrieved. At block 3104, a reformatting sequence may be initiated. The reformatting sequence may convert the retrieved phone number to the global dialing format "ISO.number," where "ISO" is the three-letter ISO country code for the destination country and "number" is the local phone number in the destination country.

The reformatting sequence may be composed of four logic sequences that are explained in detail with reference to FIGS. 5A and 5B, 6A and 6B, 7A and 7B, and 8. The retrieved phone number may be reformatted by any of the four logic sequences. However, the four logic sequences may be unable to reformat some of the retrieved phone numbers. When this occurs, a user may intervene. At block 3106, a manual intervention sequence may be executed. The manual intervention sequence may allow the user to intercede and reformat the retrieved phone number. At block 3108, the reformatted phone number may be saved to a contacts list on the communication device. The phone number is saved whether it was converted to the global dialing format by the reformatting sequence or the manual intervention sequence.

At block 3110, a QR code may be created for contact sharing. The QR code may represent contact information for the user or a number of the user's contacts. The creation of a QR code is explained in detail with reference to FIG. 24. Contact sharing may occur when the QR code is exported to the communication device of another user.

At block 3112, the local phone number may be retrieved from the reformatted phone number saved on the user's communication device. Block 3112 may begin the conversion of the saved phone number to a dialable format. This conversion may be initiated when the user decides to dial the saved number and chooses it from a list of phone numbers stored on his or her communication device.

At block 3114, the user's current country may be compared to the destination country. The user's current country is the country in which the communication device is located. The destination country is the country corresponding to the ISO country code in the saved phone number. A domestic call logic sequence may be initiated at block 3116 if the user's current country and the destination country are the same. An international call logic sequence may be initiated at block 3116 if the two countries are different. Whether the phone call is domestic or international, the call logic sequence may determine the dialing codes and prefixes necessary to complete the call to the local phone number. The domestic call logic sequence is explained in detail with reference to FIGS. 27A and 27B and the international call logic sequence is explained in detail with reference to FIGS. 29A-29C.

At block 3118, the local phone number may be authenticated. The authentication process determines if the local phone number is an actual phone number in the destination country. Two steps are involved. The verification test compares the first few digits of the local phone number to verification sequences that begin phone numbers in the destination country. The local phone number passes the verification test if the first few digits match a verification sequence. The second step of the authentication process compares the number of digits in the local phone number to the minimum and maximum rules (MMR) for the destination country. The MMR specify the minimum and maximum number of digits contained in the destination country's phone numbers. The local phone number conforms to the MMR if it has an appropriate number of digits. Authentication occurs if the local phone number passes the verification test and conforms to the MMR.

At block 3120, the authenticated local phone number may be concatenated with a dialing protocol. The dialing protocol contains the dialing codes and prefixes required to call the local phone number in the destination country. The dialing codes and prefixes were identified and captured during the call logic sequence initiated at block 3116. The concatenation of the dialing protocol and the authenticated local phone number results in a concatenated phone number. At block 3122, the retrieved phone number may be saved to the call log in the global dialing format. The concatenated phone number may be contacted, i.e., called or texted, at block 3124.

Figure 32:
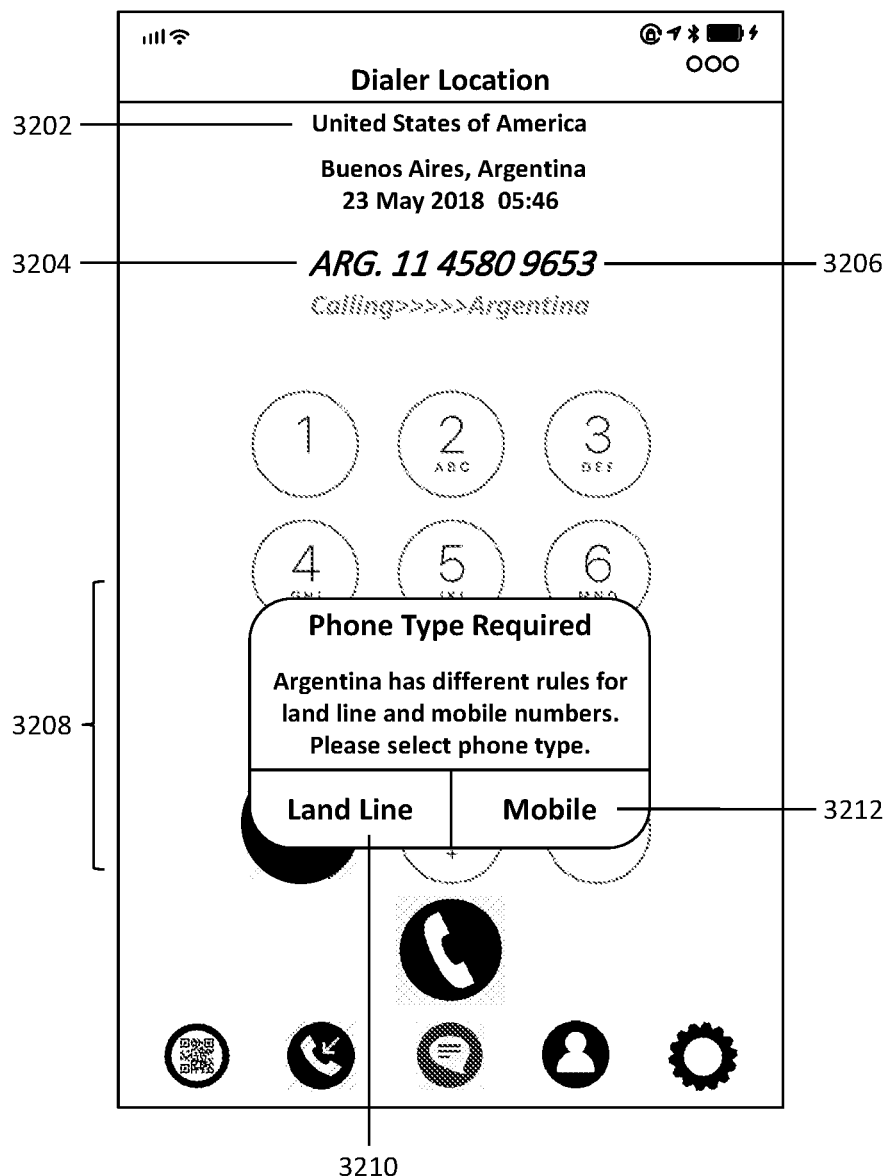
FIG. 32 is an illustration of a dialer screen used to initiate an international phone call to Argentina.

FIG. 32 is an illustration of a dialer screen used to initiate an international phone call to Argentina. A small number of countries have different conventions for incoming international calls to land lines and incoming international calls to mobile devices. Argentina is one such country. In FIG. 32, the user is calling Argentina from the United States. The dialer location field 3202 indicates that the "United States of America" is the originating country. The ISO country code "ARG" displayed in the ISO country code field 3204 signifies that Argentina is the destination country. The local phone number to be called "11 4580 9653" is shown in the phone number field 3206.

Figure 33:
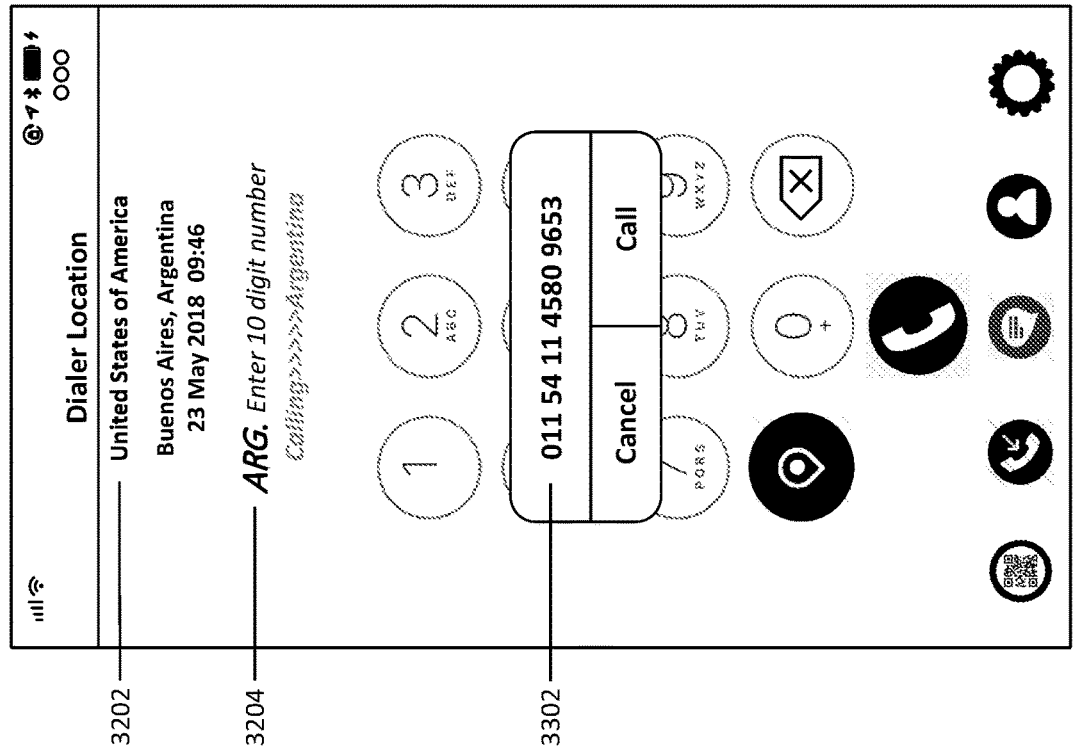
FIG. 33 is an illustration of the dialer screen used to make an international phone call to a land line in Argentina.

After the local phone number is dialed, an alert 3208 appears on the dialer screen. The alert 3208 informs the user that Argentina has different rules for land line and mobile numbers and a phone type has to be selected. In an embodiment, the user may be placing an international phone call to a land line in Argentina. The user selects the "Land Line" option 3210 from the alert 3208. Argentina does not require the addition of a land-line entry code to an international phone number when a land line is called. This is shown in FIG. 33. In another embodiment, the user may be placing an international phone call to a mobile device in Argentina. If so, the user selects the "Mobile" option 3212 from the alert 3208. Argentina does require the addition of a mobile-device entry code to an international phone number when a mobile device is called. The entry code for mobile devices is inserted into the international phone number after the entry code for Argentina and before the local phone number. This is shown in FIG. 34.

FIG. 33 is an illustration of the dialer screen used to make an international phone call to a land line in Argentina. As in FIG. 32, the dialer location field 3202 indicates that the "United States of America" is the originating country and the ISO country code "ARG" displayed in the ISO country code field 3204 signifies that Argentina is the destination country. The screen shown in FIG. 33 appears after the user selects the "Land Line" option 3210 from the alert 3208 displayed on the screen shown in FIG. 32. In FIG. 33, the international phone number 3302 includes the exit code "011" for the United States and the entry code "54" for Argentina. No land-line entry code is inserted between the entry code "54" for Argentina and the local phone number "11 4580 9653" because Argentina does not require the addition of a land-line entry code. The international phone number is saved to the call log as "ARG.1145809653." The type of destination device (land line) is also saved to the call log.

Figure 34:
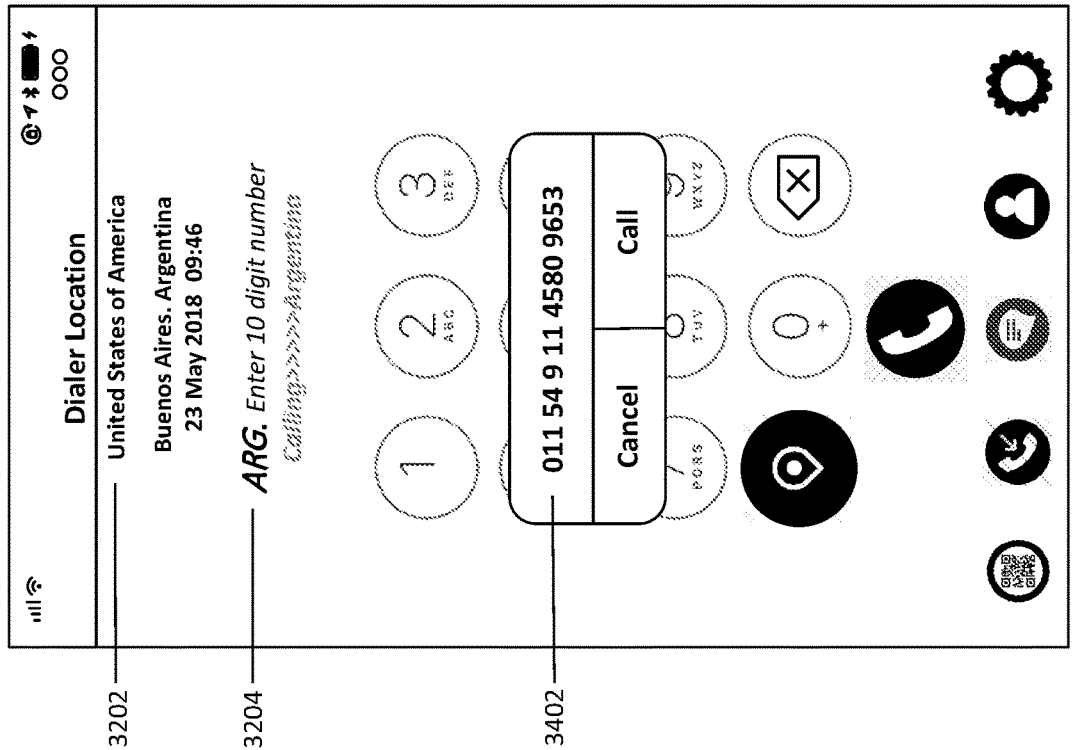
FIG. 34 is an illustration of the dialer screen used to make an international phone call to a mobile device in Argentina.

FIG. 34 is an illustration of the dialer screen used to make an international phone call to a mobile device in Argentina. The screen shown in FIG. 34 appears after the user selects the "Mobile" option 3212 from the alert 3208 displayed on the screen shown in FIG. 32. In FIG. 34, the international phone number 3402 includes the mobile-device entry code "9" inserted between the entry code "54" for Argentina and the local phone number "11 4580 9653" because Argentina requires the addition of a mobile-device entry code. The international phone number is saved to the call log as "ARG.1145809653." The type of destination device (mobile) is also saved to the call log.

The embodiments disclosed herein may be implemented as instructions stored on a tangible, non-transitory, machine-readable medium. These instructions may be read and executed by a computing platform to perform the functions described above. A tangible, non-transitory, machine-readable medium may include any tangible, non-transitory medium for storing information in a form readable by a machine, e.g., a computer. Examples of a tangible, non-transitory, machine-readable medium may include read only memory (ROM), random access memory (RAM), magnetic disk storage media, optical storage media, flash memory devices, or the like.

An embodiment is an implementation or example. Reference to "an embodiment," "present embodiment," "some embodiments," or "other embodiments" signifies that a particular instruction, function, or feature is included in at least some embodiments, but not necessarily in all embodiments, of the present techniques. The various occurrences of "an embodiment," "present embodiment," "some embodiments," or "other embodiments" are not necessarily referring to the same embodiments All of the instructions, functions, and features described and illustrated herein do not need to be included in a particular embodiment or embodiments. For example, if the specification states that an instruction, function, or feature "may" be included, that particular instruction, function, or feature is not required to be present. If the specification or a claim refers to "a" or "an" element, there is not necessarily only one of the element. If the specification or a claim refers to "an additional" element, there may be more than one of the additional element.

Some embodiments have been described by referring to particular implementations. However, other implementations are possible. The implementations of the present techniques are not limited to those disclosed herein. Additionally, the sequence of the instructions or functions and the arrangement of the features described above or illustrated in the drawings are not required to be sequenced or arranged in the particular way described or illustrated. Other sequences and arrangements are possible.

Elements shown in the drawings may have the same reference number to suggest that the elements are similar. Alternatively, elements shown in the drawings may have different reference numbers to suggest that the elements are different. However, an element may be flexible enough to be present in some or all of the implementations described above or shown in the drawings. Various elements described herein or depicted in the drawings may be referred to as a first element, a second element, etc. It is arbitrary which element is designated the first element, the second element, and so on.

Details of an aforementioned example may apply to one or more embodiments. For instance, all optional features of the computer-readable medium may be implemented by the method described above. Further, the embodiments of the present techniques are not limited to those embodiments described herein or shown in the drawings. Logic flow diagrams and process flow diagrams have been used to illustrate embodiments. However, the present techniques are not limited to those diagrams or to the corresponding descriptions. For example, the sequences and processes exemplified in the diagrams do not need to progress through each box shown or in exactly the same order as illustrated.

The present techniques are not restricted to the particular details described herein. Those skilled in the art having the benefit of this disclosure will appreciate that many other variations of the foregoing description and accompanying drawings are possible and remain within the scope of the present techniques. Accordingly, it is the following claims and any amendments thereto that define the scope of the present techniques.

What is claimed is:

1. At least one non-transitory computer-readable medium, comprising instructions to direct at least one processor to:
retrieve a phone number stored on a communication device;
initiate a reformatting sequence to reformat the phone number, wherein the reformatting sequence comprises a first logic sequence, a second logic sequence, a third logic sequence, and a fourth logic sequence;
execute a manual intervention sequence when the reformatting sequence is unable to reformat the phone number;
save a reformatted phone number to the communication device, wherein the reformatted phone number is in a global dialing format comprising a concatenation of an International Organization for Standardization (ISO) country code and a local phone number in a destination country represented by the ISO country code and wherein the reformatted phone number is obtained from the reformatting sequence or from the manual intervention sequence;
initiate generation of a quick response (QR) code to share contact information associated with the reformatted phone number;
enable a user to select a QR code icon on a home screen of the communication device;
enable the user to select an option from a QR code menu that appears when the QR code icon is selected, wherein the option generates the QR code for export;
empty a list;
create a data structure by combining a set of data elements for the reformatted phone number;
insert the data structure into the list; and
generate the QR code representing the list;
retrieve the local phone number from the reformatted phone number when the user selects the reformatted phone number;
initiate a call logic sequence, wherein the call logic sequence is a domestic call logic sequence or an international call logic sequence;
execute an authentication process, wherein an authenticated local phone number is obtained and wherein the authentication process comprises a verification test and a digit count test;
concatenate a dialing protocol and the authenticated local phone number, wherein a concatenated phone number is obtained;
save the phone number to a call log on the communication device, wherein the phone number is saved in the global dialing format; and
contact the concatenated phone number.

2. The at least one non-transitory computer-readable medium of claim 1, comprising instructions to:
initiate the first logic sequence of the reformatting sequence when the phone number begins with a "+" symbol;
remove the "+" symbol, wherein a remainder of the phone number is obtained;
set a loop counter equal to five;
begin a loop;
set a number of digits in a beginning series of digits in the remainder of the phone number equal to the loop counter;
set a remaining series of digits equal to the remainder of the phone number minus the beginning series of digits;
determine if a set of criteria is satisfied, wherein the set of criteria is satisfied when the beginning series of digits matches an entry code for a first destination country and the remaining series of digits conforms to a minimum rule, a maximum rule, and a verification rule for the first destination country,
wherein if the set of criteria is satisfied,
remove the beginning series of digits;
reformat the phone number, wherein a first reformatted phone number is obtained and wherein the first reformatted phone number is a first concatenation of a first ISO country code for the first destination country and the remaining series of digits;
save the first reformatted phone number to the communication device;
wherein if the set of criteria is not satisfied,
decrement the loop counter by one;
repeat the loop until the first reformatted phone number is saved to the communication device or until five iterations of the loop are complete; and
proceed to initiate the second logic sequence of the reformatting sequence when five iterations of the loop are complete.

3. The at least one non-transitory computer-readable medium of claim 1, comprising instructions to:
initiate the second logic sequence of the reformatting sequence when the phone number begins with an exit code for a current country, wherein the user is located in the current country;
remove the exit code, wherein a first remainder of the phone number is obtained;
set a first loop counter equal to five;
begin a first loop;
set a first number of digits in a first beginning series of digits in the first remainder of the phone number equal to the first loop counter;
set a first remaining series of digits equal to the first remainder of the phone number minus the first beginning series of digits;
determine if a first set of criteria is satisfied, wherein the first set of criteria is satisfied when the first beginning series of digits matches a first entry code for a second destination country and the first remaining series of digits conforms to a first minimum rule, a first maximum rule, and a first verification rule for the second destination country,
wherein if the first set of criteria is satisfied,
remove the first beginning series of digits;
reformat the phone number, wherein a second reformatted phone number is obtained and wherein the second reformatted phone number is a second concatenation of a second ISO country code for the second destination country and the first remaining series of digits;
save the second reformatted phone number to the communication device;
wherein if the first set of criteria is not satisfied,
decrement the first loop counter by one;
repeat the first loop until the second reformatted phone number is saved to the communication device or until five iterations of the first loop are complete; and
proceed to initiate the third logic sequence of the reformatting sequence when five iterations of the first loop are complete.

4. The at least one non-transitory computer-readable medium of claim 1, comprising instructions to:
  initiate the third logic sequence of the reformatting sequence;
  capture a minimum external dialing protocol (EDP) length and a maximum EDP length from a database containing all possible external dialing protocols;
  calculate a number of searches to be performed by subtracting the minimum EDP length from the maximum EDP length;
  set a current loop index equal to the maximum EDP length;
  begin a second loop;
  set a second number of digits in a second beginning series of digits in the phone number equal to the current loop index;
  capture the second beginning series of digits in the phone number, wherein a captured substring and a second remaining series of digits are obtained;
  search the database containing all possible external dialing protocols for a series of digits that matches the captured sub string;
  determine if a second criterion is satisfied, wherein the second criterion is satisfied when the series of digits matches the captured sub string,
    wherein if the second criterion is satisfied,
      determine if a third set of criteria is satisfied, wherein the third set of criteria is satisfied when the second remaining series of digits conforms to a second minimum rule, a second maximum rule, and a second verification rule for a third destination country,
        wherein if the third set of criteria is satisfied,
          designate a third ISO country code for the third destination country and the second remaining series of digits as an outcome, wherein the outcome is saved to a results array;
          decrement the current loop index by one;
        wherein if the third set of criteria is not satisfied,
          decrement the current loop index by one;
    wherein if the second criterion is not satisfied,
      decrement the current loop index by one;
  repeat the second loop until a number of completed iterations equals the number of searches to be performed;
  determine a results array count, wherein the results array count equals a number of outcomes saved to the results array,
    wherein if the results array count equals zero,
      proceed to initiate the fourth logic sequence of the reformatting sequence;
    wherein if the results array count equals one,
      reformat the phone number by removing the captured substring and converting the phone number to a third concatenation of the third ISO country code for the third destination country and the second remaining series of digits, wherein a third reformatted phone number is obtained; and
    wherein if the results array count is greater than one,
      save the results array as an ambiguous numbers array, and
      proceed to initiate the manual intervention sequence.

5. The at least one non-transitory computer-readable medium of claim 1, comprising instructions to:
  initiate the fourth logic sequence of the reformatting sequence;
  determine a default country, wherein the user is located in the default country;
  access a record for the default country in a database containing dialing codes and prefixes;
  determine if a fourth criterion is satisfied, wherein the fourth criterion is satisfied when the default country uses a domestic trunk,
    wherein if the fourth criterion is satisfied,
      determine if a fifth criterion is satisfied, wherein the fifth criterion is satisfied when the phone number begins with the domestic trunk,
        wherein if the fifth criterion is satisfied,
          remove the domestic trunk from the phone number, wherein a second remainder of the phone number is obtained;
          proceed to determine if a sixth set of criteria is satisfied;
        wherein if the fifth criterion is not satisfied, proceed to determine if a sixth set of criteria is satisfied;
    wherein if the fourth criterion is not satisfied,
      determine if a sixth set of criteria is satisfied, wherein the sixth set of criteria is satisfied when the second remainder of the phone number conforms to a third minimum rule, a third maximum rule, and a third verification rule for the default country,
        wherein if the sixth set of criteria is satisfied,
          reformat the phone number, wherein a fourth reformatted phone number is obtained and wherein the fourth reformatted phone number is a fourth concatenation of a fourth ISO country code for the default country and the second remainder of the phone number; and
        wherein if the sixth set of criteria is not satisfied,
          proceed to initiate the manual intervention sequence.

6. The at least one non-transitory computer-readable medium of claim 1, comprising instructions to:
  initiate the manual intervention sequence;
  retrieve an unresolved phone number selected by the user from a display of unresolved numbers;
  retrieve a fifth ISO country code selected by the user;
  identify a fourth destination country represented by the fifth ISO country code;
  determine if a seventh set of criteria is satisfied, wherein the seventh set of criteria is satisfied when the unresolved phone number conforms to a fourth minimum rule, a fourth maximum rule, and a fourth verification rule for the fourth destination country,
    wherein if the seventh set of criteria is satisfied,
      reformat the unresolved phone number, wherein a fifth reformatted phone number is obtained and wherein the fifth reformatted phone number is a fifth concatenation of the fifth ISO country code and the unresolved phone number selected by the user;
    wherein if the seventh set of criteria is not satisfied,
      display a series of suggested phone numbers, wherein a suggested phone number contains at least a minimum number of digits and at most a maximum number of digits and wherein the minimum number of digits and the maximum number of digits are specified by the fourth minimum rule and the fourth maximum rule for the fourth destination country;
      determine if an eighth criterion is satisfied, wherein the eighth criterion is satisfied when the user selects a first suggested phone number from the series of suggested phone numbers,
        wherein if the eighth criterion is satisfied, reformat the first suggested phone number, wherein a sixth reformatted phone number is obtained and wherein the sixth reformatted phone number is a sixth concatenation of the fifth ISO country code and the first suggested phone number selected by the user;

wherein if the eighth criterion is not satisfied,
  enable the user to edit the unresolved phone number, wherein an edited phone number is obtained;
  determine if a ninth set of criteria is satisfied, wherein the ninth set of criteria is satisfied when the edited phone number conforms to the fourth minimum rule, the fourth maximum rule, and the fourth verification rule for the fourth destination country,
  wherein if the ninth set of criteria is satisfied,
    reformat the edited phone number, wherein a seventh reformatted phone number is obtained and wherein the seventh reformatted phone number is a seventh concatenation of the fifth ISO country code and the edited phone number;
  wherein if the ninth set of criteria is not satisfied,
    enable the user to edit the edited phone number until a first edited phone number satisfies the ninth set of criteria; and
    reformat the first edited phone number, wherein an eighth reformatted phone number is obtained and wherein the eighth reformatted phone number is an eighth concatenation of the fifth ISO country code and the first edited phone number.

7. The at least one non-transitory computer-readable medium of claim 1, comprising instructions to:
  initiate importing of a first QR code that represents information about one or more contacts of another user;
  enable the user to select the QR code icon on the home screen of the communication device of the user;
  enable the user to select a first option from the QR code menu that appears when the QR code icon is selected, wherein the first option allows the user to import contact information;
  enable the user to scan the first QR code displayed on a first communication device of the other user;
  extract a first list from the first QR code;
  begin a third loop;
  extract a first data structure from the first list;
  separate the first data structure into a first set of data elements;
  attempt to authenticate a first phone number included in the first set of data elements;
  determine if a tenth criterion is satisfied, wherein the tenth criterion is satisfied when the first phone number is authenticated,
    wherein if the tenth criterion is satisfied,
      add the first set of data elements to a database of QR code generated contacts on the communication device of the user;
    wherein if the tenth criterion is not satisfied,
      display a manual correction screen;
      enable the user to use the manual correction screen to correct the first phone number;
      determine if an eleventh criterion is satisfied, wherein the eleventh criterion is satisfied when the user corrects the first phone number and wherein a corrected first phone number is obtained,
        wherein if the eleventh criterion is satisfied,
          add the corrected first phone number to the database of QR code generated contacts on the communication device of the user;
        wherein if the eleventh criterion is not satisfied,
          discard the first phone number; and
  repeat the third loop until a last phone number from the first list is added to the database of QR code generated contacts or is discarded.

8. The at least one non-transitory computer-readable medium of claim 1, comprising instructions to:
  enable the user to select a ninth reformatted phone number to be called or texted, wherein the ninth reformatted phone number is a ninth concatenation of a sixth ISO country code for a country and a first local phone number in the country;
  determine if a twelfth criterion is satisfied, wherein the twelfth criterion is satisfied when the sixth ISO country code for the country is the same as a seventh ISO country code for the current country,
    wherein if the twelfth criterion is satisfied,
      initiate the domestic call logic sequence;
      display a tenth concatenation of an internal dialing protocol and the first local phone number;
      proceed to determine if a thirteenth criterion is satisfied;
    wherein if the twelfth criterion is not satisfied,
      initiate the international call logic sequence;
      display an eleventh concatenation of an external dialing protocol and the first local phone number;
      proceed to determine if a thirteenth criterion is satisfied;
    determine if a thirteenth criterion is satisfied, wherein the thirteenth criterion is satisfied when the user makes a phone call,
      wherein if the thirteenth criterion is satisfied,
        enable the user to dial the tenth concatenation when the domestic call logic sequence is initiated or the eleventh concatenation when the international call logic sequence is initiated;
        save the ninth reformatted phone number to the call log on the communication device;
        initiate the phone call;
      wherein if the thirteenth criterion is not satisfied,
        open a default text application on the communication device;
        enable the user to type a text message; and
        send the text message.

9. The at least one non-transitory computer-readable medium of claim 8, comprising instructions to:
  allow the user to select a tenth reformatted phone number to be called or texted, wherein the tenth reformatted phone number is a twelfth concatenation of an eighth ISO country code for a first country and a second local phone number in the first country;
  establish that the eighth ISO country code for the first country matches the seventh ISO country code for the current country;
  initiate the domestic call logic sequence;
  determine if a fourteenth criterion is satisfied, wherein the fourteenth criterion is satisfied when the first country uses a domestic carrier code,
    wherein if the fourteenth criterion is satisfied,
      determine if a fifteenth criterion is satisfied, wherein the fifteenth criterion is satisfied when the user has designated a default carrier,
        wherein if the fifteenth criterion is satisfied, proceed to determine if a sixteenth criterion is satisfied;
wherein if the fifteenth criterion is not satisfied,
prompt the user to select the default carrier;
proceed to determine if a sixteenth criterion is satisfied;
determine if a sixteenth criterion is satisfied, wherein the sixteenth criterion is satisfied when the default carrier uses different logic for intra-city calls or texts and inter-city calls or texts,
wherein if the sixteenth criterion is satisfied,
determine if a seventeenth criterion is satisfied,
wherein the seventeenth criterion is satisfied when an intra-city phone number is called or texted,
wherein if the seventeenth criterion is satisfied,
extract an intra-city code from the database containing dialing codes and prefixes;
capture the intra-city code, wherein a captured intra-city code is obtained;
proceed to authenticate the second local phone number;
wherein if the seventeenth criterion is not satisfied,
extract an inter-city code from the database containing dialing codes and prefixes;
capture the inter-city code, wherein a captured inter-city code is obtained;
proceed to authenticate the second local phone number;
wherein if the sixteenth criterion is not satisfied,
capture a default carrier code, wherein a captured default carrier code is obtained;
proceed to authenticate the second local phone number;
wherein if the fourteenth criterion is not satisfied,
determine if an eighteenth criterion is satisfied, wherein the eighteenth criterion is satisfied when the first country uses a trunk prefix,
wherein if the eighteenth criterion is satisfied,
determine if a nineteenth criterion is satisfied, wherein the nineteenth criterion is satisfied when the trunk prefix is different for calls or texts to mobile devices and calls or texts to land lines,
wherein if the nineteenth criterion is satisfied,
capture a mobile-device prefix or a land-line prefix from the database containing dialing codes and prefixes, wherein a captured mobile-device prefix or a captured land-line prefix is obtained;
proceed to authenticate the second local phone number;
wherein if the nineteenth criterion is not satisfied,
determine if a twentieth criterion is satisfied,
wherein the twentieth criterion is satisfied when the first country uses a single-digit trunk plus await code,
wherein if the twentieth criterion is satisfied,
capture the single-digit trunk plus await code from the
database containing dialing codes and prefixes and wherein
a captured single-digit trunk plus await code is obtained;
program the captured single-digit trunk plus await code to pause dialing for five seconds;
proceed to authenticate the second local phone number;
wherein if the twentieth criterion is not satisfied,
capture the trunk prefix from the database containing dialing codes and prefixes, wherein a captured trunk prefix is obtained;
proceed to authenticate the second local phone number;
wherein if the eighteenth criterion is not satisfied,
proceed to authenticate the second local phone number;
authenticate the second local phone number;
determine if a twenty-first criterion is satisfied, wherein the twenty twenty-first criterion is satisfied when the second local phone number passes a first verification test for the first country;
wherein if the twenty-first is satisfied,
determine if a twenty-second set of criteria is satisfied, wherein the twenty-second set of criteria is satisfied when the second local phone number conforms to a fifth minimum rule and a fifth maximum rule for the first country,
wherein if the twenty-second set of criteria is satisfied,
recognize that the second local phone number is authenticated, wherein an authenticated second local phone number is obtained;
concatenate a captured code or prefix and the authenticated second local phone number, wherein a domestic concatenation is obtained, and wherein the captured code or prefix is the captured intra-city code, the captured inter-city code, the captured default carrier code, the captured mobile-device prefix, the captured land-line prefix, the captured single-digit trunk plus await code, or the captured trunk prefix;
proceed to determine if a twenty-third criterion is satisfied;
wherein if the twenty-second set of criteria is not satisfied,
reset a dialer;
wherein if the twenty-first criterion is not satisfied,
reset the dialer;
determine if a twenty-third criterion is satisfied, wherein the twenty-third criterion is satisfied when the user initiates a first phone call,
wherein if the twenty-third criterion is satisfied,
display a destination city for the authenticated second local phone number;
enable the user to dial the domestic concatenation using a default phone application on the communication device;
save the tenth reformatted phone number to the call log on the communication device;
initiate the first phone call;
wherein if the twenty-third criterion is not satisfied,
open the default text application on the communication device and display the domestic concatenation;
enable the user to type a first text message; and
send the first text message.

10. The at least one non-transitory computer-readable medium of claim 8, comprising instructions to:
allow the user to select an eleventh reformatted phone number to be called or texted, wherein the eleventh reformatted phone number is a thirteenth concatenation of a ninth ISO country code for a second country and a third local phone number in the second country;
establish that the ninth ISO county code for the second country fails to match the seventh ISO country code for the current country;
initiate the international call logic sequence;

determine if a twenty-fourth criterion is satisfied, wherein the twenty-fourth criterion is satisfied when the current country and the second country are in a same telecommunications alliance,
wherein if the twenty-fourth criterion is satisfied,
  use an alliance rule logic to capture an alliance dialing code from the database containing dialing codes and prefixes, wherein a captured alliance dialing code is obtained and wherein the captured alliance dialing code is a first external dialing protocol (EDP) string;
  proceed to enable the user to dial the third local phone number;
wherein if the twenty-fourth criterion is not satisfied,
  determine if a twenty-fifth criterion is satisfied, wherein the twenty-fifth criterion is satisfied when the current country uses an international carrier code,
  wherein if the twenty-fifth criterion is satisfied,
    capture the international carrier code from the database containing dialing codes and prefixes, wherein a captured international carrier code is obtained;
    proceed to determine if a twenty-seventh criterion is satisfied;
  wherein if the twenty-fifth criterion is not satisfied,
    determine if a twenty-sixth criterion is satisfied, wherein the twenty-sixth criterion is satisfied when the current country uses the single-digit trunk plus await code followed by the exit code for the current country,
      wherein if the twenty-sixth criterion is satisfied,
        capture the single-digit trunk plus await code and the exit code from the database containing dialing codes and prefixes, wherein a captured single-digit trunk plus await code and the exit code are obtained;
        program the captured single-digit trunk plus await code to pause dialing for five seconds;
        proceed to determine if a twenty-seventh criterion is satisfied;
      wherein if the twenty-sixth criterion is not satisfied,
        capture the exit code for the current country from the database containing dialing codes and prefixes, wherein a captured exit code is obtained;
        proceed to determine if a twenty-seventh criterion is satisfied;
determine if a twenty-seventh criterion is satisfied, wherein the twenty-seventh criterion is satisfied when the second country uses different entry codes for mobile devices and land lines,
  wherein if the twenty-seventh criterion is satisfied,
    capture a second entry code for the second country from the database containing dialing codes and prefixes;
    concatenate a current country EDP, the second entry code, and a mobile-device entry code or a land-line entry code, wherein a second EDP string is obtained and wherein the current country EDP is the captured international carrier code, the captured single-digit trunk plus await code and the exit code, or the captured exit code;
    proceed to enable the user to dial the third local phone number;
  wherein if the twenty-seventh criterion is not satisfied,
    concatenate the current country EDP and the second entry code, wherein a third EDP string is obtained;
    proceed to enable the user to dial the third local phone number;
enable the user to dial the third local phone number, wherein a dialed third local phone number is obtained;
authenticate the dialed third local phone number;
determine if a twenty-eighth criterion is satisfied, wherein the twenty-eighth criterion is satisfied when the dialed third local phone number passes a second verification test for the second country,
  wherein if the twenty-eighth criterion is satisfied,
    determine if a twenty-ninth set of criteria is satisfied, wherein the twenty-ninth set of criteria is satisfied when the dialed third local phone number conforms to a sixth minimum rule and a sixth maximum rule for the second country,
      wherein if the twenty-ninth set of criteria is satisfied, recognize that the third local phone number is authenticated,
        wherein an authenticated third local phone number is obtained; concatenate an EDP string and the authenticated third local phone number, wherein an international concatenation is obtained and
        wherein the EDP string is the first EDP string, the second EDP string, or the third EDP string;
        proceed to determine if a thirtieth criterion is satisfied;
      wherein if the twenty-ninth set of criteria is not satisfied,
        establish that a first incorrect phone number has been dialed;
        reset the dialer;
        return to enable the user to dial the third local phone number;
  wherein if the twenty-eighth criterion is not satisfied,
    establish that a second incorrect phone number has been dialed;
    reset the dialer;
    return to enable the user to dial the third local phone number;
determine if a thirtieth criterion is satisfied, wherein the thirtieth criterion is satisfied when the user initiates a second phone call,
  wherein if the thirtieth criterion is satisfied,
    display a first destination city for the authenticated third local phone number;
    enable the user to dial the international concatenation using the default phone application on the communication device;
    save the eleventh reformatted phone number to the call log on the communication device;
    initiate the second phone call;
  wherein if the thirtieth criterion is not satisfied,
    open the default text application on the communication device and display the international concatenation;
    enable the user to type a second text message; and
    send the second text message.

11. The at least one non-transitory computer-readable medium of claim 10, comprising instructions to:
initiate the alliance rule logic;
identify a common telecommunications alliance by comparing a first record for the current country and a second record for a third country in the database containing dialing codes and prefixes;

capture a first alliance dialing code from the second record for the third country, wherein a captured first alliance dialing code is obtained;
enable the user to dial a fourth local phone number in the third country, wherein a dialed fourth local phone number is obtained;
authenticate the dialed fourth local phone number;
determine if a thirty-first criterion is satisfied, wherein the thirty-first criterion is satisfied when the dialed fourth local phone number passes a third verification test for the third country,
wherein if the thirty-first criterion is satisfied,
  determine if a thirty-second set of criteria is satisfied, wherein the thirty-second set of criteria is satisfied when the dialed fourth local phone number conforms to a seventh minimum rule and a seventh maximum rule for the third country;
    wherein if the thirty-second set of criteria is satisfied,
      recognize that the fourth local phone call is authenticated,
      wherein an authenticated fourth local phone number is obtained;
      concatenate the captured first alliance dialing code and the authenticated fourth local phone number, wherein an alliance concatenation is obtained;
      proceed to determine if a thirty-third criterion is satisfied;
    wherein if the thirty-second set of criteria is not satisfied,
      establish that a third incorrect phone number has been dialed;
      reset the dialer;
      return to enable the user to dial the fourth local phone number;
wherein if the thirty-first criterion is not satisfied,
  establish that a fourth incorrect phone number has been dialed;
  reset the dialer;
  return to enable the user to dial the fourth local phone number;
determine if a thirty-third criterion is satisfied, wherein the thirty-third criterion is satisfied when the user initiates a third phone call,
  wherein if the thirty-third criterion is satisfied,
    display a second destination city for the authenticated fourth local phone number;
    enable the user to dial the alliance concatenation using the default phone application on the communication device;
    save a twelfth reformatted phone number to the call log on the communication device;
    initiate the third phone call to the alliance concatenation;
  wherein if the thirty-third criterion is not satisfied,
    open the default text application on the communication device and display the alliance concatenation;
    enable the user to type a third text message; and
    send the third text message to the alliance concatenation.

12. The at least one non-transitory computer-readable medium of claim 1, comprising instructions to:
initiate the verification test;
enable the user to begin dialing the local phone number;
determine if a thirty-fourth criterion is satisfied, wherein the thirty-fourth criterion is satisfied when six digits of the local phone number have been dialed and wherein a six-digit series is obtained,
  wherein if the thirty-fourth criterion is satisfied,
    proceed to determine if a thirty-fifth criterion is satisfied;
  wherein if the thirty-fourth criterion is not satisfied,
    enable the user to continue dialing;
    return to determine if a thirty-fourth criterion is satisfied;
determine if a thirty-fifth criterion is satisfied, wherein the thirty-fifth criterion is satisfied when the user is making a domestic phone call,
  wherein if the thirty-fifth criterion is satisfied,
    capture a current country entry code from the database containing dialing codes and prefixes, wherein a captured current country entry code is obtained;
    determine if a thirty-sixth criterion is satisfied, wherein the thirty-sixth criterion is satisfied when the domestic phone call is toll free,
      wherein if the thirty-sixth criterion is satisfied,
        modify a search predicate to restrict a search of a verification database to toll-free verification sequences;
        proceed to combine a captured entry code with the six-digit series;
      wherein if the thirty-sixth criterion is not satisfied,
        proceed to combine a captured entry code with the six-digit series;
  wherein if the thirty-fifth criterion is not satisfied,
    capture a destination country entry code from the database containing dialing codes and prefixes, wherein a captured destination country entry code is obtained;
    proceed to combine a captured entry code with the six-digit series;
combine a captured entry code with the six-digit series, wherein a verification string is created and wherein the captured entry code is the captured current country entry code or the captured destination country entry code;
set a verification loop counter equal to one;
begin a verification loop,
  search the verification database for a verification sequence that matches the verification string;
  determine if a thirty-seventh criterion is satisfied, wherein the thirty-seventh criterion is satisfied when the verification sequence matching the verification string is found and wherein a matching verification sequence is obtained,
    wherein if the thirty-seventh criterion is not satisfied,
      determine if a thirty-eighth criterion is satisfied, wherein the thirty-eighth criterion is satisfied when the verification loop counter equals six,
        wherein if the thirty-eighth criterion is not satisfied,
          modify the verification string based upon a value of the verification loop counter;
      increment the verification loop counter by one;
    repeat the verification loop until the matching verification sequence is found or until the verification loop counter equals six;
    wherein if the thirty-seventh criterion is satisfied,
      display a third destination city on the communication device, wherein the third destination city is associated with the matching verification sequence;
      proceed to enable the user to continue dialing the local phone number;

wherein if the thirty-eighth criterion is satisfied,
  display an alert indicating that the matching verification sequence was not found;
  determine if a thirty-ninth criterion is satisfied, wherein the thirty-ninth criterion is satisfied when the user attempts to dial more digits of the local phone number,
  wherein if the thirty-ninth criterion is satisfied,
  enable the user to continue dialing the local phone number;
wherein if the thirty-ninth criterion is not satisfied, reset the dialer.

\* \* \* \* \*